United States Patent
Bayard et al.

(10) Patent No.: US 11,575,238 B2
(45) Date of Patent: Feb. 7, 2023

(54) MODULAR POWER DISTRIBUTION SYSTEM

(71) Applicant: PORTAL TEX, INC., Richmond, TX (US)

(72) Inventors: William Brenden Bayard, Richmond, TX (US); Aibek Uraimov, Los Angeles, CA (US)

(73) Assignee: Portal Tex, Inc., Richmond, TX (US)

( * ) Notice: Subject to any disclaimer, the term of this patent is extended or adjusted under 35 U.S.C. 154(b) by 0 days.

(21) Appl. No.: 17/062,784

(22) Filed: Oct. 5, 2020

(65) Prior Publication Data

US 2021/0104855 A1 Apr. 8, 2021

Related U.S. Application Data

(60) Provisional application No. 62/911,316, filed on Oct. 6, 2019.

(51) Int. Cl.
*H01R 33/94* (2006.01)
*H01R 13/502* (2006.01)
*H01R 13/74* (2006.01)
*H01R 13/518* (2006.01)
*H01R 33/88* (2006.01)
(Continued)

(52) U.S. Cl.
CPC .......... *H01R 33/94* (2013.01); *H01R 13/502* (2013.01); *H01R 13/518* (2013.01);
(Continued)

(58) Field of Classification Search
CPC .... H01R 33/94; H01R 13/502; H01R 13/518; H01R 13/748; H01R 33/88; H01R 13/73;
(Continued)

(56) References Cited

U.S. PATENT DOCUMENTS 3,879,101 A 4/1975 McKissic
7,762,838 B2 7/2010 Gorman
(Continued)

OTHER PUBLICATIONS

International Search Report dated Mar. 15, 2021 issued in connection with PCT/US2020/054222.
(Continued)

*Primary Examiner* — Abdullah A Riyami
*Assistant Examiner* — Justin M Kratt
(74) *Attorney, Agent, or Firm* — Akerman LLP

(57) ABSTRACT

A modular power distribution system, comprising a client device configured to be inserted into a host device, and having a series of independently configurable electrical connections and predetermined electrical connections connecting the host device, the client device, and a cable to deliver power from the cable to a peripheral of the client. A modular power distribution system, comprising a host device having first and second compartments, the second compartment being dimensioned to automatically align the client electrical coupler with the host electrical coupler and form a protective barrier while the client electrical coupler is in contact with the host electrical coupler. A modular power distribution system comprising a multi-gang host device and a client assembly, and having a series of independently configurable electrical connections and predetermined electrical connections connecting the multi-gang host device, the client assembly, and a cable(s) to deliver power from the cable the client assembly.

5 Claims, 50 Drawing Sheets

(51) Int. Cl.
*H01R 25/00* (2006.01)
*H01R 13/73* (2006.01)
*H02G 3/12* (2006.01)
*H02G 3/16* (2006.01)
*H04B 3/00* (2006.01)
*H01R 31/02* (2006.01)
*H01R 31/06* (2006.01)

(52) U.S. Cl.
CPC .......... H01R 13/748 (2013.01); H01R 33/88 (2013.01); *H01R 13/73* (2013.01); *H01R 25/006* (2013.01); *H01R 31/02* (2013.01); *H01R 31/065* (2013.01); *H02G 3/12* (2013.01); *H02G 3/126* (2013.01); *H02G 3/16* (2013.01); *H04B 3/00* (2013.01)

(58) Field of Classification Search
CPC ........ H01R 25/006; H01R 31/02; H02G 3/16; H02G 3/12; H02G 3/126; H04B 3/00
See application file for complete search history.

(56) References Cited

U.S. PATENT DOCUMENTS

| | | | |
|---|---|---|---|
| 7,874,856 | B1 | 1/2011 | Schriefer et al. |
| 9,899,819 | B1 | 2/2018 | Holloway |
| 2007/0041339 | A1* | 2/2007 | Binder .................. H04N 7/106 |
| | | | 370/264 |
| 2013/0261821 | A1 | 10/2013 | Lu et al. |
| 2013/0295782 | A1 | 11/2013 | Goel |
| 2015/0214708 | A1* | 7/2015 | Segnit ..................... H02G 3/18 |
| | | | 174/53 |
| 2017/0077690 | A1* | 3/2017 | Moss ....................... H02J 3/00 |

OTHER PUBLICATIONS

Written Opinion of the International Searching Authority dated Mar. 15, 2021 issued in connection with PCT/US2020/054222.

\* cited by examiner

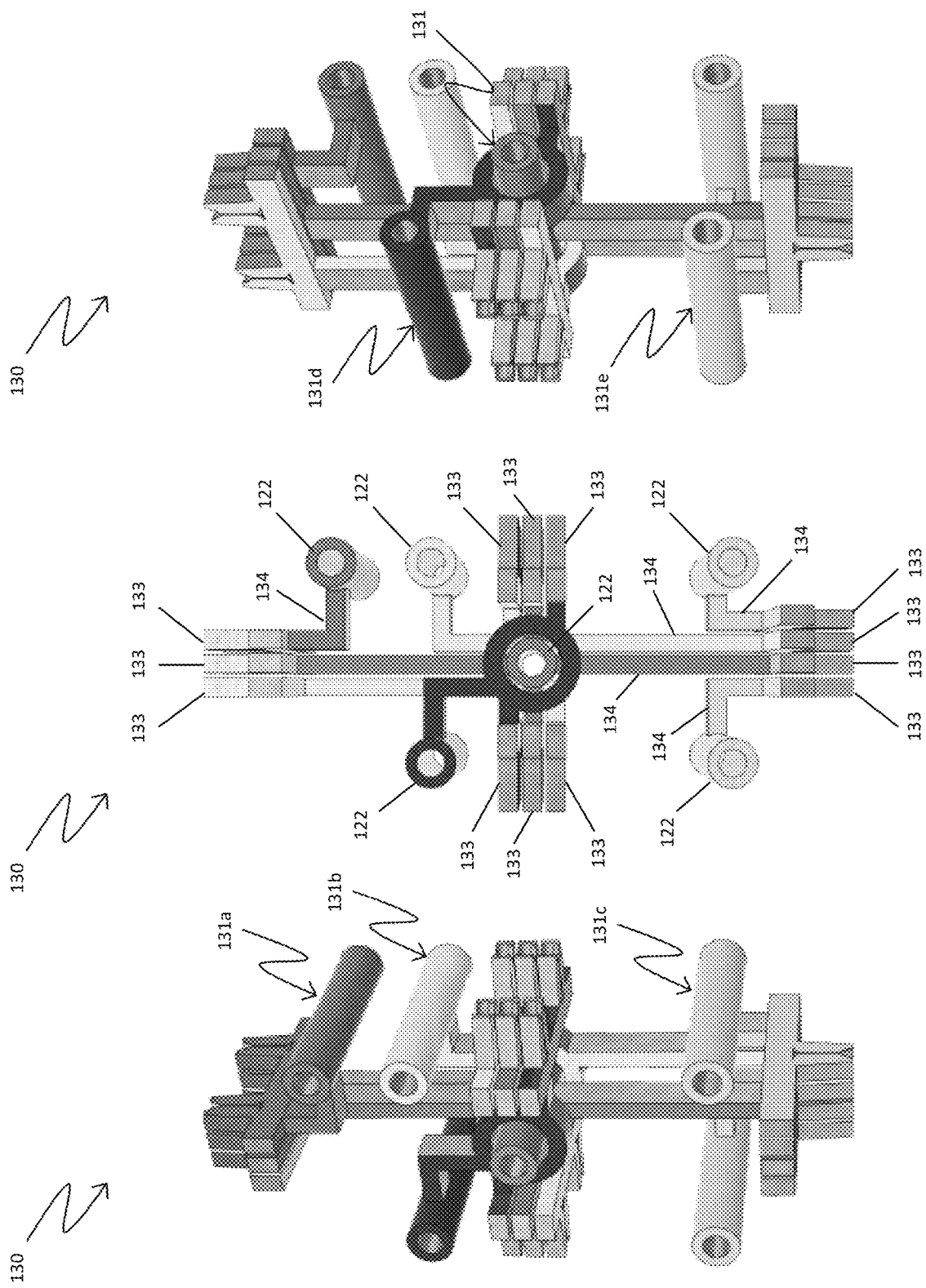

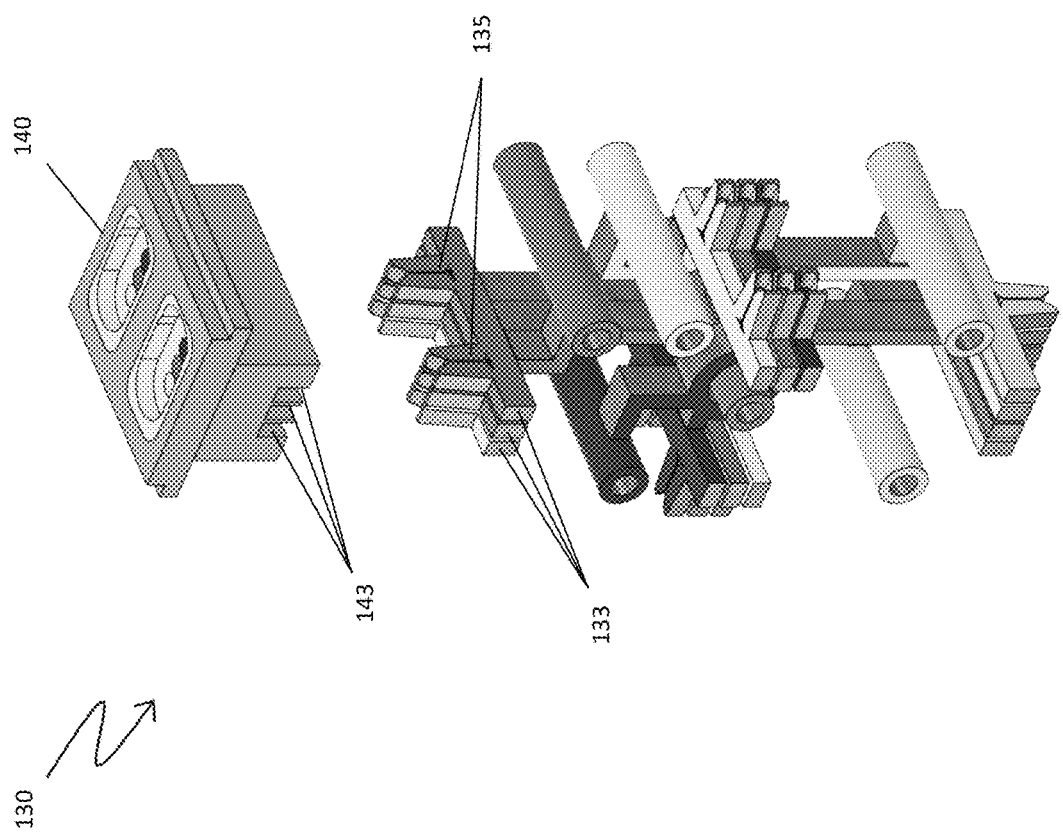

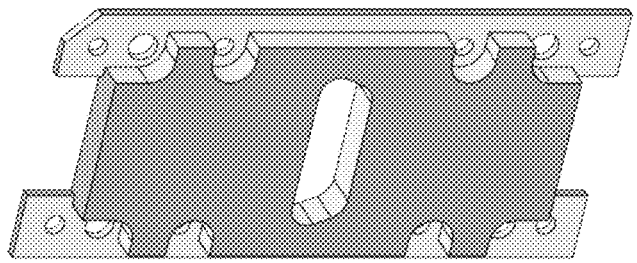
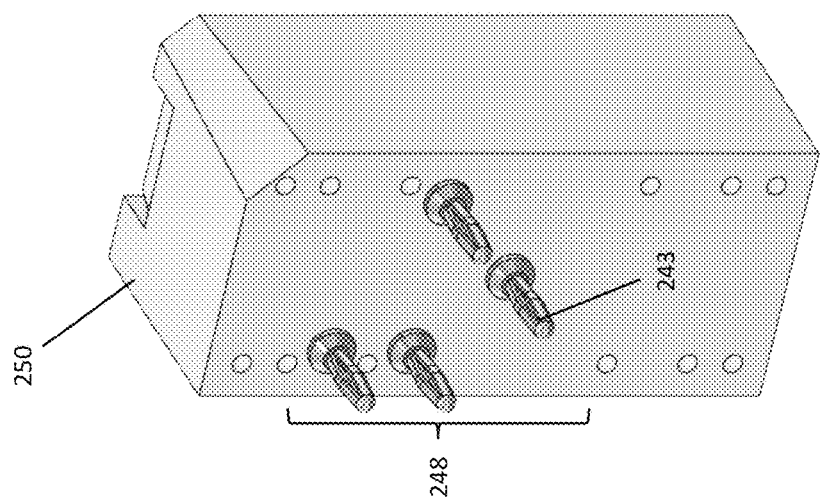
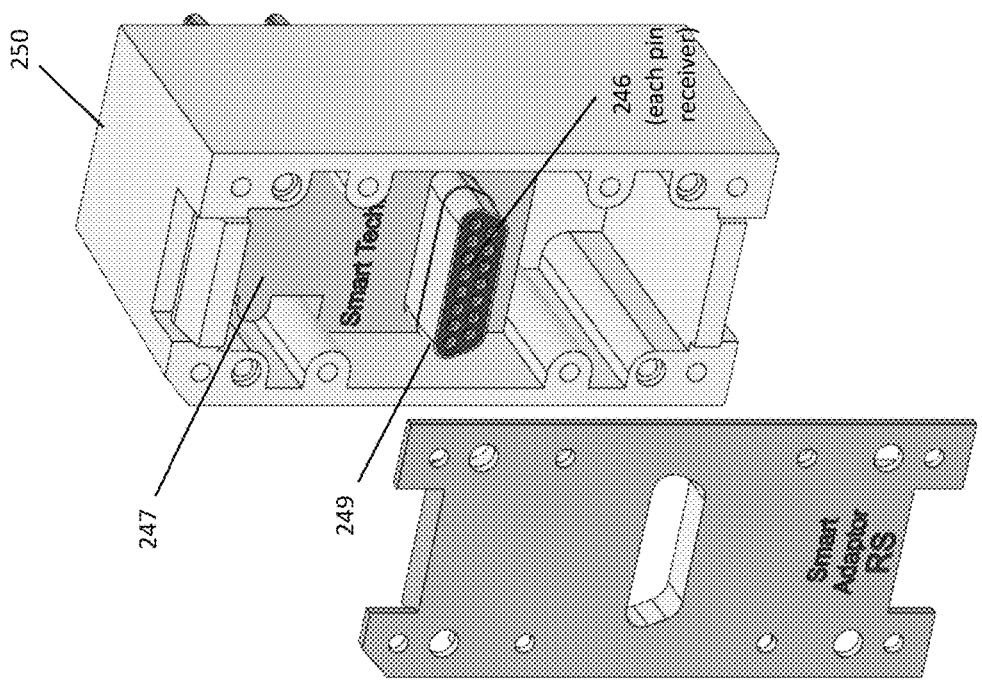
FIG. 13C
FIG. 13D

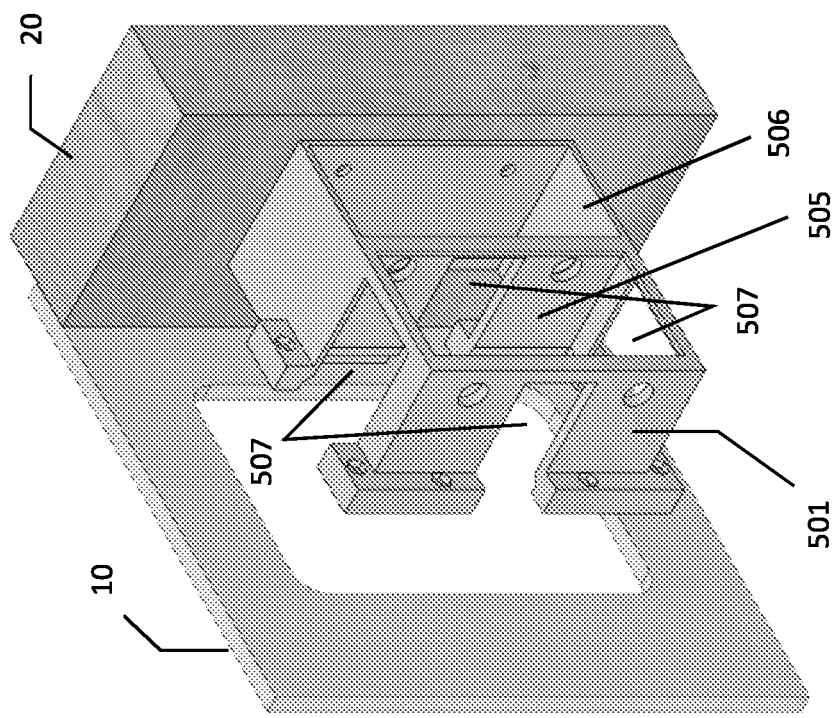
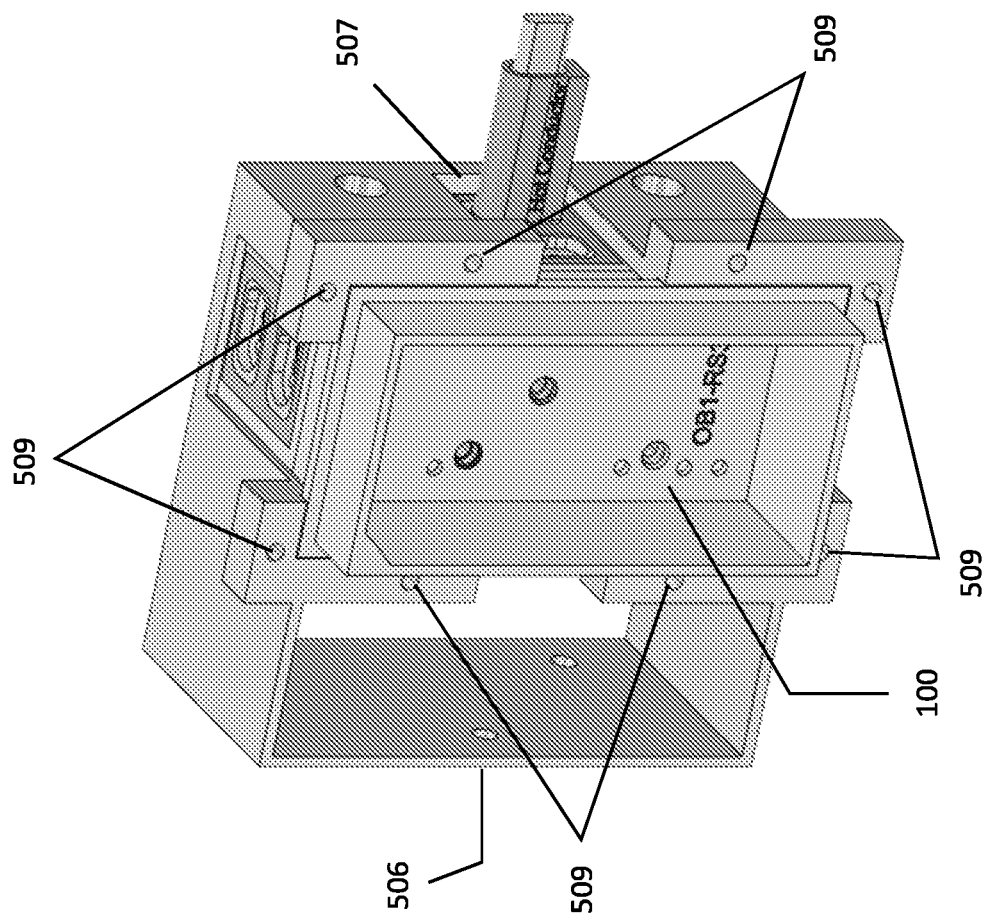
FIG. 21A
FIG. 21B

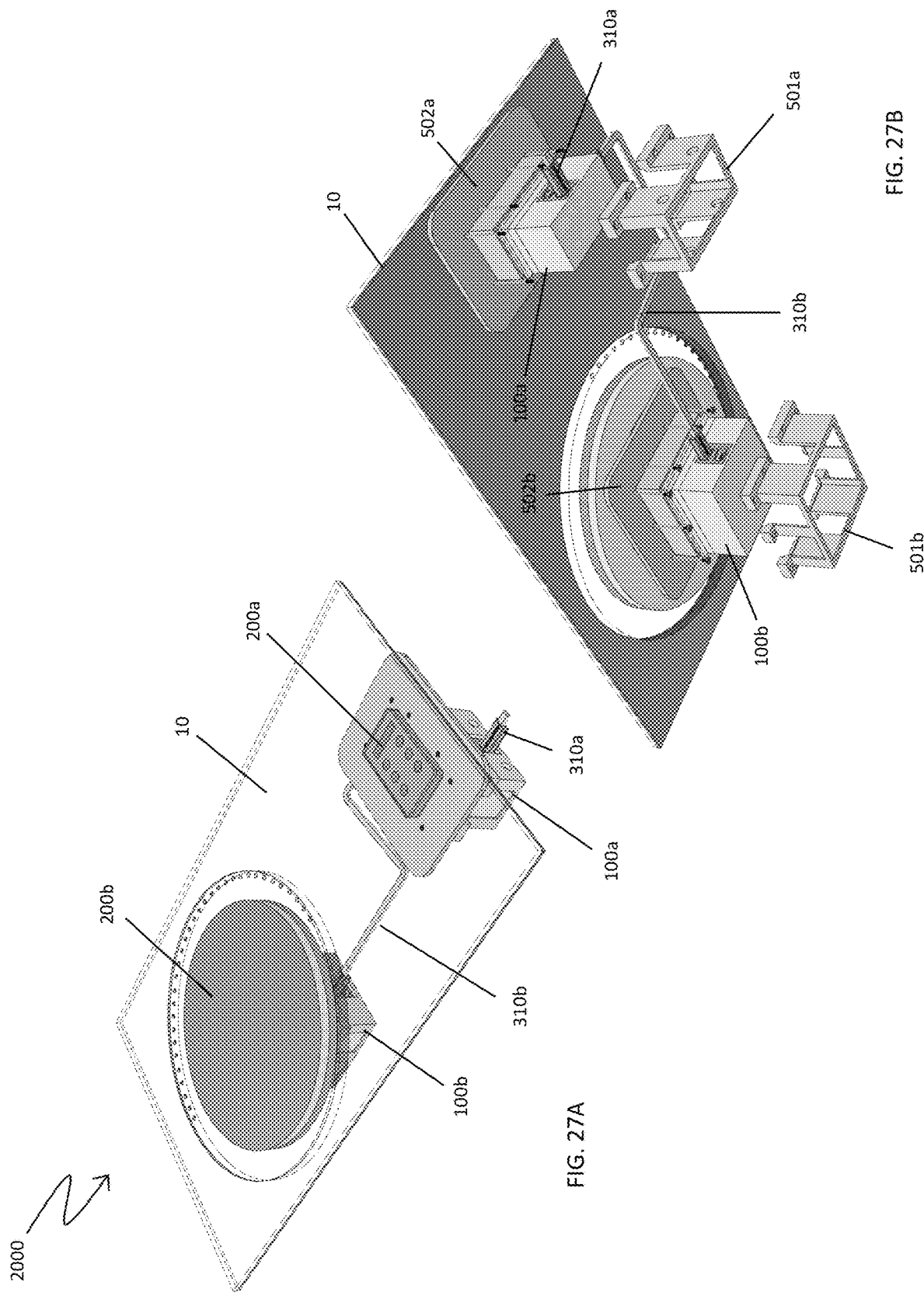

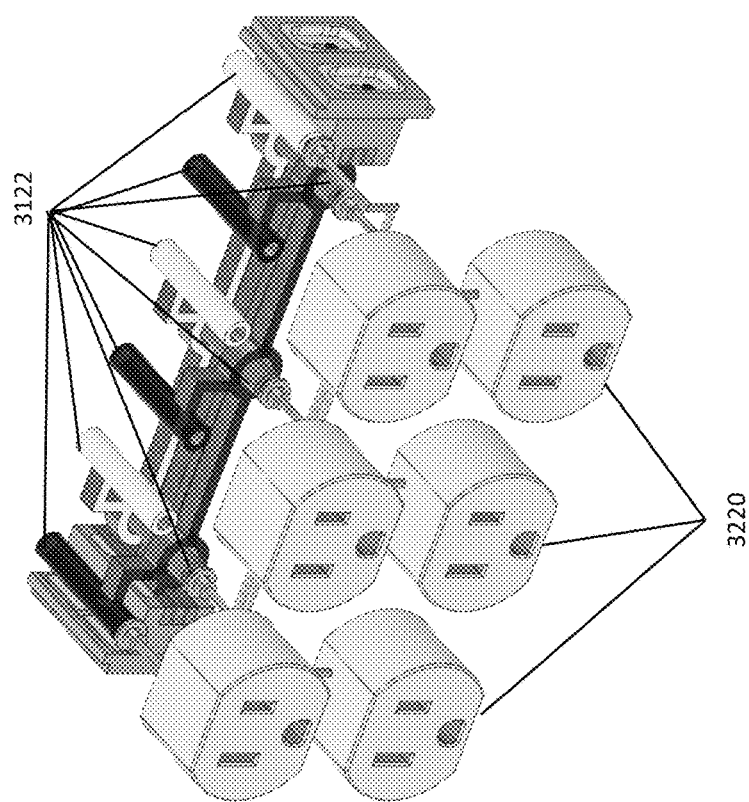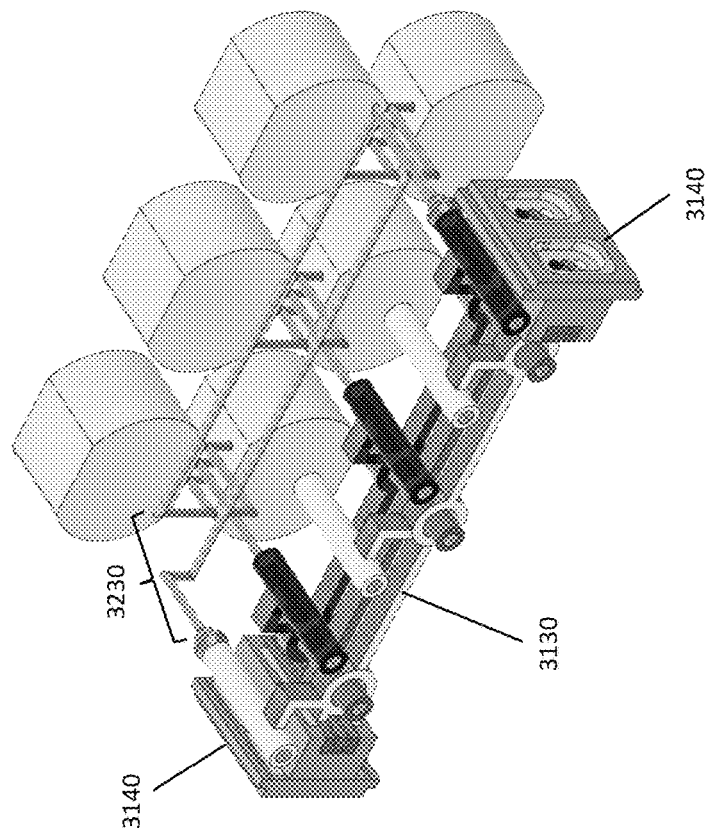
FIG. 28D

Common Client Peripherals

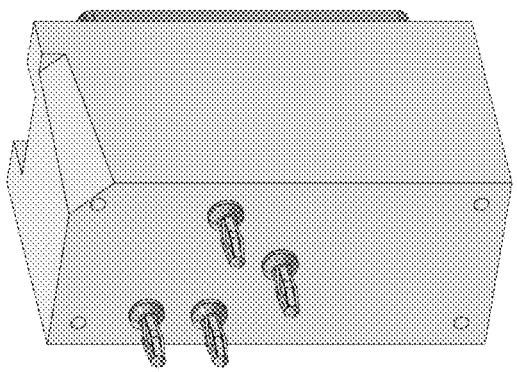
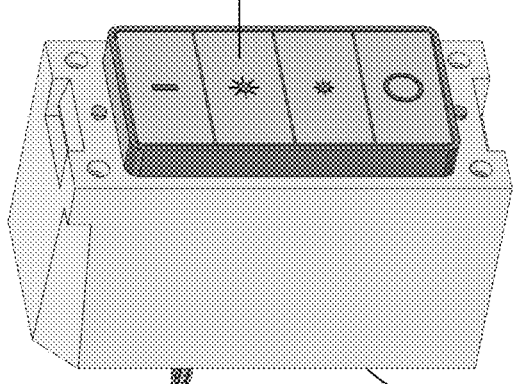
FIG. 36B
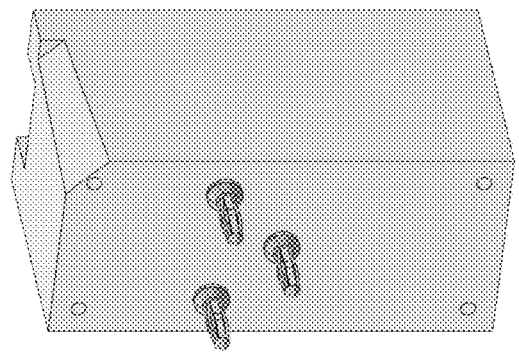
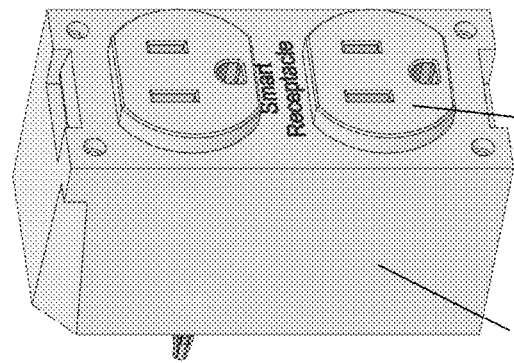
FIG. 36A

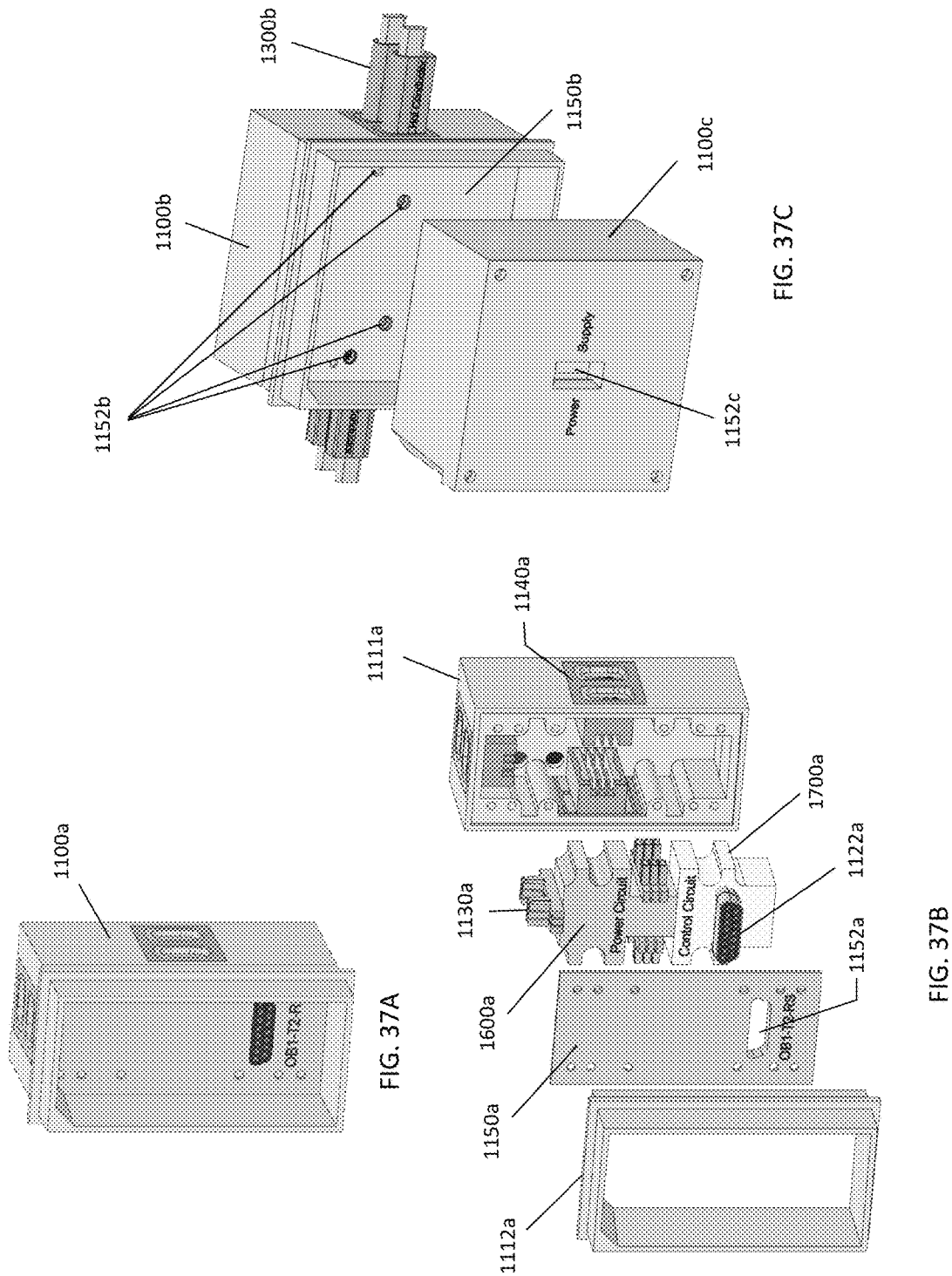

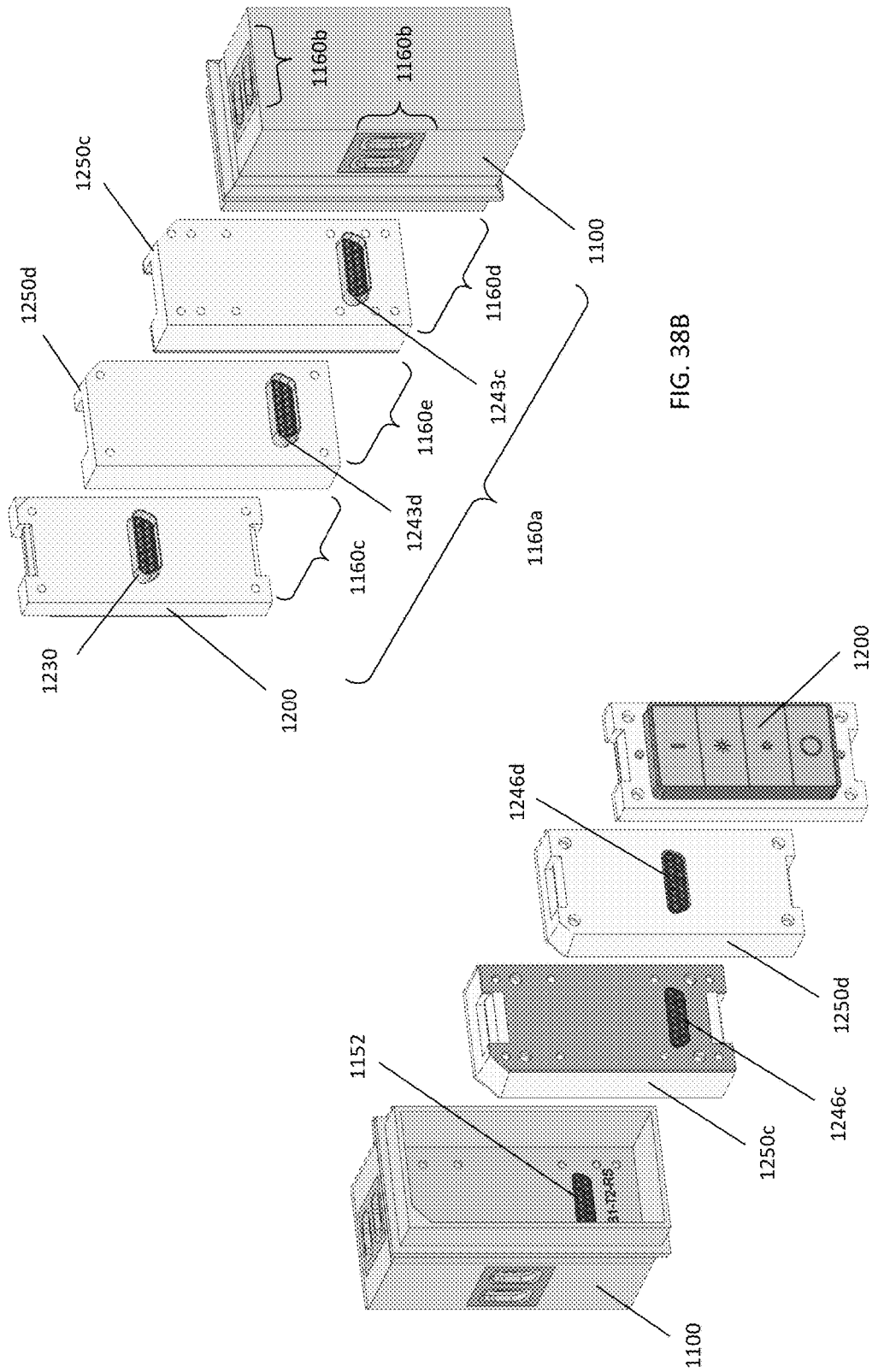

MODULAR POWER DISTRIBUTION SYSTEM

CROSS-REFERENCE TO RELATED APPLICATION(S)

This application claims the benefit of and priority to U.S. Provisional Application No. 62/911,316, filed Oct. 6, 2019, which is hereby incorporated by reference in its entirety for all purposes.

BACKGROUND

Consumer level technologies have advanced tremendously since electricity had become a common utility over a century ago, contributing to the evolution of electrical appliances and devices in terms of variety and quality of materials, abundant improvements in engineering and manufacturing standards, and generational growth in functional versatility, especially with the integration of electronics and addition of network connectivity.

During the same period, the methodology of delivering electrical power to its utilization points within buildings have evolved little. Hardware form factor of presently utilized wiring systems has remained virtually unchanged and typically includes a series of electrical cables, which are interconnected via cable junction boxes and distribute electrical power to end use devices via electrical outlet boxes, which receive and host various electrical equipment, such as receptacles, switches, light bulb sockets, and compatible electrical outlet inserts.

The process of installing and servicing of electrical outlet equipment has not evolved either, bound by the physical architecture of the wiring systems. The process still requires skillful labor to sort through an entanglement of stiff wires crammed in an electrical box and manually perform a sequence of tasks, such as wire splicing and precision fitting of equipment inside electrical boxes, while managing hazards of electrocution due to exposed conductors and terminals and given the limited space for maneuvering within an electrical box housing and mounting fixtures.

Furthermore, electrical power distribution systems are still governed by codes and standards, which were designed in the last century and have impeded modernization of the electrical outlet devices: the regulations stipulate that functional purpose of electrical outlets are preassigned at time of construction and are permanently installed in predetermined spots within a building interior with little or no regard to the preferences of an end user.

In addition, power distribution infrastructure has been considered a passive segment and functionality of its hardware components deemed to be static, leaving little space for any innovation and causing short-term and long-term operational inefficiencies. One example of such inefficiencies is the wasteful utilization of labor resources: the existing construction standards compel an electrician to repeatedly perform similar set of tedious tasks by hand, for each installation of an electrical outlet, as there is no alternative with an automation solution for this process. Another example is the unjustifiably high level of costs of ensuring reliability and safety of wiring systems, when compared to modern standards elsewhere in a construction process. Although tightly regulated and requiring a trained professional with certified knowledge of applicable codes and standards, the job of building and servicing electrical systems is prone to human errors, especially when interconnecting complex electrical circuits. Such errors may quickly lead to disproportionally more expensive corrective measures than the cause, such as having to tear down and replacing an entire drywall partition just to fix a small wiring mistake.

The disparity in evolution of the end-use electrical devices and the underlying infrastructure that delivers electrical power to those devices has led to a technological gap between these two domains, rendering legacy power infrastructures increasingly inadequate in serving the modern and forthcoming technological demands. There is an ongoing progress in the development of consumer technology products, which require use of electricity, ranging from portable gadgets and household appliances to computerized home control systems and electrified motorized vehicles. The emerging technology innovations continue to be launched onto the outdated platforms and are forced to comply with relic codes and standards, designed to serve last century's industries; thus, impeding the adoption of innovations and creating inefficiencies in the utilization of resources.

There is a need for modernizing physical architecture of power distribution infrastructures, improving safety practices, and setting new standards of interconnecting wiring system components, allowing to speed up adoption of new and upcoming technology solutions at consumer level.

SUMMARY

The present disclosure is directed to a modular power distribution system. The system, in various embodiments, may include a client device comprising a client electrical coupler, a peripheral, and electrical connections between the client electrical coupler and the peripheral; and a host device comprising a host electrical coupler, a cable electrical coupler, and a host bus configured to define electrical connections between the host electrical coupler and the cable electrical coupler. The client electrical coupler and the host electrical coupler may be configured to couple with one another when the client device is inserted into the host device to provide a first electrical interface defining a plurality of predetermined electrical connections between the client device and the host device, and the cable electrical coupler may be configured to couple with a cable to provide a second electrical interface defining a plurality of predetermined electrical connections between the host device and electrical conductors of the cable. The electrical connections between the host electrical coupler and the cable electrical coupler and the electrical connections between the peripheral and the client electrical coupler may be independently configurable to form an electrical circuit suitable for delivering power from the cable to the peripheral, via the predetermined electrical connections defined at the first and second electrical interfaces connecting the cable, the host device, and the client device.

The system, in various embodiments, may include two or more cable electrical couplers and the host bus may be configured to define direct or indirect electrical connections between two or more of the cable electrical couplers configured to deliver power from a first of the two or more cable electrical couplers to a second of the two or more cable electrical couplers.

The system, in various embodiments, may further comprise a client adapter having a first adapter electrical coupler, a second adapter electrical coupler, and electrical connections between the first adapter electrical coupler and the second adapter electrical coupler. The first adapter electrical coupler may be configured to couple with the client electrical coupler to provide a third electrical interface defining a plurality of predetermined electrical connections between the client device and the client adapter, and the second adapter electrical coupler may be configured to couple with the host electrical coupler to provide a fourth electrical interface defining a plurality of predetermined electrical connections between the client adapter and the host device. The electrical connections between the first adapter electrical coupler and the second adapter electrical coupler may be independently configurable to form an electrical circuit suitable for connecting the client device to the host device via the predetermined electrical connections defined at the third electrical interface and the fourth electrical interface. In an embodiment, the client adapter may further include an adapter peripheral connected to the electrical circuit and configured to combine a functionality of the adapter peripheral with a functionality of the peripheral of the client device.

The host bus, in various embodiments, may include two or more bus connectors, each having one or more bus terminals configured to couple with one or more electrical conductors of the cable, and a rigid bus member connecting the host electrical coupler with the one or more bus terminals, the rigid bus member shaped to follow a path configured not to contact the rigid bus members of other bus connectors. The one or more bus terminals, in various embodiments, may include a rigid support member extending between and supported by a first wall and a second wall of a housing of the host device, and the host electrical coupler is rigid and extends between and is supported by the first wall and the second wall. The rigid bus member of a first bus connector and a rigid bus member of a second bus connector, in various embodiments, may be configured to be situated in separate planes offset from one another within the housing, and the one or more bus terminals of the first bus connector and the one or more bus terminals of the second bus connector may be configured to be situated in separate planes offset from one another within at least one of the one or more cable electrical couplers.

In another aspect, the present disclosure is directed to another modular power distribution system having a client device having a client electrical coupler, and a host device having a housing having a first compartment and a second compartment and a host electrical coupler situated within an interior of the first compartment. The portion of the housing defining the second compartment may have an open side through which the client device is inserted into the second compartment, and may be dimensioned to: (i) automatically align the client electrical coupler with the host electrical coupler, and (ii) form a protective barrier surrounding the client electrical coupler while the client electrical coupler is in contact with the host electrical coupler during insertion and removal of the client device into and out of the second compartment, respectively.

The first compartment, in various embodiments, may be separated from the second compartment by an interface wall configured to prevent a user from accessing the first compartment and thereby reducing shock hazard. The interface wall, in various embodiments, may include one or more ports through which the client electrical coupler may pass to couple with the host electrical coupler situated within the first compartment. The one or more ports, in various embodiments, may be arranged such that the client electronic coupler will not align with the one or more ports if the client device is inserted into the second compartment in an incorrect orientation. In various embodiments, the client device and the portion of the housing defining the second compartment may be keyed to prevent insertion of the client device into the second compartment in an incorrect orientation.

The host device, in various embodiments, may further include one or more cable electrical couplers extending through the housing into the interior of the first compartment, each of the one or more cable electrical couplers having one or more ports configured to direct electrical conductors of a cable through the cable electrical coupler for connection with a host bus situated within the first compartment.

The system, in various embodiments, may further include a mounting frame for mounting the host device to a structure, the mounting frame having a host compartment configured to house the host device, the host compartment having an open front face through which the host device is inserted into the host compartment and having one or more cutouts extending rearward from the open face such that one or more cables can be connected to the host device and the resulting assembly then inserted into the host compartment without the mounting frame interfering with the one or more cables.

In yet another aspect, the present disclosure is directed to a multi-gang modular power distribution system. The multi-gang system may include a multi-gang host device having two or more gangs, at least some of the gangs comprising a host electrical coupler and at least some of the gangs comprising a cable electrical coupler, and a multi-gang host bus connecting the host electrical couplers and at least one of the cable electrical couplers of the multi-gang host device; and a client assembly having two or more client devices physically connected to one another and arranged for insertion of the client assembly into the multi-gang host device. The client electrical couplers of the client assembly and the host electrical couplers of the multi-gang host device may be configured to couple with one another when the client assembly is inserted into the multi-gang host device to provide a corresponding number of first electrical interfaces, each first electrical interface defining a plurality of predetermined electrical connections between the client assembly and the multi-gang host device. Each of the cable electrical couplers may be configured to couple with a cable to provide a corresponding number of second electrical interfaces, each second electrical interface defining a plurality of predetermined electrical connections between the multi-gang host device and electrical conductors of the cable.

The multi-gang host bus, in various embodiments, may be independently configurable to form an electrical circuit suitable for delivering power from the cable(s) to the client assembly, via the predetermined electrical connections defined at the first electrical interface(s) and the second electrical interface(s) connecting the cable(s), the multi-gang host device, and the client assembly. Each of the two or more gangs of the multi-gang host device, in an embodiment, may include a host electrical coupler, and each of the two or more client devices of the client assembly, in an embodiment, may include a client electrical coupler.

At least some of the two or more client devices of the client assembly, in various embodiments, may be electrically connected to one another by a client bus, and the client assembly may include fewer client electrical couplers than would otherwise be required to define the plurality of predetermined electrical connections between the client assembly and the multi-gang host device absent the client bus. The client bus, in various embodiments, may be independently configurable to form an electrical circuit suitable for delivering power from at least one of the cable(s) to the client devices, via the predetermined electrical connections defined at the first electrical interface(s) and second electrical interface(s) connecting the cable(s), the multi-gang host device, and the client assembly. The multi-gang host device, in various embodiments, may be configured to combine a functionality of peripherals associated with each client device.

BRIEF DESCRIPTION OF THE DRAWINGS

Illustrative, non-limiting example embodiments will be more clearly understood from the following detailed description taken in conjunction with the accompanying drawings.

FIG. 6A, FIG. 6B, and FIG. 6C illustrate front-right, front, and front-left views of a representative host electrical coupler as assembled with a host bus, in accordance with an embodiment of the present disclosure;

FIG. 8 illustrates bus terminals, in accordance with an embodiment of the present disclosure;

FIG. 13C and FIG. 13D illustrate front and rear views of an interoperability adapter with interface wall 241 removed, in accordance with an embodiment of the present disclosure;

FIG. 21A and FIG. 21B illustrate front and rear views of a mounting frame, in accordance with an embodiment of the present disclosure;

FIG. 27A, FIG. 27B, and FIG. 27C illustrate another assembly of multiple interconnected systems, in accordance with an embodiment of the present disclosure;

FIG. 28A, FIG. 28B, FIG. 28C, and FIG. 28D illustrate a multi-gang system, in accordance with an embodiment of the present disclosure;

FIG. 36A and FIG. 36B illustrate front and rear views of a remotely controllable dual receptacle outlet and a remotely controllable dimmer light switch with touch sensitive buttons respectively, in accordance with an embodiment of the present disclosure;

FIG. 37A, FIG. 37B, and FIG. 37C illustrate various alternative embodiments of a host device and corresponding combinations thereof, in accordance with an embodiment of the present disclosure; and FIG. 38A and FIG. 38B illustrate a stackable assembly, in accordance with an embodiment of the present disclosure.

DETAILED DESCRIPTION

System 1000

Figure 1:
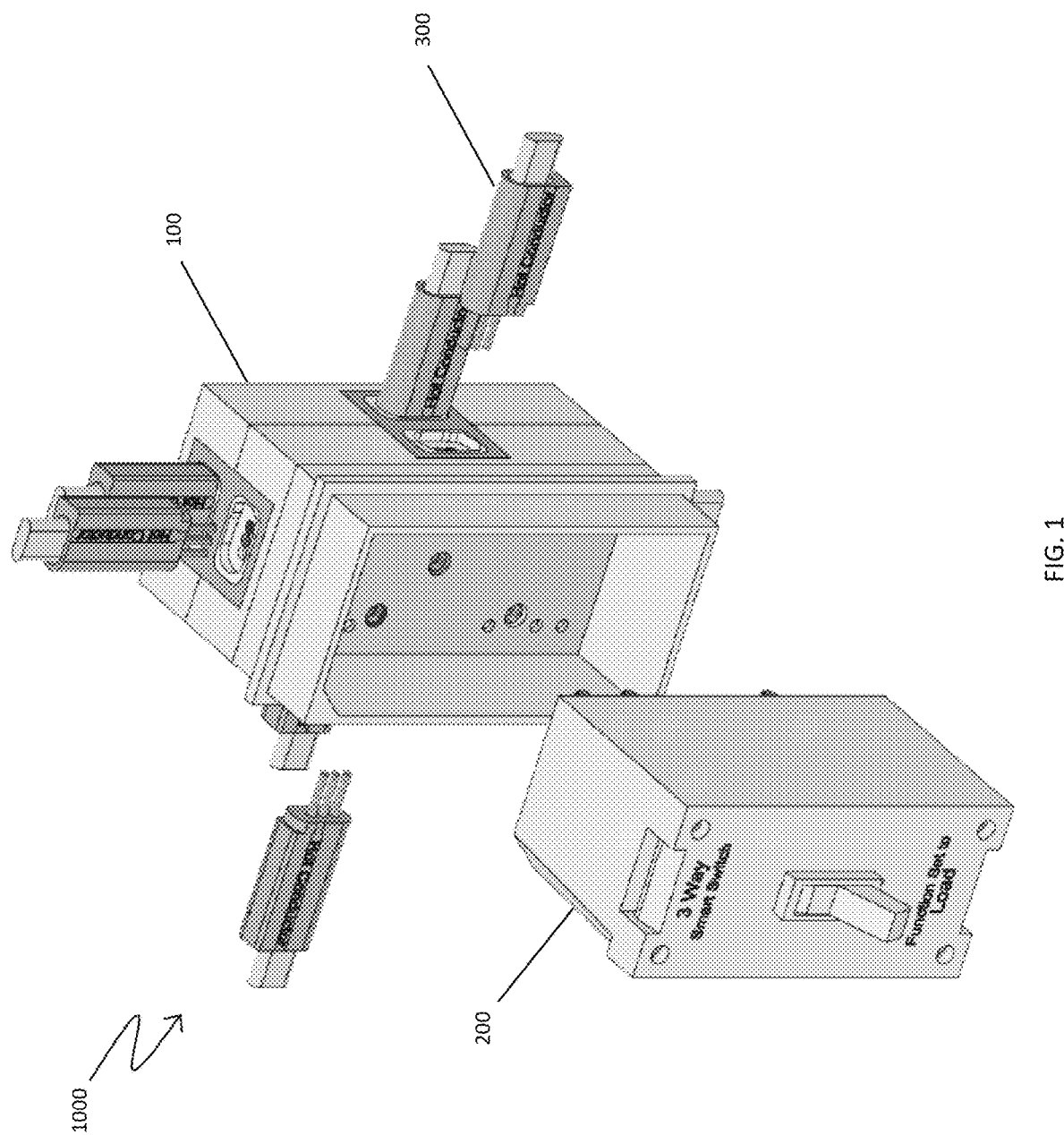
FIG. 1 illustrates a representative embodiment of a modular power distribution system, in accordance with an embodiment of the present disclosure.

FIG. 1 illustrates a representative embodiment of system 1000. System 1000, in various embodiments, may generally include a host device 100 configured for installation in a wall or other structure of a building, a client device 200 configured to be inserted in to host device 100, and a cable system 300 configured to be connected to host device 100 for powering client device 200.

Generally speaking, host device 100 may serve as a replacement for conventional electrical boxes installed in the walls of a building, and client device 200 may serve as a replacement for various peripherals such as power outlets, light switches, and the like, that are typically wired up and installed within the space provided by a conventional electrical box. Together, host device 100 and client device 200 may combine to replace traditional electrical outlet assemblies. Electrical couplers of host device 100 and client device 200, in various embodiments, may couple to one another to define a first electrical interface. Likewise, cable electrical couplers of host device 100, in various embodiments, may couple to cables to provide a corresponding number of electrical interfaces between host device 100 and cable system 300. Each electrical interface created between host device 100, client device 200, and cable system 300, in various embodiments, may define a plurality of predetermined electrical connections between the components being interfaced. As configured, system 1000 may generally provide a modular, easily interconnected system for distributing power that can replace existing outlet box assemblies and individual wiring. In various embodiments, electrical connections within host device 100 and client device 200 can be independently configured by various manufacturers in accordance with the standard defined by the predetermined connections, such that host devices 100 and client devices 200 from different manufacturers can be used with one another so long as each uses compatible electrical couplers. When such electrical connections are properly configured, host device 100, client device 200, and cable system 300 may be joined together to form an electrical circuit suitable for delivering power from conductors of cable system 300 to a peripheral of client device 200, via the predetermined electrical connections defined at the electrical interfaces created by the electrical couplers connecting the cable, the host device, and the client device, as further described herein.

The design of host device 100, in various embodiments, may be similar to that of a conventional electrical outlet box to preserve its typical size and dimension standards such that host device 100 would occupy the same or smaller space as traditional outlet boxes. As configured, host device 100 may be easily installed within a wall, floor, ceiling, or other surfaces of a building or structure without disrupting a typical construction process, and accommodates various client devices 200 which, in various embodiments, may be of comparable dimensions as traditional peripherals. Notwithstanding the foregoing, one of ordinary skill in the art will recognize that host device 100 and client device 200 need not necessarily be rectangular in shape like traditional electrical boxes and peripherals, respectively, and in various embodiments may have different shapes so long as the shape of host device 100 accommodates the shape of client device 200 therein. For example, in an embodiment, client device 200 (e.g., a Nest® thermostat) and host device 100 may each have a circular shape or any other suitable complementary shapes.

Unlike traditional electrical boxes and peripherals, system 1000 may be configured to provide "plug-and-play" capability for operating a variety of peripherals without the need to perform manual wiring tasks, such as joining, twisting in, and splicing of wires to connect the peripherals to an electrical box. More specifically, cable system 300 may be connected to host device 100 which, in turn, secures and automatically distributes power to client device 200. Client device 200 combines a peripheral with further electrical components configured to interface with similar components in host device 100 to create an electrical circuit between cable system 300 and client device 200 suitable for operating that particular peripheral, as later described in more detail. As later described in more detail, various components of system 1000 may be independently configurable to form a plurality of electrical circuits between cable system 300, host device 100, and client device 200 to accommodate operation of a plurality of functional assemblies with a plurality of cable system 300 configurations.

Host Device 100

Figure 2:
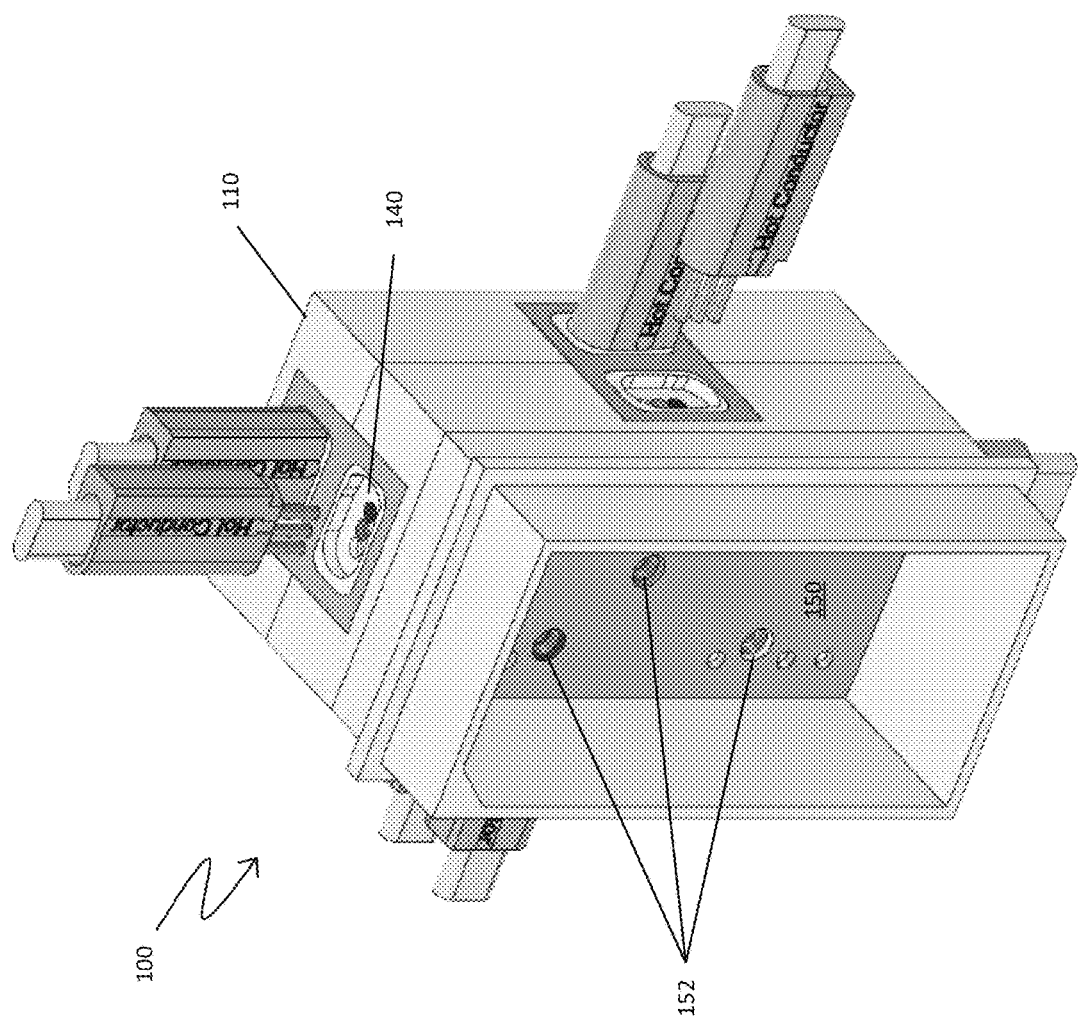
FIG. 2 illustrates a representative embodiment of host device, in accordance with an embodiment of the present disclosure.

FIG. 2 illustrates a representative embodiment of host device 100. Host device 100, in various embodiments, may generally include a housing 110, a host electrical coupler 120 (later shown), a host bus 130 (later shown), and one or more cable electrical couplers 140. Generally speaking, host device 100 is configured to be installed in a wall or other structure and to act as an interface through which to distribute power from cable system 300 to client device 200 when client device 200 is inserted into host device 100. As shown, host device 100 may be divided into two compartments by interface wall 150, with the rear compartment 113 (later shown) housing electrical components such as host electrical coupler 120, host bus 130, and cable electrical couplers 140 and the front compartment 114 (later shown) configured to receive and accommodate a compatible client device 200. When client device 200 is inserted into the front compartment 114, components of client device 200 may be placed into electrical communication with host electrical coupler 120 situated in the rear compartment through ports 152 in interface wall 150, and thereby complete an electrical circuit between client device 200 and cable system 300, as later described in more detail.

Figure 3A:
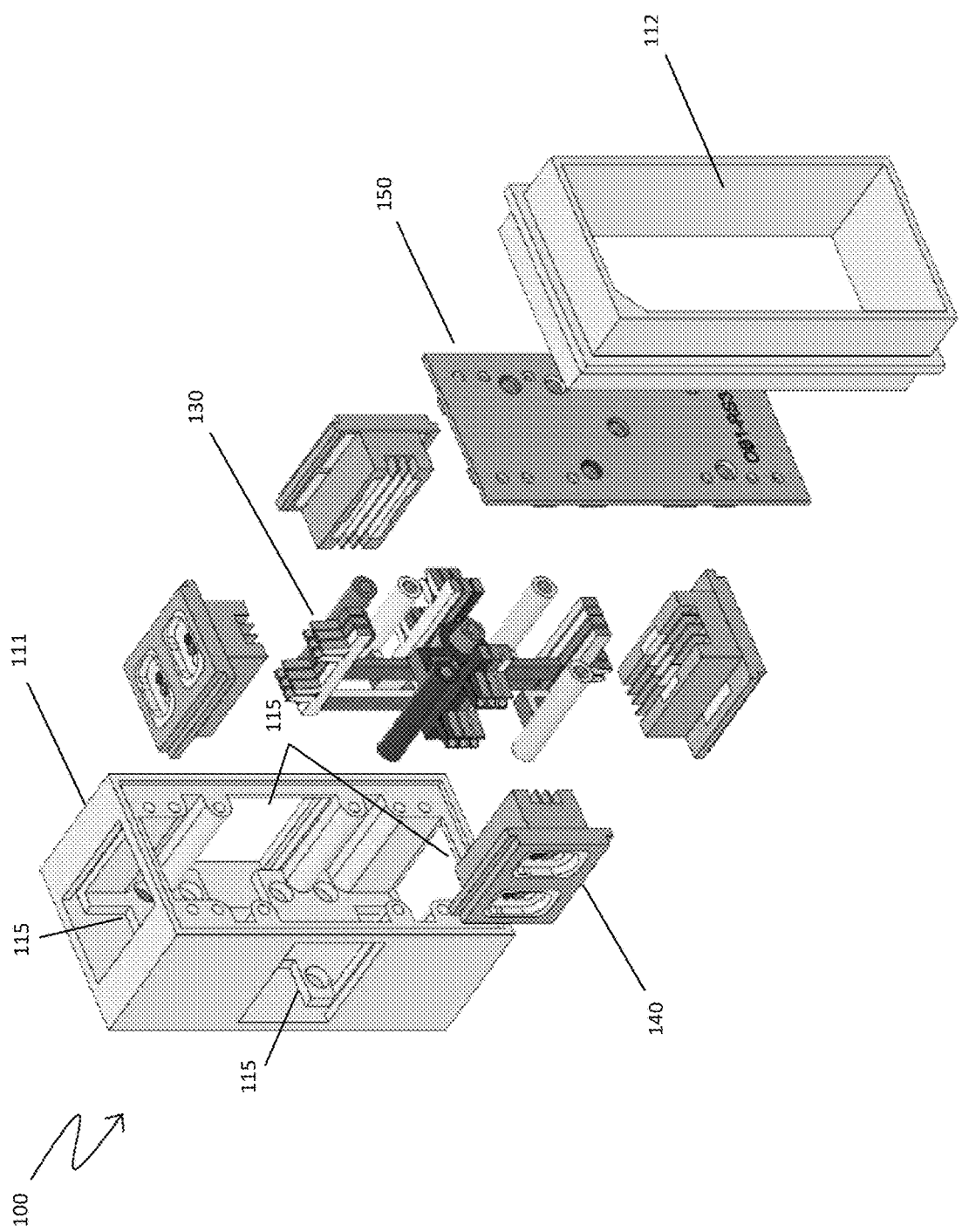
FIG. 3A and FIG. 3B show exploded views of a host device, in accordance with an embodiment of the present disclosure.
Figure 3B:
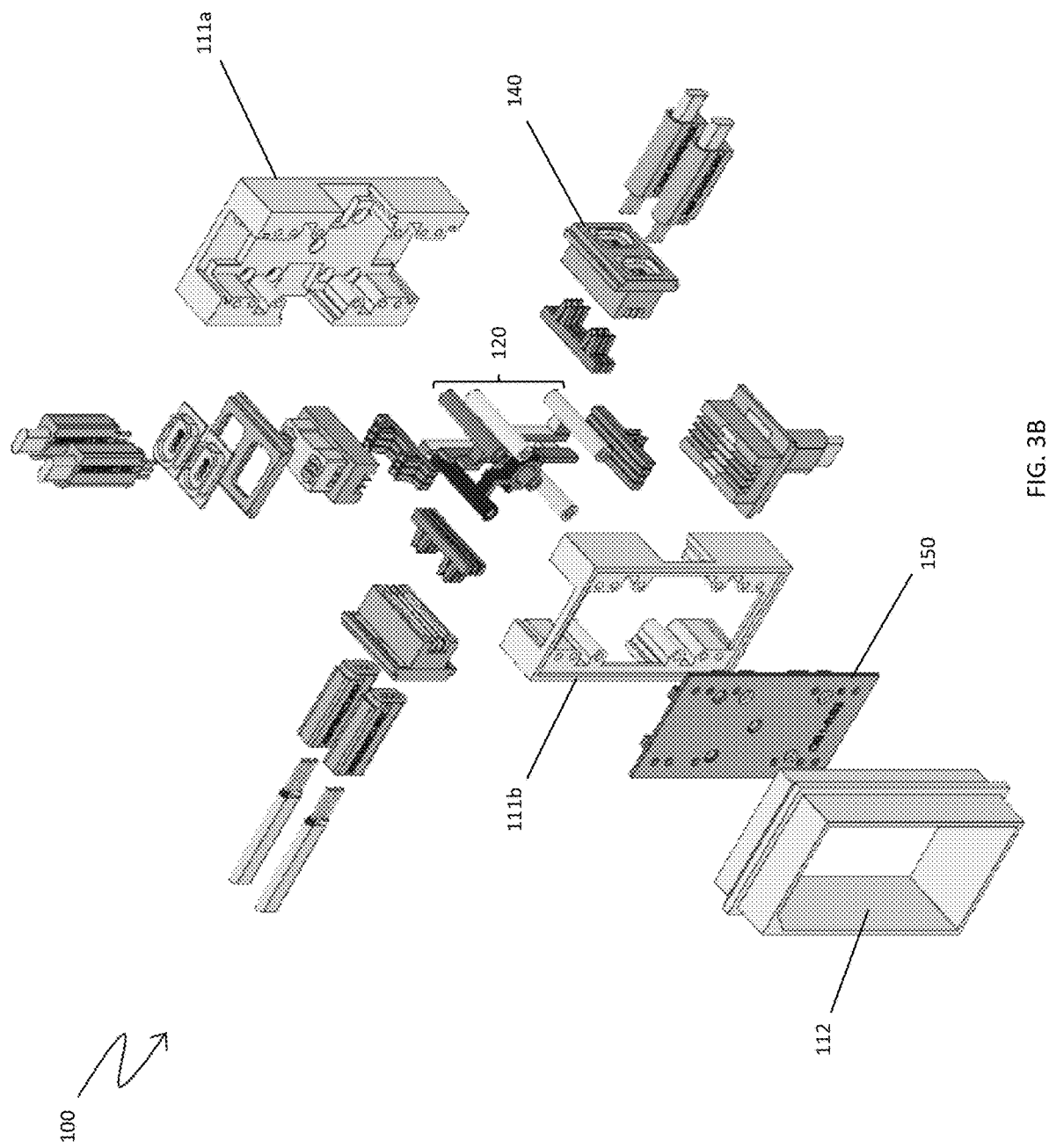

FIG. 3A and FIG. 3B show exploded views of host device 100. These illustration highlight the modularity of the system 1000, including the ability to independently configure host device 100 with various configurations of host bus 130 for combination with various combinations and configurations of host electrical coupler 120 and cable electrical couplers 140. Depending on the particular configurations and combinations of host electrical coupler 120, host bus 130, and cable electrical couplers 140, host device 100 may serve as either a purpose-specific or universal power distribution module for client devices 200 to be plugged into and out of it, thus forming, repurposing, or replacing a desired functionality of an outlet assembly. Likewise, the modular and independently configurable design of host device 100 may allow for manufacturing several different purpose-specific or universal power distribution modules using common components amongst the modules, albeit in varying numbers, configurations, and combinations, thereby streamlining the manufacturing process and reducing costs. Representative examples of system 1000 embodying varying configurations and combinations of host electrical coupler 120, host bus 130, and cable electrical couplers 140 are later illustrated and described with reference to FIGS. 30-34.

Housing 110

Still referring to FIG. 3A and FIG. 3B, the drawings show exploded views of host device 100. As shown, housing 110, in various embodiments, may include separable sections including a rear housing 111 configured to house host electrical coupler 120, host bus 130, and cable electrical couplers 140, and a front housing 112 configured to accommodate client device 200. Rear housing 111, in various embodiments, may include cutouts 115 for accommodating the one or more cable electrical couplers 140 through its side walls. Interface wall 150 may be situated between rear housing 111 and front housing 112 to separate rear compartment 113 formed within rear housing 111 and front compartment 114 formed by front housing 112.

Referring to the embodiment of FIG. 3A, housing 110 may be assembled by first positioning host electrical coupler 120 and host bus 130 within rear housing 111 and then inserting cable electrical couplers 140 through cutouts 115, taking care to connect components of host bus 130 with corresponding components of cable electrical couplers 140 as later described in more detail. As shown, in some embodiments, host electrical coupler 120 and host bus 130 can be provided as an assembly while, in other embodiments, host electrical coupler 120 and host bus 130 may be provided as separate components. For ease of description, the present disclosure may refer to these components in the context of them being provided pre-connected (or formed as one piece) from a manufacturer; however, it should be understood that the present disclosure is not intended to be limited as such.

Interface wall 150 may then be coupled to the front surface of rear housing 111 and, in an embodiment in which host electrical coupler 120 comprises one or more socket-like contacts 122, taking care to align front and rear ends of contacts 122 with supports 117 of rear housing 111 and ports 152 of interface housing, as later described in more detail, and then front housing 112 can be joined to the front of that assembly. As configured, each contact 122 may be aligned with a corresponding port 152 in interface wall 150 as further described herein.

Referring to the embodiment of FIG. 3B, rear housing 111 may itself be separated into further sections 111a and 111b, which may facilitate assembly of host device 100. Rather than assembling host electrical coupler 120, host bus 130, and cable electrical couplers 140 within the confines of rear housing 111 as previously described, here host electrical coupler 120, host bus 130, and cable electrical couplers 140 may be assembled together and subsequently installed into rear housing 111 by joining rear housing sections 111a, 111b together around the assembly to form rear housing 111. Interface wall 150 may then be coupled to the front surface of rear housing 111, taking care to align front and rear ends of contacts 122 with supports 117 of rear housing 111 and ports 152 of interface housing, as later described in more detail, and then front housing 112 can be joined to the front of that assembly. As configured, each contact 122 of host electrical coupler 120 may be aligned with a corresponding port 152 in interface wall 150 as further described herein.

Figure 4C:
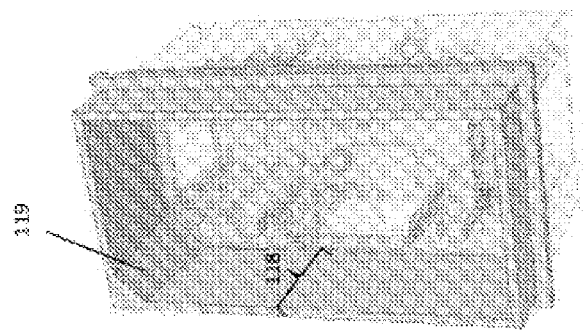
FIG. 4A, FIG. 4B, and FIG. 4C illustrate a housing of a host device, in accordance with an embodiment of the present disclosure.
Figure 4B:
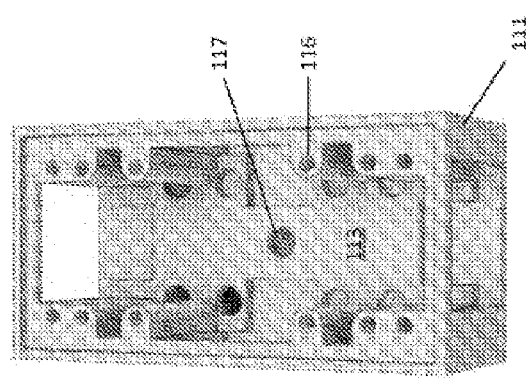
Figure 4A:
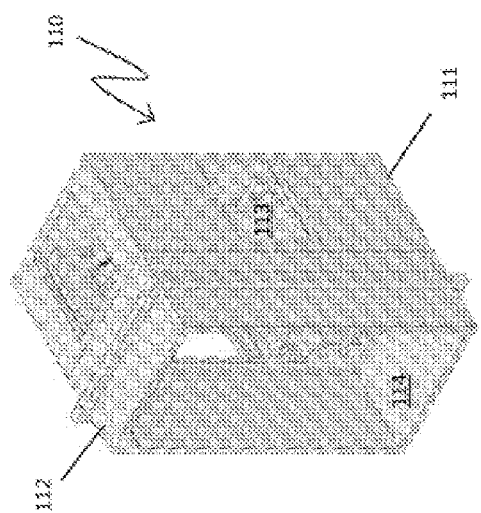

FIG. 4A, FIG. 4B, and FIG. 4C illustrate further views housing 110 in accordance with various embodiments of the present disclosure. Referring first to FIG. 4A, when assembled, rear housing 111 may define a rear compartment 113 of host device 110 for accommodating host electrical coupler 120, host bus 130, and cable electrical couplers 140, and front housing 112 may define a front compartment 114 of host device 100 for accommodating client device 200. Referring now to FIG. 4B, rear housing 111 may include one or more coupler interfaces 116 (shown here as screw anchors) for use in securing interface wall 150 against the front, open face of rear housing 111, as well as for allowing to additionally secure client device 200 to host device 100. Rear housing 111 may further include one or more supports 117, shown here as recessed cutouts in a rear wall of rear housing 111, for supporting contacts 122 (e.g., sockets) of host electrical coupler 120 within rear compartment 111, as later described in more detail. Referring now to FIG. 4C, front housing 112, in various embodiments, may have a similar planform shape and size as rear housing 111 and client device 200, as well as a depth dimension 118 suitable for accommodating client device 200 within front compartment 114 when client device 200 is inserted into host device 100. In various embodiments, front housing 112 may have only slightly larger internal planform dimensions than the external planform dimensions of client device 200 so as to provide a snug friction fit between an inner surface of front housing 112 and a matching outer surface of client device 200. Front housing 111, in an embodiment, may also include a keying feature 119 (shown here as a corner chamfer) configured to align with a complementary keying feature 219 (later shown) on client device 200. In operation, keying features 119 and 219 may serve to prevent client device 200 from being inserted into front compartment 114 in an incorrect orientation (e.g., upside down about a horizontal axis, or sideways about a vertical axis) and thereby ensure that contacts 232 (not shown) of client device 200 align with the correct contacts 122 of host electrical coupler 120 situated in rear compartment 113 for a particular application. Additionally or alternatively, system 1000 may be configured to similar effect by arranging contacts 232 and ports 152 of interface wall 150 such that they align only if client device 200 is in the correct orientation relative to host device 100.

Figure 4D:
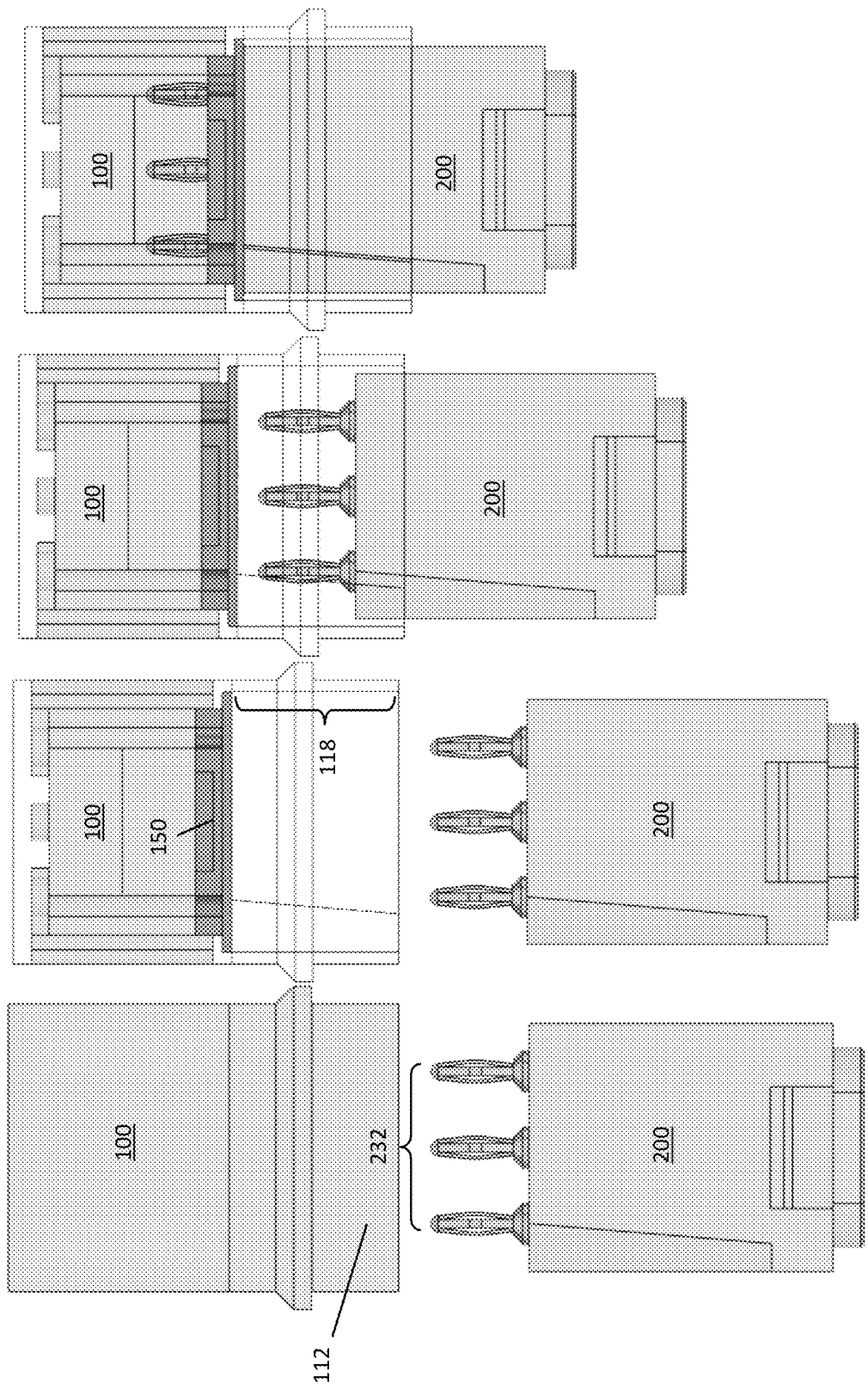
FIG. 4D illustrates a safety feature of a host device, in accordance with an embodiment of the present disclosure.

FIG. 4D illustrates a safety feature of host device 100 that may protect the user from potential electrical shock while inserting and removing client device 200. As shown, there are times when client device 200 is partially inserted or partially removed from host device 100 that distal portions of contacts 232 are in contact with contacts 122 of host electrical coupler 120 and proximal portions remain exposed, presenting a risk of electrical shock if the user were to touch the exposed proximal portions of contacts 232 during these times. Despite disclosing a tool 600 herein (later shown and described) that would mitigate this risk by distancing the user's hand from client device 200, it is foreseeable that many users may opt to use their hand to directly grip client device 200 for insertion and removal. In such cases, the user's fingers may extend down the sides of client device 200 and perhaps past a rear face 216 of housing 210 (later shown), thereby putting them in close proximity to the exposed proximal portions of contacts 232. To avoid such situations, front housing 112, in various embodiments, may have a depth dimension 118 sufficient to shield the user's fingers from contacting the exposed portions of contacts 232 at all times during which contacts 232 are in contact with contacts 122 of host electrical coupler 120. Stated otherwise, depth dimension 118 of housing 112 may be at least as long as contacts 232 such that a front edge of housing 112 meets or overlaps with a rear edge of client 200 by the time contacts 232 reach contacts 122 during insertion and likewise as contacts 232 withdraw from contacts 122 during removal.

Interface Wall 150

Figure 5B:
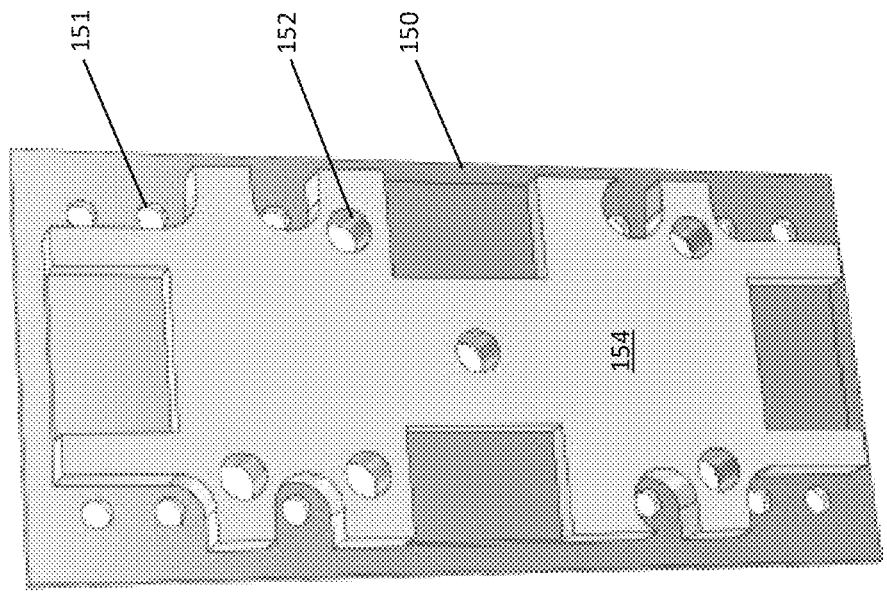
FIG. 5A and FIG. 5B illustrate front and rear views of an interface wall, in accordance with an embodiment of the present disclosure.
Figure 5A:
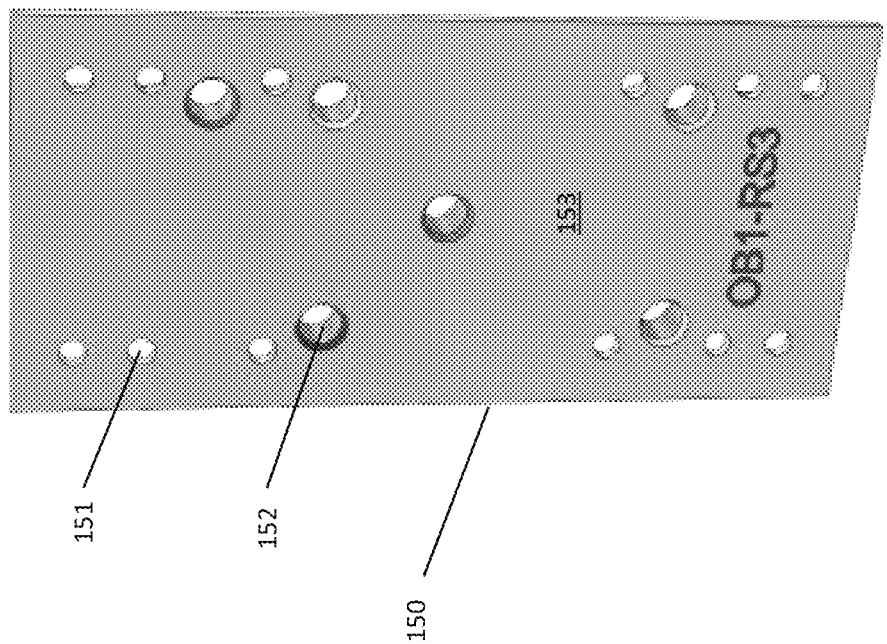

FIG. 5A and FIG. 5B illustrate front and rear views of interface wall 150 in accordance with embodiments of the present disclosure. Interface wall 150, in various embodiments, may be positioned between rear housing 111 and front housing 112 so as to separate rear compartment 113 and front compartment 114 from one another. As configured, interface wall 150 may form a barrier between rear compartment 113 and front compartment 114 that prevents a user from touching potentially dangerous electrical components housed in rear compartment 113 (e.g., host electrical coupler 120, host bus 130, and cable electrical couplers 140) when inserting or removing client device 200 or when otherwise accessing front compartment 114 of host device 100 as installed in the wall or structure. To that end, in various embodiments, interface wall 150 may be constructed of an electrically non-conductive material, as well as to avoid short circuiting host electrical coupler 120, whose contacts 122 may contact a rear surface 154 of interface wall 150 in various embodiments. Interface wall 150, in an embodiment, may include one or more coupler interfaces 151 (shown here as screw holes) complementing coupler interfaces 116 of rear housing 111 for securing interface wall 150 against an open face of rear housing 111, as well as allowing to additionally secure client device 200 to host device 100 via optional screws, by supporting client device against applied lateral forces, such as those that may be applied to peripheral 220 by a user when operating peripheral 220 (e.g., inserting or removing a plug in an electrical outlet 220).

Interface wall 150, in various embodiments, may include one or more ports 152 through which one or more contacts 232 of client electrical coupler 230 may pass to engage contacts 122 of host electrical coupler 120 positioned within rear compartment 113. Ports 152, in various embodiments, may be provided in any suitable number and arrangement to permit contacts 232 of client electrical coupler 230 to engage corresponding contacts 122 of host electrical coupler 120 to complete a circuit suitable for a particular application. The particular number and arrangement of ports 152 on interface wall 150 may be determined by the particular manufacturer of the host device 100 and may vary from one manufacturer to another, but in any event should correspond with the predetermined electrical connections to be formed between contacts 122 of host electrical coupler 120 and contacts 232 of client electrical coupler 230 needed to complete a circuit suitable for operating a particular client device(s) 200. Preferably, ports 152 in interface wall 150 are of a size and shape configured to prevent a user's (or child's) finger from extending into port 152, where it may potentially contact contacts 122 and potentially result in a dangerous electric shock.

In various embodiments, ports 152 may further act as supports for supporting host electrical coupler 120 within rear compartment 113. In particular, a front end of each contact 122 may extend at least partially into a corresponding port 152 and as such be supported in place within rear compartment 113. As previously described, an opposing wall within rear housing 111 (i.e., the rear wall of rear housing 111) may include a corresponding number of supports 117 positioned in mirrored locations so as to support the rear end of each contact 122 in like manner. As configured, the ends of contacts 122—and by extension, host bus 130—can be supported in place within compartment 113 by supports on interface wall 150 and rear housing 111.

Preferably, ports 152 in interface wall 150 are of a size and shape configured to prevent a user's (or child's) finger from extending into port 152, where it may potentially contact contacts 122 and potentially result in a dangerous electric shock. Protection from electric shock hazard associated with ports 152 may also be implemented in additional or alternative ways, such as by placing a default shutter cover (not shown) over all entries into ports 152, such that contacts 122 are not exposed on front side 153 of interface wall 150 until a client device 200 is to be installed. As configured, as contacts 232 of client electrical coupler 230 begin to engage a covered entry, a shutter mechanism inside host device 100 uncovers all entries.

Host Electrical Coupler 120

FIG. 6A, FIG. 6B, and FIG. 6C illustrate front-right, front, and front-left views of a representative host electrical coupler 120, as assembled with host bus 130 of host device 100. Host electrical coupler 120, in various embodiments, may comprise one or more contacts 122. In the embodiment shown, contacts 122 may not be connected to one another, but rather positioned and arranged within rear compartment 113 by host bus 130 or by other structure. In other embodiments (not shown), host electrical coupler 120 may comprise structure connecting contacts 122. Generally speaking, host electrical coupler 120, in various embodiments, may be configured to couple with client electrical coupler 230 to provide an electrical interface defining a plurality of predetermined electrical connections (defined by pairings of contacts 122 with contacts 232) between host device 100 and client device 200.

Figure 7B:
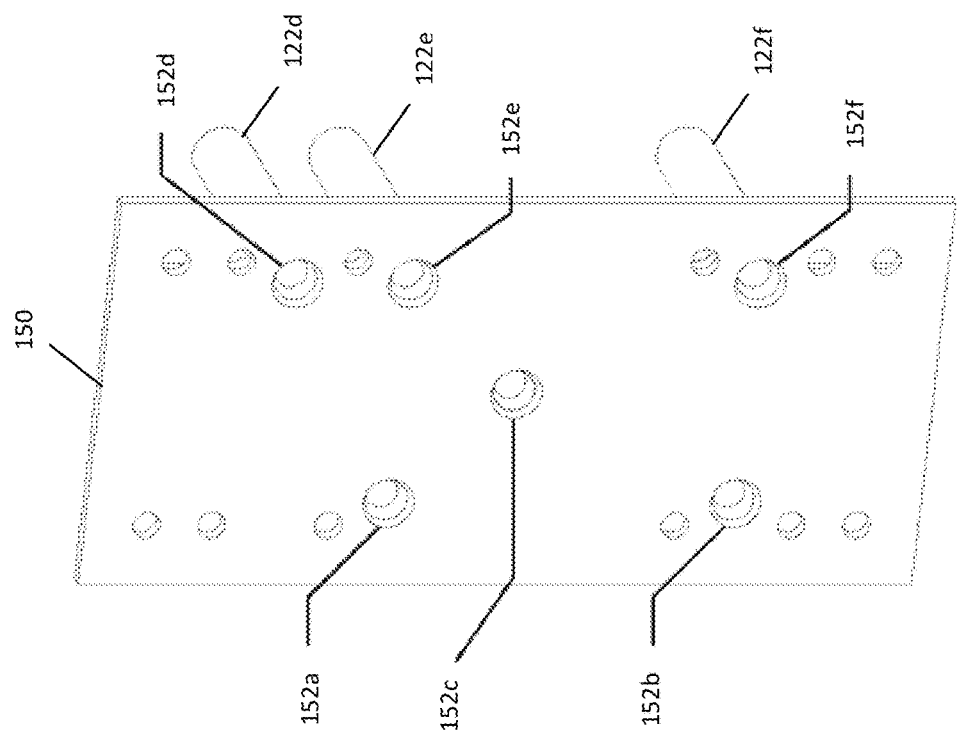
FIG. 7A and FIG. 7B illustrate a host electrical coupler with contacts arranged to align with corresponding ports of an interface wall, in accordance with an embodiment of the present disclosure.
Figure 7A:
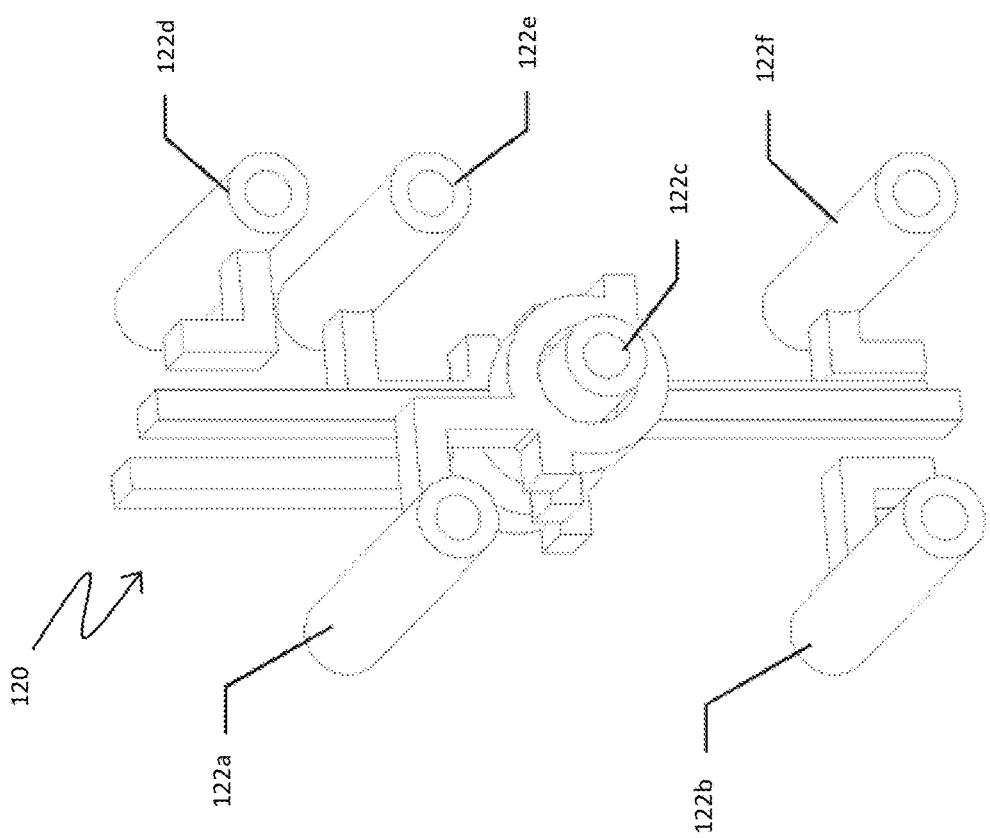

Host electrical coupler 120, in various embodiments, may be situated within rear compartment 113 and positioned such that each contact 122 thereof aligns with a corresponding port 152 of interface wall 150. For example, in the representative embodiment of FIG. 7A and FIG. 7B, host electrical coupler 120 may be configured with contacts 122a, 122b, 122c, 122d, 122e, 122f, each being arranged to alignment with a corresponding port 152a, 152b, 152c, 152d, 152e, 152f, respectively. As configured, when client device 200 is inserted into host device 100, contacts 232 of client electrical coupler 230 will extend through ports 152 and engage contacts 122 of host electrical coupler 120.

Referring back to FIG. 6A, FIG. 6B, and FIG. 6C, in various embodiments, contacts 122 may be sockets having a cylindrical shape, with hollow centers configured to accommodate prong-like embodiments of contacts 232 therein. In an embodiment, an inner diameter of contacts 122 may be substantially equal to an outer diameter of contacts 232, or otherwise dimensioned and configured to promote physical contact between an inner surface of contacts 122 and an outer surface of contacts 232 and thus ensure a robust electrical connection between the two. Such a configuration may also create a friction fit between contacts 232 and contacts 122 and thereby help secure client device 200 within front compartment 114 of host device 100.

Contacts 122, in various embodiments, may have length dimensions that span the depth of rear compartment 113, such that the ends of contacts 122 contact interface wall 150 and the rear wall of rear housing 111 when host bus 130 is installed within rear compartment 113. In some embodiments, compression forces applied to the ends of contacts 122 by interface wall 150 and the rear wall of rear housing 111 may help support contacts 122 in place within rear compartment 113. Additionally or alternatively, in embodiments comprising supports 117 on the rear wall of rear housing 111, contacts 122 may be dimensioned to extend into ports 152 and supports 117 such that contacts 122 are further supported at each end and constrained from shifting position within rear compartment 113. Together, in various embodiments, with support provided by the coupling of bus terminals 133 with cable electrical couplers 140, contacts 122 may serve to robustly secure host bus 130 in place within rear compartment 113.

Contacts 122, in various embodiments, may be formed of or otherwise include an electrically conductive material, such as copper alloy. As such, the ends of contacts 122 and any other portions which may come into contact with rear housing 111 and interface wall 150 when installed within rear compartment 113, in various embodiments, may be coated with or otherwise formed of an electrically non-conductive material. As shown, in an embodiment the entire outer surface of contacts 122 be coated with or formed of an electrically non-conductive material (shown here in yellow, green, black, white, and red), including the circular faces at each end. Conversely, in various embodiments, the electrically conductive material (shown here in copper) may be exposed along the inner surface of contacts 122 so as to establish an electrical connection with contacts 232. In various embodiments, electrically conductive material extends from the contact surface of contacts 122 with contacts 232 and through contact 122 as necessary to join with electrically conductive material of bus members 134 and thus ensure electrical connection between these two components of bus connectors 131.

While the aforementioned features have been described in the context of cylindrical-shaped sockets 122 and prongs 232, the present disclosure is not intended to be limited to only these shapes and one of ordinary skill in the art will recognize other shaped and configurations of contacts 122 and contacts 232 that will provide the same or similar functionality as that described above, including coupling host electrical coupler 120 with client electrical coupler 230 to provide an electrical interface defining predetermined electrical connections between host device 100 and client device 200.

Host Bus 130

Generally speaking, host bus 130 may be independently configurable by a manufacturer (or, in some cases, users) to provide electrical connections between host electrical coupler 120 and cable electrical couplers 140 suitable for a particular application(s). Host bus 130, in various embodiments, may generally include one or more bus connectors 131, each comprising one or more bus terminals 133 and an electrically conductive bus member 134 extending between and connecting bus terminal 133 with a corresponding contact 122 of host electrical coupler 120. Generally speaking, contacts 122 may be situated at one end of bus connectors 131 and configured to interface with contacts 232 of client device 200, and bus terminals 133 are situated at the other end of bus connectors 131 and configured to interface with cables 310 of cable system 300.

FIG. 8 illustrates a representative embodiment of bus terminals 133 of host bus 130. Bus terminals 133, in various embodiments, may be positioned at an opposing end of bus connectors 131 as contacts 122 to interface with cable electrical coupler 140. More specifically, terminals 133 may be configured to be positioned such that each aligns with a corresponding terminal 146 of cable electrical couplers 140 when host bus 130 is assembled and installed within rear compartment 113. As configured, when cable system 300 is connected to host device 100, cable conductors 312 will extend through cable electrical couplers 140 and engage bus terminals 133 of host bus 130.

Bus terminals 133, in various embodiments, may be substantially rigid and include one or more terminal contacts 135 configured to contact and form an electrical connection with cable conductors 312. In the embodiment shown, terminal contacts 135 may have a claw-like shape, with opposing prongs configured to spread apart and apply a clamping force on a corresponding cable conductor 312 of cable 310 when cable system 300 is connected to cable electrical coupler 140. As configured, latches 135 may serve not only to form electrical connections with cable conductors 312, but also to help prevent cable conductors 312 from retracting out of cable electrical coupler 140 or otherwise losing contact with bus terminals 133. Bus terminals 133, in various embodiments, may be configured with multiple contacts 135 distributed along their lengths such that a particular electrical connector can connect to multiple cables 310 as required for a particular circuit. For example, as shown in FIG. 8, some bus terminals 133 may be provided with two electrical contacts 135 positioned at locations along a length of the bus terminal 133 that will align with the two cable electrical couplers of a dual cable electrical coupler 140 when host bus is installed into host device 100.

Bus terminals 133, in various embodiments, may be formed of or otherwise include an electrically conductive material, such as copper alloy. Like contacts 122, in various embodiments, the electrically conductive material may be exposed along surfaces of bus terminals 133 configured to contact cable conductors 312 (e.g., terminal contacts 135), whereas other surfaces of bus terminals 133 that may come into contact with other structures may be coated with or formed of an electrically non-conductive material, so as not to inadvertently create electrical connections should such structures come into contact with bus terminals 133. In the embodiment shown, both sides of each bus terminal 133 are coated with or formed of an electrically non-conductive material (shown here in yellow, green, black, white, and red) to avoid forming an electrical connection should adjacent bus terminals 133 come into contact with one another, whereas electrically conductive material (shown here in copper) remains exposed on terminal contacts 135 so that electrical connections are formed between bus terminals 133 and cable conductors 312.

While terminal contacts 135 are described herein as having a claw-like shape, the present disclosure is not intended to be limited only to such a shape and one of ordinary skill in the art will recognize other shapes of bus terminals 133 suitable for clamping onto cable conductors 312 in a manner that will provide the same or similar functionality as that described herein. Further, while terminal contacts 135 are described as being configured to clamp onto cable conductors 312, in various embodiments, other shapes and designs may be used to help physically secure cable conductors 312 to bus terminals 133 by non-clamping means.

Bus members 134, in various embodiments, provide an electrical connection between contacts 122 and bus terminals 133 of respective bus connectors 131. Bus members 134, in various embodiments, provide an electrical connection between contacts 122 of host electrical coupler 120 and bus terminals 133 of respective bus connectors 131. Additionally, in some embodiments, bus members 134 may serve to position contacts 122 of host electrical coupler 120 to align with contacts 232 of client electrical coupler 230, as well as serve to position bus terminals 133 to contact particular conductors (e.g., wires) of a particular cable 310 at a particular cable electrical coupler(s) 240 when installed in rear housing 111, as later described in more detail. As configured, embodiments of host bus 130 of the present disclosure may be independently configurable to provide electrical connections within host device 100 suitable for a specific designation of host bus 130. Further, bus members 134, in various embodiments, may be substantially rigid and shaped to provide physical properties that may facilitate the manufacture, assembly, installation, and reconfiguration of host bus 130, as further described herein.

With continued reference to FIG. 6A, FIG. 6B, and FIG. 6C, bus members 134, in various embodiments, may be formed of an electrically conductive material suitable for providing electrical connections between contacts 122 and bus terminals 133 of bus connectors 131, such as copper alloy. Further, in various embodiments, bus members 134 may be substantially rigid and have an elongated shape suitable for physically connecting contacts 122 and bus terminals 133 while providing overall rigidity and structural robustness to each bus connector 131. As such, bus members 134 largely define an overall shape of each bus connector 131, and the shape of each bus connector 131 may be configured to define the particular contacts 232 and cable electrical couplers 140 with which each bus connector 131 will interface. Stated otherwise, bus members 134 may each be shaped such that, when host bus 130 is assembled and installed in rear compartment 113, each corresponding bus connector 131 positions its respective contact 122 and bus terminal(s) 133 where they will interface with the particular contact 232 and cable electrical coupler terminal 146 required to establish the particular electrical connection assigned to that particular bus connector 131 as part of the overall electrical circuit to be created between client device 200 and electrical system 300.

As shown in FIG. 8, in various embodiments, bus connectors 131 may be shaped to position multiple bus terminals 133 within a small footprint such that multiple electrical connectors 131 may access a single cable electrical coupler 140. In particular, in various embodiments, bus members 134 may be shaped to compactly stack their respective bus terminals 133 in several planes offset and parallel to one another and in alignment with the corresponding cable electrical coupler terminals 146 to which they will interface. As configured, host bus 130 can be easily connected to cable electrical coupler(s) 140 while assembling host device 100. Further, as previously noted, this feature can simplify the process of wiring up host device 100, as now cable system 300, with its multi-wired cables 310, can be used to supply all power, neutral, and ground connections required for a particular application into a single cable that can be easily inserted into cable electrical coupler 140 without performing any manual wiring tasks, along with other associated benefits described herein.

Bus connectors 131, in various embodiments, may be configured to follow non-intersecting paths within rear compartment 113 so as not to interfere with one another. To that end, in various embodiments, the various bus members 134 may be shaped such that each bus connector 131 primarily occupies its own lateral plane and/or longitudinal plane, each being offset and parallel to one another, within rear compartment 113. For example, in FIG. 6A, FIG. 6B, and FIG. 6C, bus connectors 131a, 131b, 131c, 131d, 131e largely occupy separate lateral planes (i.e., each bus member 134 running up/down in the figure is offset from one another in a left/right direction) as well as separate vertical planes (i.e., each bus member 134 running left/right in the figure is offset from one another in an up/down direction). Further, in various embodiments, the various bus members 134 of bus connectors 131 may largely occupy separate lateral and vertical planes throughout the depth of rear compartment 113 (i.e., each bus member 134 running left/right or up/down in the figure is offset from one another in a direction moving in/out of the figure).

In some cases though, bus terminal(s) 133 and contact 122 associated with a given bus connector 131 must be positioned in different planes, such that portions of the bus connector 131 occupy more than one of the offset and parallel planes oriented in a particular direction. Because, in some embodiments, contacts 122 may span an entire depth of rear compartment 131, they may interfere with a path needed to be taken by the given bus connector 131. In various embodiments, the corresponding bus member 134 may be shaped to circumvent an interfering contact 122 by following an arced path around the interfering contact 122 (not shown). While this may suffice, the arced portion of the bus member 131 may become a relative structural weak point in the electrical connector, potentially allowing the bus member to bend and contact an adjacent structure, causing a short circuit or other unintended electrical consequence. Further, a weakened electrical connector may require extra support beyond that provided by the physical connections of contact 122 and bus terminal(s) 140 made with interface wall 150/rear housing 111 and cable electrical coupler(s) 140, respectively. Still further, it may be necessary to brand off further terminal connections not accessible from the arced portion. Overcoming this, in an embodiment, bus member 134 may include a circular portion sized and positioned to circumnavigate the interfering contact 122 and accommodate it through center, thereby avoiding contact with the intervening contact 122 while maintaining a profile that has sufficient bending stiffness to where the bus connector 131 can maintain its shape and be supported by its ends within rear compartment 113 as previously described. The exact designs of host buses 130 will depend on the type of a host device 100 and its purpose and thus, will be open to manufacturers to finalize and may differ from the example embodiments described herein.

Together these features of bus connectors 131, in various embodiments, provide for electrical connectors to stack and nest with one another as shown in FIG. 6A, FIG. 6B, and FIG. 6C. As configured, host buses 130 of the present disclosure may be independently configurable to create numerous different circuits for use with a wide variety of client devices 200 simply by assembling different combinations of bus connectors 131 for corresponding applications. Further, the stackable design allows for multiple bus connectors 131 to be packaged into a compact assembly, thereby allowing host device 100 to maintain dimensions similar to those of traditional electrical boxes while still accommodating various configurations of host bus 130 and providing the versatility for host device 100 to be used with numerous different types of client devices 200. Still further, the stackable design of host bus 130 allows several bus terminals 133 to be placed in close proximity to one another at a single cable electrical coupler 140, which, in turn, allows system 1000 to utilize cable system 300 and thereby benefit from the associated advantages further described herein, as well as allow each bus connector 131 to easily connect to and disconnect from cable electrical couplers 140, thereby making assembly and reconfiguration easier and also providing additional physical contact points for supporting host bus 310 within rear compartment 113 of host device 100. Further yet, the coupling functionality afforded by the shape of terminal contacts 135 helps secure and maintain contact with cable conductors 312 of cables 310.

While host bus 130 of the present disclosure has been described in the context of the representative embodiment shown in FIGS. 6A-8, it should be recognized that the present disclosure is not intended to be limited to only buses of this construction. For example, more traditional wired buses may be used and still accomplish the objective of allowing manufacturers to independently configure host bus 310 to form electrical connections between host electrical coupler 120 and cable electrical coupler(s) 140 to form an electrical circuit suitable for delivering power from cable 310 to a peripheral of client device, via the predetermined electrical connections defined at the first and second electrical interfaces connecting the cable, the host device, and the client device.

Cable Electrical Couplers 140

Generally speaking, cable electrical coupler 140, in various embodiments, may provide physical and electrical connections between host bus 130 and cable system 300. In various embodiments, cable electrical coupler 140 may be configured to provide physical protection and secure, safe termination of cable conductor 312 ends, as they enter host housing 110; to provide separate and insulated passages (referred to herein as cable electrical coupler terminals) for individual cable conductor 312, as they engage with host bus 130; and to facilitate a proper tightening and locking of the cable conductor 312 ends at the destination bus terminal contacts 135, to ensure a safe and reliable electrical connection is established between them. Additionally or alternatively, as later described, in various embodiments, cable electrical coupler 140 may be configured to secure cable 310 to host device 100 via friction fit or other coupling means.

Figure 9B:
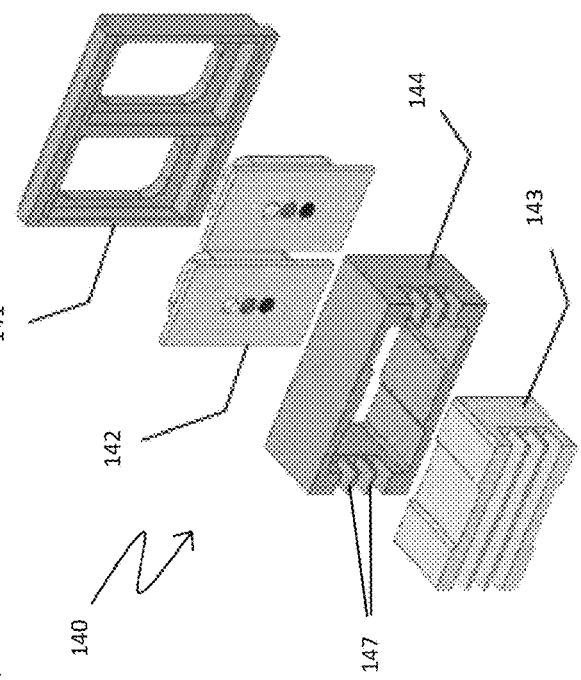
FIG. 9B and FIG. 9C illustrate front and rear exploded views of a representative cable electrical coupler, in accordance with an embodiment of the present disclosure.
Figure 9C:
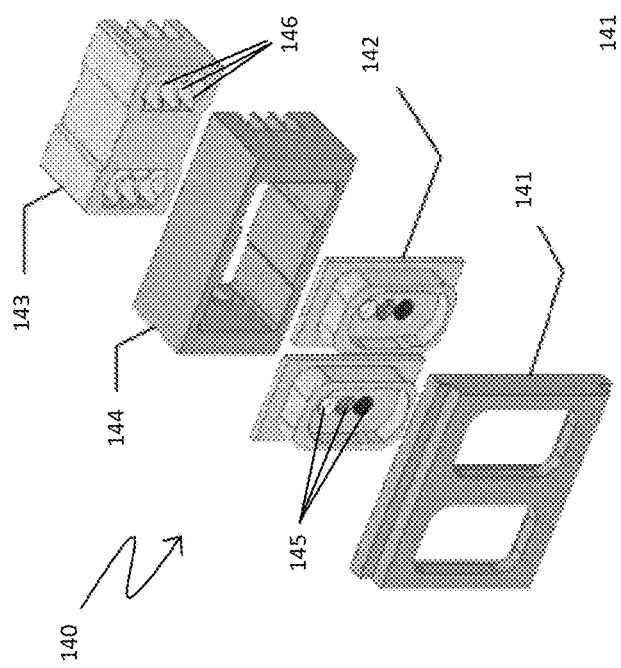
Figure 9A:
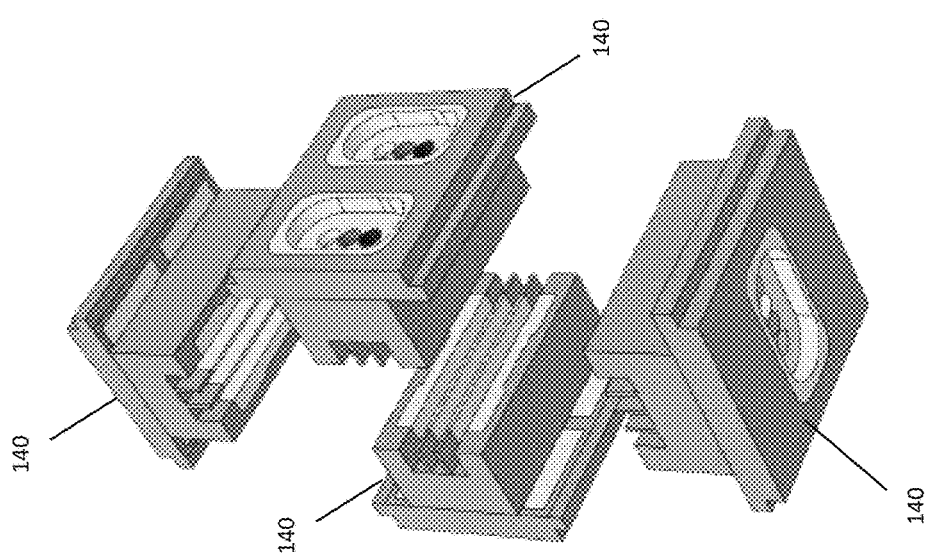
FIG. 9A illustrates four separate cable electrical couplers arranged in 3-D space as they might be installed in a rear housing of a host device, in accordance with an embodiment of the present disclosure.

FIG. 9A illustrates four separate cable electrical couplers 140 arranged in 3-D space as they might be installed in rear housing 111 of host device 100, and FIG. 9B and FIG. 9C illustrate front and rear exploded views of a representative cable electrical coupler 140 of host device 100. Cable electrical coupler 140, in various embodiments, may generally include a front casing 141, a conductor guide 142, a terminal rack 143, and an outer separator 144.

In various embodiments, cable 310 is inserted into cable electrical coupler 140 through front casing 141 and into cable guide 142, which in various embodiments combine to align exposed cable conductors 312 with ports 145 of cable guide 142 and to, in an embodiment, secure cable system 300 to host device 100 via friction fit, as later described.

As aligned, the exposed cable conductors 312 continue into ports 145 of cable guide 142 and where they are directed into terminal rack 143, where each is directed to the entry point of a corresponding destination terminal 146 inside of rear housing 111. When host bus 130 and cable electrical couplers 140 are assembled together in host device 100, the various terminal contacts 135 are positioned within the various terminals 146 and thus come into contact with exposed cable conductors 312, thereby placing cable 310 into electrical communication with host bus 130. In an embodiment, exposed cable conductors 312 are directed by conductor guides 142 and cable electrical coupler terminals 143 to advance in between the claw-like prongs of terminal contact 145, which clamp on to create a secure connection with cable conductors 312. Terminal rack 143 and terminals 146 thereof, in various embodiments, may be made of an electrically non-conductive material so as to insulate the various terminal connections from one another and from surrounding structure.

Outer separator 144, in various embodiments, fits within cutouts 115 of rear housing 111 and may surround terminal rack 143. In various embodiments, outer separator 144 may work in concert with terminal rack 143 to form a support fixture for separating and supporting bus terminals 133 of host bus 130. To that end, in an embodiment, outer separator 144 may include terminal supports 147 configured to align with and laterally extend the slots structures of terminal rack 143 that form cable electrical coupler terminals 143. Together with physical support provided by contacts 122 as previously described, cable electrical couplers 140 may serve to robustly support and secure host bus 130 in place within rear compartment 113 of host device 100.

Client Device 200

Figure 10B:
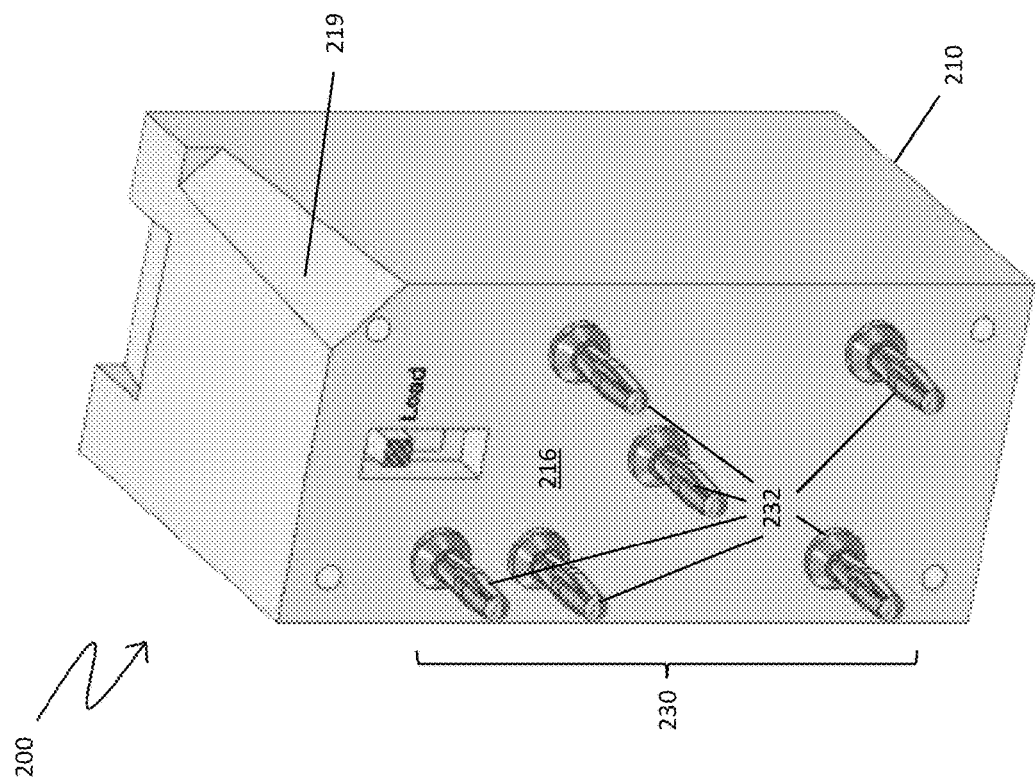
FIG. 10A and FIG. 10B illustrate front and rear views of a client device, in accordance with an embodiment of the present disclosure.

FIG. 10 and FIG. 10B illustrate front and rear views of a representative embodiment of client device 200. Client device 200, in various embodiments, may generally include a housing 210, a peripheral 220, and a client electrical coupler 230 having one or more contacts 232. Generally speaking, housing 210 may be shaped for alignment with and insertion into front compartment 114, and contacts 232 may be configured to provide an electrical interface between peripheral 220 and host device 100. In particular, when client device 200 is inserted into front compartment 114, contacts 232 may connect with host bus 130, and thereby complete an electrical circuit with cable system 300 via host device 100 that is suitable for operating peripheral 220, as later described in more detail.

Like host device 100, in various embodiments, client device 200 is a modular component of system 1000 and may be independently configurable for use with various combinations and configurations of other components of system 100, such as host devices 100 and cable systems 300 depending on a particular application. Peripheral 220 and contacts 232 may be neatly assembled into a single package in housing 110, allowing users to simply insert client device 200 into a compatible host device 100 to operate peripheral 220 without performing any manual wiring tasks. Likewise, the modular design of client device 100 may allow for manufacturing several different purpose-specific or universal client modules using common components amongst the modules, albeit in varying numbers, configurations, and combinations, thereby streamlining the manufacturing process and reducing costs. Such modules may be swapped in and out of compatible host devices 100 to accommodate different peripherals 220 by simply removing the current-inserted client device 200 and inserting a new client device 200 in its place, again without having to perform any manual wiring tasks. Representative examples of client device 200, in varying configurations and in various combinations with host devices 100 and cable systems 300, are later illustrated and described with reference to FIGS. 30-34.

Housing 210

Figure 10A:
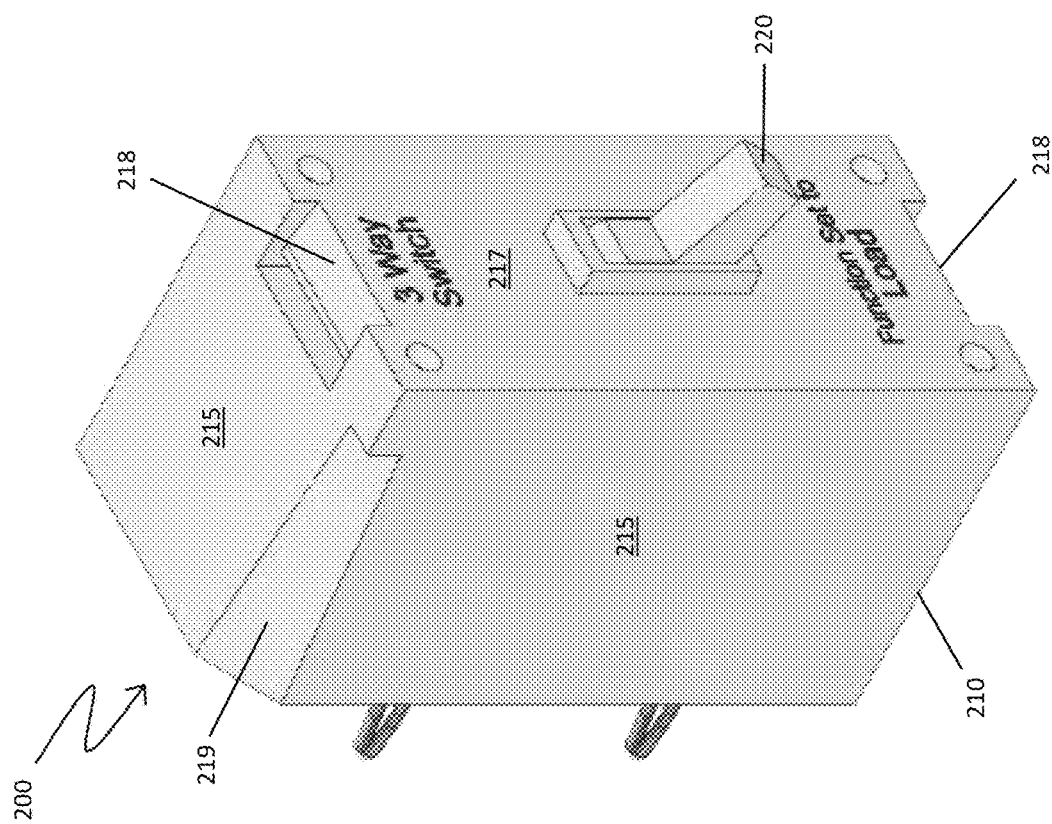

Still referring to FIG. 10A and FIG. 10B, housing 210 of client device 200, in various embodiments, may have a form factor configured to fit within front compartment 114 of host device 100. In the embodiment shown, client device 200 is substantially rectangular with width, height, and depth dimensions substantially equal to those of front compartment 114 and client cutout compartment 503 of mounting frame cover 502 (later shown) installed over and around front compartment 114, so as to fully occupy the interior space between the mounting frame cover 502 and front compartment 114, with its sides 215 flush with the inner wall surfaces of mounting frame cover 502 and front housing 112, its rear face 216 flush with the front side 153 of interface wall 150, and its front face flush with the open face of mounting frame cover 502 installed over front compartment 114. Flush alignment with the walls of front housing 112, in various embodiments, may help secure client device 200 with host device 100 by providing a friction fit as well as by supporting client device against applied lateral forces, such as those that may be applied to peripheral 220 by a user when operating peripheral 220 (e.g., inserting or removing a plug in an electrical outlet 220). Flush alignment with the open face of front compartment 114, in various embodiments, may also help secure client device 200 since the sides of front housing 112 combined with mounting frame cover 502 will fully shield sides 215 from contact resulting in applied lateral forces. Stated otherwise, were housing 210 to extend beyond the open face of mounting frame cover 502 installed over and around front compartment 114, portions of sides 215 would be exposed and could be bumped or otherwise contacted in a way that might dislodge client device 200 from host device 100. Further, secure friction fit of client device 200 and flush alignment of its sides 215 with the walls of front housing 112 of host device 100 may provide for compactly packaging mounting components 500 (later described) around host device 100, thereby minimizing the depth of system 1000 and aligning front of peripheral 220 with the wall or other structure in which host device 100 is installed.

Housing 210, in various embodiments, may also include one or more gripping features 218 for facilitating insertion and/or removal of client device 200 from front compartment 114. Gripping feature(s) 218, in an embodiment, may include one or more recess(es) positioned near the edges of front surface 217 and extending rearward into inner compartment 113. When client device 200 is situated in front compartment 114, recesses 218 in housing 210 may create spaces between sides 215 and the inner walls of mounting frame cover 502 installed over and around front housing 112 into which a tool or a user's fingers could be inserted to grasp client device 200 for removal. This may be particularly helpful in embodiments in which client device 200 has a flush or recessed alignment with the open face of mounting frame cover 502 installed over and around front compartment 114, since the walls of mounting frame cover 502 and front housing 112 would prevent the user from grasping client device 200. Further, by situating recesses 218 near the edges of front surface 217 rather than more central, the recesses 218 can be positioned outside of an area likely to be occupied by peripheral 220 so as not to interfere with placement of peripheral 220 at the front of client 200.

Housing 210, in an embodiment, may include a keying feature 219 (shown here as a corner chamfer) configured to align with a complementary keying feature 119 (previously described) in front housing 112 of host device 100. In operation, keying features 119 and 219 may serve to prevent client device 200 from being inserted into front compartment 114 in an incorrect orientation (e.g., upside down about a horizontal axis, or sideways about a vertical axis) and thereby ensure that contacts 232 of client device 200 align with the correct ports 152 and contacts 122 of host electrical coupler 120 for a particular application. As previously described, additionally or alternatively, system 1000 may be configured to similar effect by arranging contacts 232 and ports 152 of interface wall 150 such that they align only if client device 200 is in the correct orientation relative to host device 100.

Housing 210, in various embodiments, may be formed of separable sections including a rear housing 211 and a front housing 212 configured to join together to form an inner compartment 213 for housing electrical components of client device 200. An assembled client device 200 may be additionally secured to host device 100 via optional screws or other suitable couplers through coupler interfaces 214.

Peripheral 220

Electric peripheral 220, in various embodiments, may include any electrical device requiring power, whether intended to be a fixture in the structure (e.g., a light switch) or intended only to be temporarily inserted in the structure (e.g., for charging a mobile device).

Figure 35A:
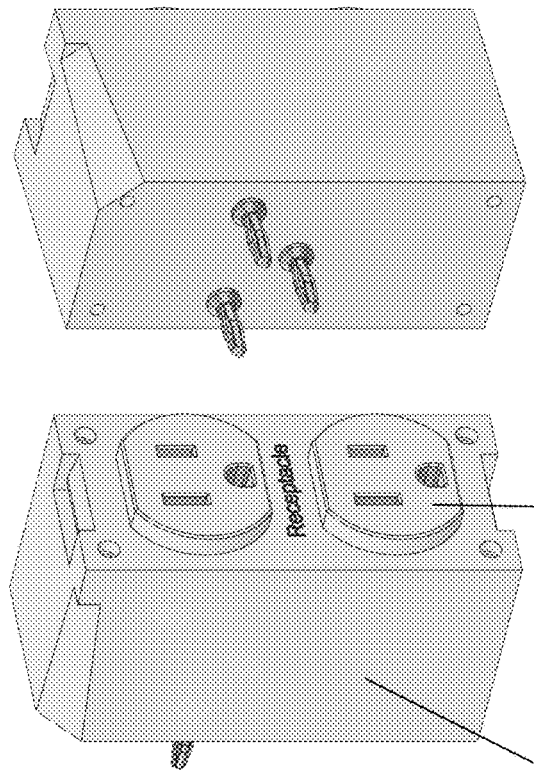
FIG. 35A and FIG. 35B illustrate front and rear views of a conventional dual receptacle outlet and a conventional light switch respectively, in accordance with an embodiment of the present disclosure.
Figure 35B:
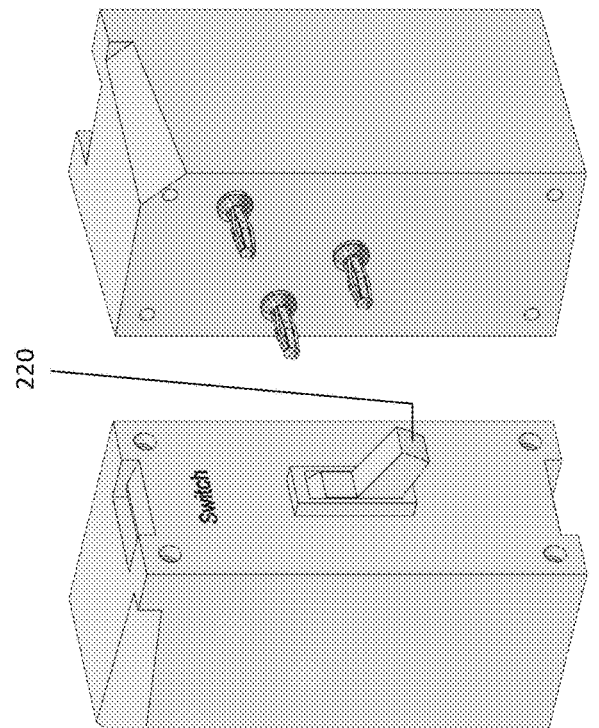

A common type of peripheral 220 is a regular electrical insert, such as a receptacle or a light switch that does not contain additional enhancement of their functionality, such as remote controller, electronics, wireless communication, etc. FIG. 35A and FIG. 35B illustrate front and rear views of a conventional dual receptacle outlet and a conventional light switch respectively, as examples of a common type peripheral 220.

An advanced type peripheral 220 is one that utilizes the intelligence of digital technologies, means of telecommunication, and network connectivity to enable automatic or remote-control functionality of the intended end-use application. The advanced type of peripherals 220 will often integrate proprietary technologies, which may vary from one manufacturer to another. In such cases, some advanced peripherals 220 may be either compatible or incompatible to work with each other under one operating system and may require additional integration solutions. Embodiments of system 1000 described herein are compatible with both common and advanced type clients. FIG. 36A and FIG. 36B illustrate front and rear views of a remotely controllable dual receptacle outlet and a remotely controllable dimmer light switch with touch sensitive buttons respectively, as examples of an advanced type peripheral 220. An advanced type peripheral 220, such as one depicted in FIG. 36A, in various embodiments, may have a similar size and shape as, and in some cases, look identical to a common type peripheral 220, such as one depicted in FIG. 35A, from the outside, although it would have different internal components, which would define its advanced functionality.

An adaptable type peripheral 220 is one that may be of either a common or advanced type described above and has client device 200 with a form factor, which requires at least one compatible adapter for engaging with host device 100 and, in most cases, to fully occupy the designated space within the front compartment 114 and client cutout 503 of mounting frame cover 502, when installed into and engaged with host device 100. FIGS. 11A-11B and FIGS. 12A-12B illustrate front and rear views of representative examples of client devices 200 with adaptable peripheral 220 configured to be inserted into compatible adapters 240 and 250.

The purpose of presenting client devices 200 with either common or advanced type peripherals 220, as well as of varying form factors of adaptable peripherals 220 is to provide third parties an option to segmentize development and production of both proprietary and nonproprietary technologies for integrating and/or mix-and-matching variety of hardware, software, firmware, and service solutions via predetermined interfaces in a given wiring system.

Many representative embodiments of common, advanced, and adaptable peripheral 220 are later shown and described in FIG. 12, FIG. 14, FIG. 27, and FIG. 36.

Client Electrical Coupler 230

Client electrical coupler 230, in various embodiments, may comprise one or more contacts 232. Each contact 232, in various embodiments, may be any elongated member configured to contact a corresponding contact 222 of host electrical coupler 220, to thereby place client device 200 into electrical communication with host device 100 via an electrical interface defining a plurality of predetermined electrical connections when client device 200 is inserted into front compartment 114. Generally speaking, contacts 232 are made of an electrically conductive material such as brass alloys and are shaped to fit through ports 152 and within contacts 122 to create a physical and electrical connection.

In various embodiments, contacts 232 may be dimensioned to create a friction fit with contacts 122 and thereby help secure client device 200 to host device 100. In the embodiment shown, contacts 232 have a compressible construction configured to cause contacts 232 to compress upon insertion into ports 152 so as to fit within contacts 122 while simultaneous pressing outwards against the inner surface of contacts 122, which may promote an electrical connection and help secure contacts 232 to contacts 122.

Contacts 232, in various embodiments, may be equal to or shorter than a depth of front compartment 114 of host device 100. As previously described, in some embodiments, the walls of front housing 112 may be dimensioned to shield contacts 232 from contact during times when contacts 232 are in electrical communication with contacts 122. To ensure shielding during all such times, contacts 232 should be equal to or shorter than a depth of front compartment 114; otherwise, the distal ends of contacts 232 may reach contacts 122 prior to the walls 215 of client device 200 reaching the front edges of front housing 112 of host device 100, resulting in an unshielded gap through which a user's fingers could come into contact with energized contacts 232.

Client Adapters 240, 250

System 1000, in various embodiments, may be configured to allow users to later add-on, replace, or otherwise modify the functionality of client devices 200 through the use of a client adapter 240, 250. As previously described, advanced technologies can be incorporated directly into client device 200, however this may not always be desirable to users. In one respect, many such advanced technologies are frequently updated and thus become obsolete or incompatible with other technologies used by the user. Each time this happens, the user may have to purchase a new client device 200 containing both the peripheral 220 and the new advanced technology since both are integrated into a single device. Likewise, if a user wishes to be able to swap in and out two different peripherals 220 (e.g., a USB charging port and an Apple Lightning charging port) at a given host 100, and also wishes to use the same advanced technology to control each (e.g., Amazon Alexa or Apple Siri), the user may have to purchase two smart client devices 200 each containing the advanced technology. This can become costly and frustrating as many users have a need to accommodate many different types of peripherals 220 with many different types of advanced technologies and would potentially have to frequently buy, store, and/or carry many different client devices 200 to have the particular combination of functionality available at any given time.

Various embodiments of system 1000 may be configured to solve this potential issue by providing adapters 240, 250 that interface with client devices 200 and include an adapter peripheral 247 configured to provide advanced technology to the overall system. The interoperability afforded by adapters 240, 250 would allow a user to utilize just one adapter 240, 250 to provide the functionality of adapter peripheral 247 to various compatible clients 200. Stated otherwise, a user may simply swap out one client device 200 containing one type of peripheral 220 for another client device 200 containing another type of peripheral 220 and in both cases leverage the functionality of adapter peripheral 247 in both systems. This would likely be less expensive and burdensome than purchasing and carrying around embodiments of client 200 having both client peripheral 220 and adapter peripheral 247. Further, to the extent a user wishes to be able to utilize the same clients 200 with a different type of advanced technology, the user could do so by simply swapping out one adapter 240, 250 having one type of adapter peripheral 247 for another adapter 240, 250 having another type of adapter peripheral 247 rather than having to buy and carry around a second set of smart client devices 200. Through the use of adapters 240, 250, clients 200 may be independently configurable for multiple uses, as well as with various combinations and configurations of other components of system 100, such as host devices 100 and cable systems 300 depending on a particular application.

As later described in more detail, in various embodiments, adapters 240, 250 may be provided without adapter peripheral 247. In such configurations, pass-through adapter 240 may primarily function as a spacer between a thin client 200 and interface plate 150 such that front face 217 of client 200 is positioned proximate the open face of front compartment 114 as would be the case with a standard size client 200 rather than being significantly recessed within front compartment 114. Interoperability adapter 250, in such cases may primarily function to interface one type of client electrical coupler 230 (e.g., prongs) with a different type of host electrical coupler 120 (e.g., a multi-pin D connector) such that that particular client 200 can operate with that particular host 100 despite having otherwise incompatible electrical couplers 230, 120, respectively.

Figures 11A, 11B:
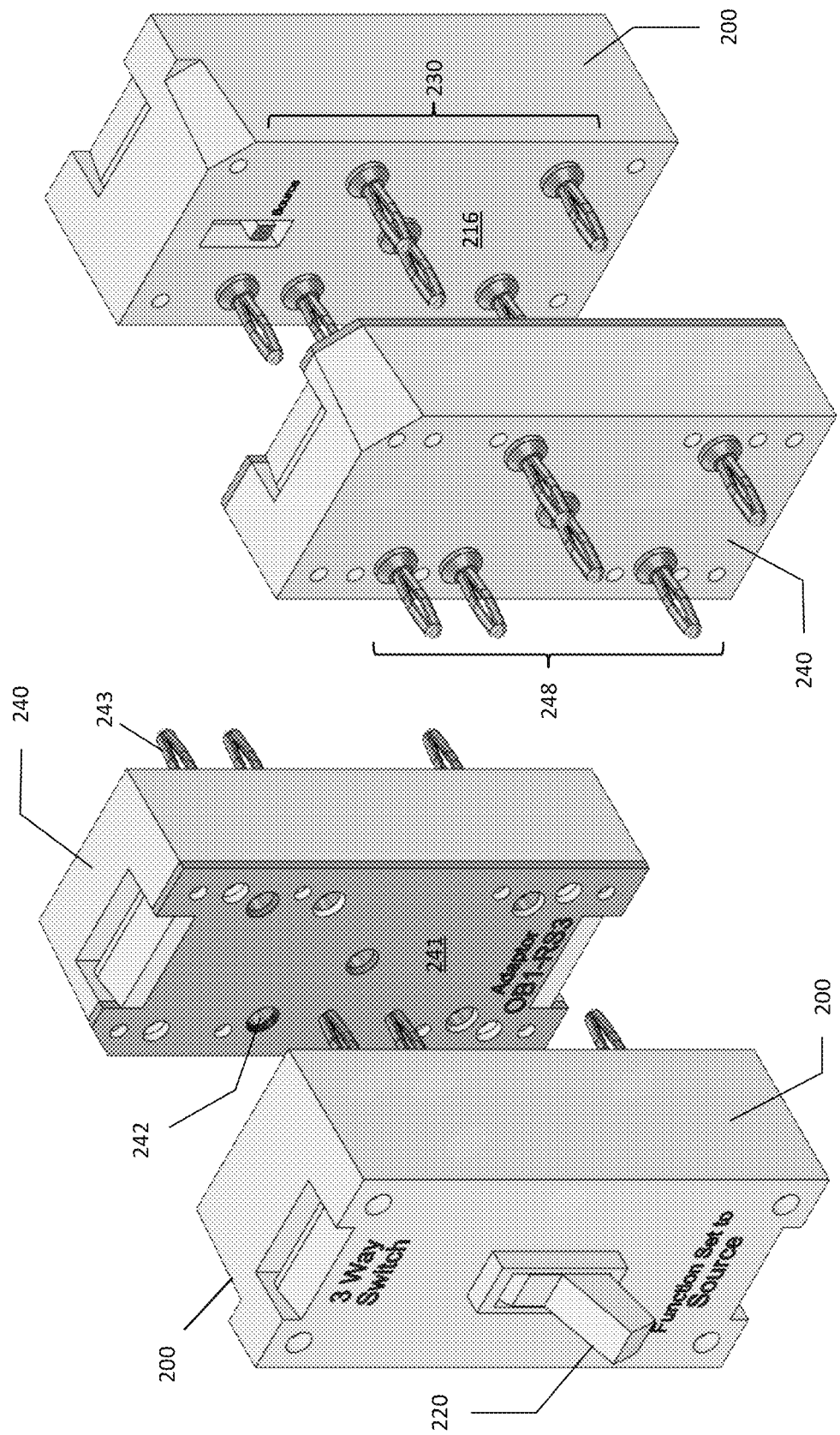
FIG. 11A and FIG. 11B illustrate front and rear views of a pass-through adapter in accordance with an embodiment of the present disclosure.

FIG. 11A and FIG. 11B illustrate front and rear views of a pass-through adapter 240 configured to receive a client device 200. Adapter 240, in various embodiments, may have a similar size and shape as client device 200. To accommodate a client 200 and an adapter 240 within the space provided by front compartment 114, client devices 200 and adapters 240 can each be configured to have thinner profiles than previously described embodiments of client device 200 such that, when nested, client device 200 and adapter 240 combine to fully occupy an entire depth of front compartment 114 and client cutout compartment 503 of mounting frame cover 502 without protruding beyond the open face of mounting frame cover 502 installed over front compartment 114. Adapter 240, in various embodiments, may also include a first adapter electrical coupler 248 comprising one or more contacts 243 that may be similar in construction, number, and pattern as contacts 232 of client electrical coupler 230. As configured, contacts 243 of adapter 240 may be inserted into contacts 122 of host electrical coupler 120 of a compatible host device 100 to provide an electrical interface defining a plurality of predetermined electrical connections between adapter 240 and host device 100.

Figure 11C:
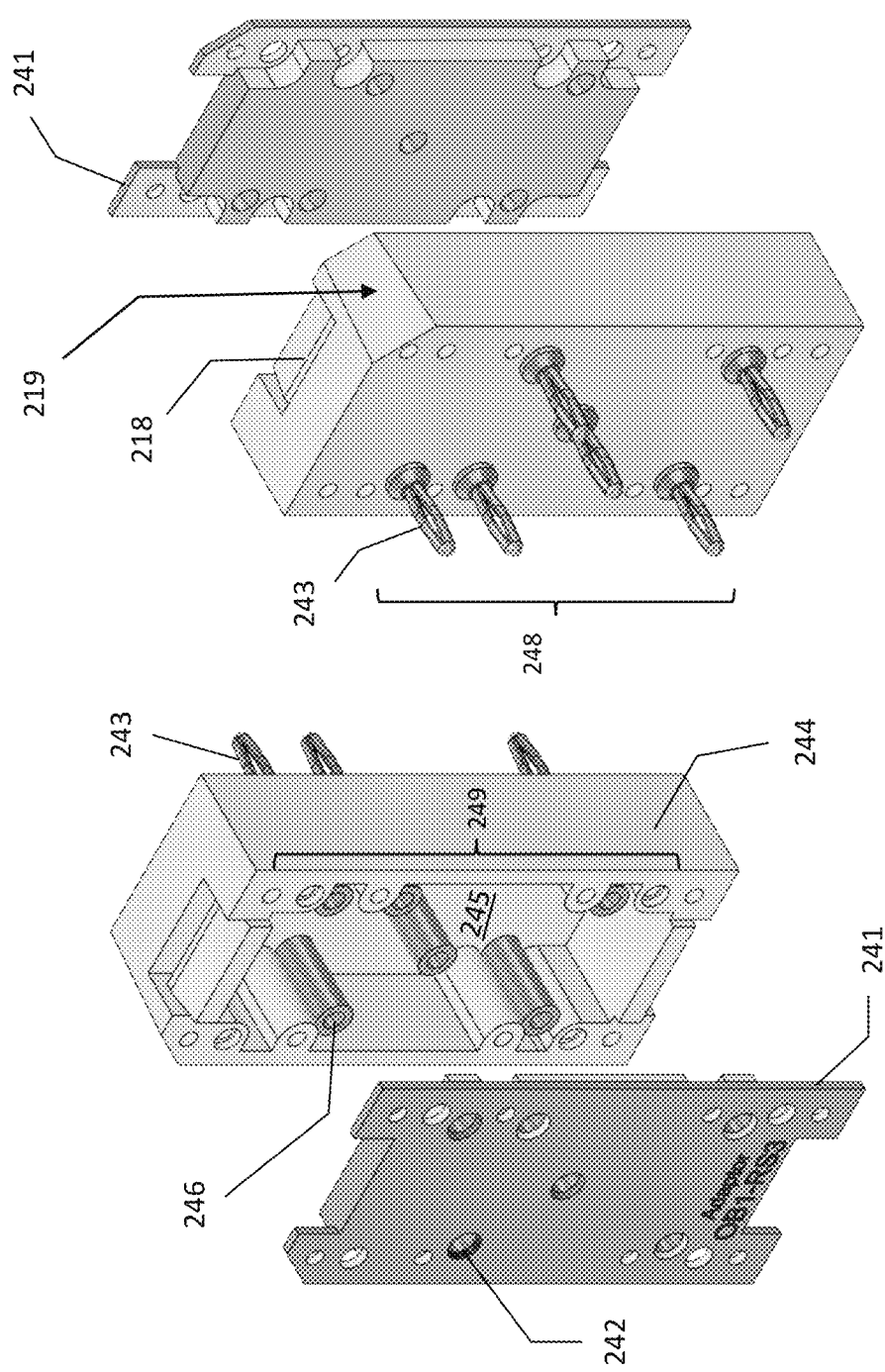
FIG. 11C illustrates front and rear views of a pass-through adapter with interface wall 241 removed in accordance with an embodiment of the present disclosure.
Figures 12A, 12B:
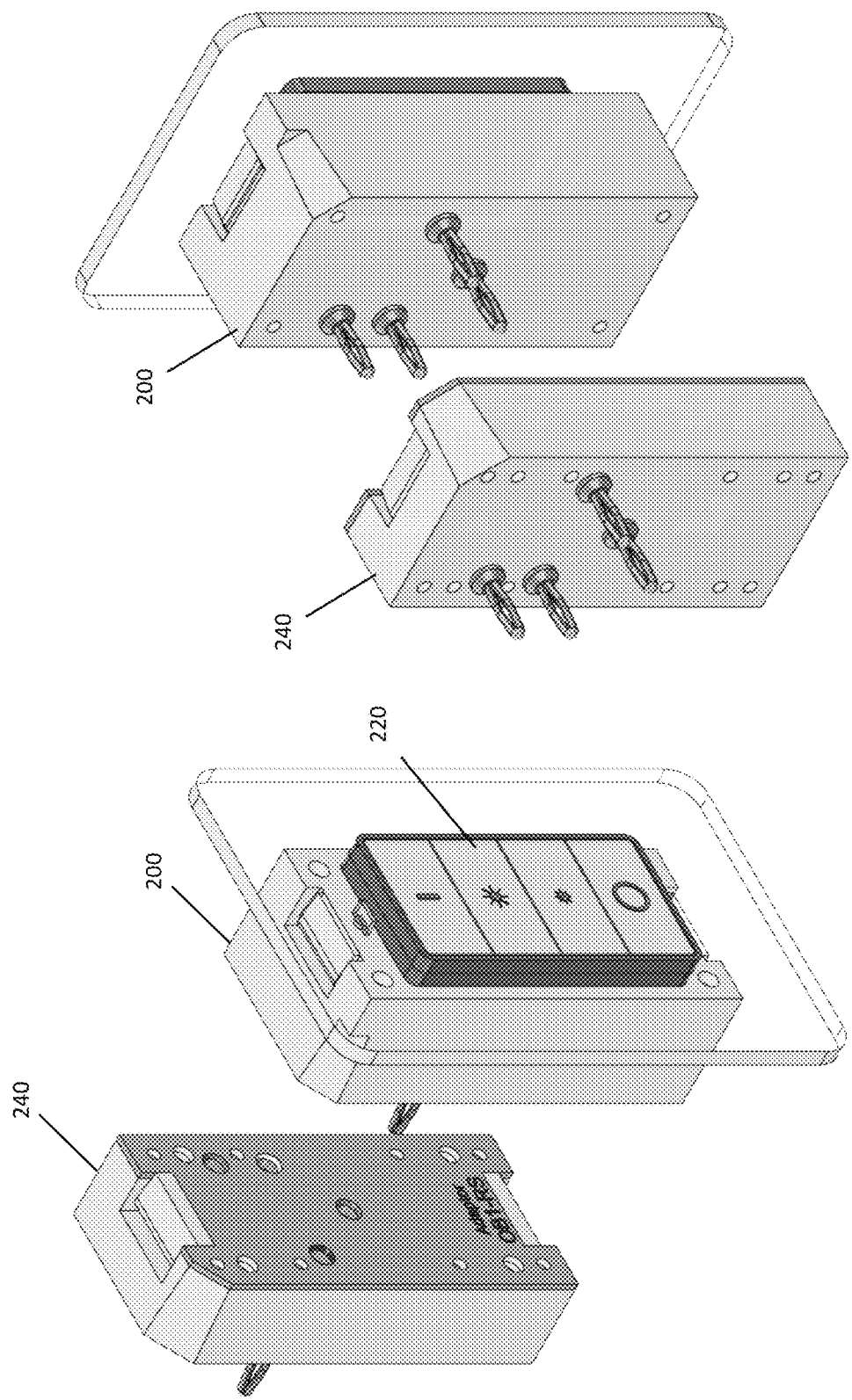
FIG. 12A and FIG. 12B illustrate a representative pairing of a pass-through adapter with a thin client, in accordance with an embodiment of the present disclosure.

Adapter 240 in various embodiments may have an interface wall 241 similar to that of interface wall 150 of host device 100. Interface wall 241 may include one or more ports 242, the number and pattern of which may be configured to correspond with those of contacts 232 of client device 200 and those of contacts 246 of pass through adapter 240. FIG. 11C illustrates front and rear views of pass-through adapter 240 with interface wall 241 removed. Similar to how interface wall 150 and rear housing 111 combine to define rear compartment 113 of host device 100, interface wall 241 and rear housing 244 may combine to define an inner compartment 245 within adapter 240. A first adapter electrical coupler 249 comprising contacts 246 may be positioned within inner compartment 245 to connect ports 242 with contacts 243. Contacts 246, in various embodiments, may be of similar design and construction as contacts 122 of host electrical coupler 120, and function to secure contacts 232 of thin profile client 200 (thin client) and place them into electrical communication with contacts 243 of second adapter electrical coupler 248. As configured, thin client 200 may be nested with adapter 240 by aligning and inserting contacts 232 into ports 242 until rear surface 216 of thin client 200 is flush with interface wall 241 of adapter 240. Contacts 232 of client electrical coupler 230 may be inserted into contacts 246 of a compatible adapter 240 to provide an electrical interface defining a plurality of predetermined electrical connections between client device 200 and adapter 240. While not shown in FIG. 11A, FIG. 11B, and FIG. 11C (but shown in representative fashion in FIG. 13C), an adapter peripheral 247 may be included within compartment 245 (or elsewhere, such as on an outer face of adapter 240 and provided with electrical connections to adapter electrical coupler(s) 248, 249 in a manner suitable for integrating the functionality of adapter peripheral 247 into the system. For example, peripheral 247 may be a wireless controller, and could be integrated with adapter 247 in a manner suitable to control operation of client peripheral 220 via the predetermined electrical connections formed at the interface between first adapter electrical coupler 249 and client electrical coupler 230. FIG. 12A and FIG. 12B illustrate a representative pairing of pass-through adapter 240 with a thin client 200 having an advanced type peripheral 220 (here, with multiple buttons for controlling certain functionality).

Figure 13B:
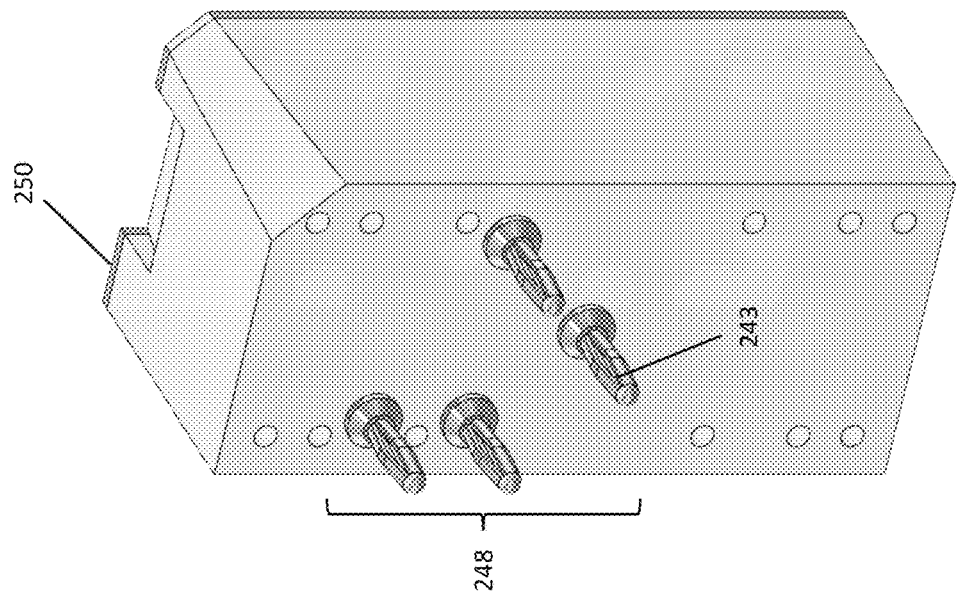
FIG. 13A and FIG. 13B illustrate front and rear views of an interoperability adapter in accordance with an embodiment of the present disclosure.
Figure 13A:
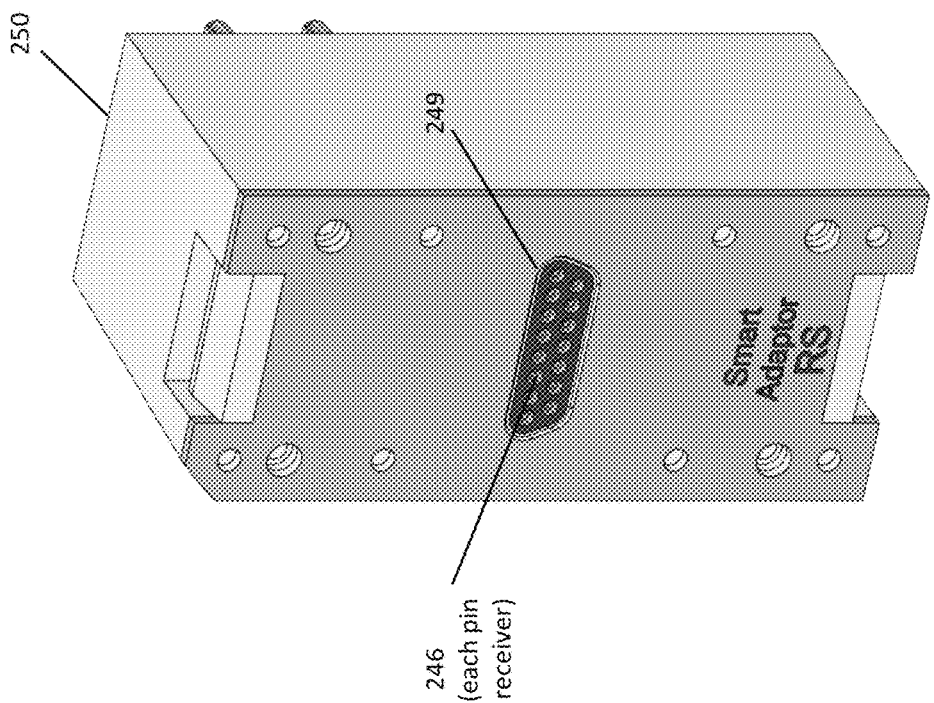
Figure 14B:
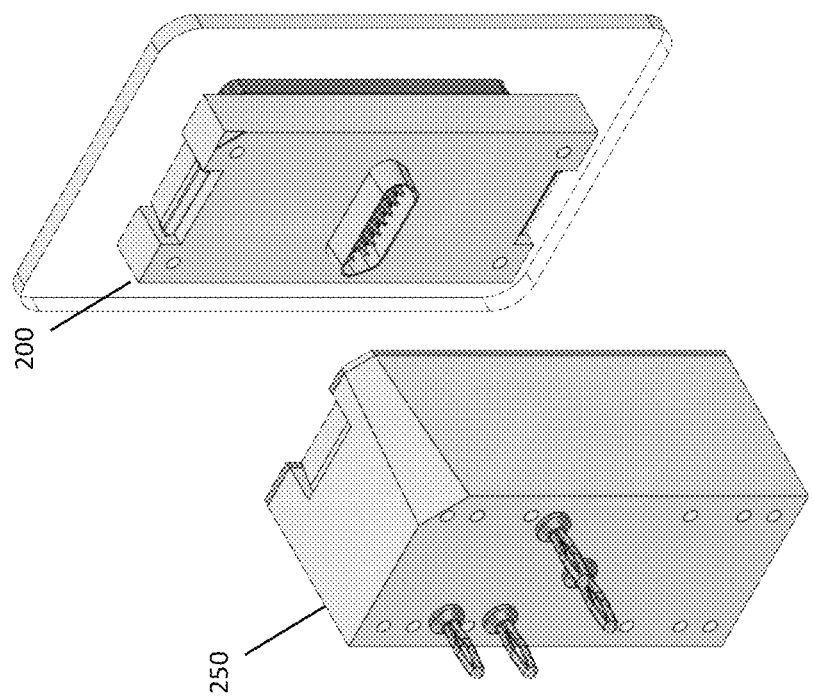
FIG. 14A and FIG. 14B illustrate a representative pairing of an interoperability adapter with a thin client, in accordance with an embodiment of the present disclosure.
Figure 14A:
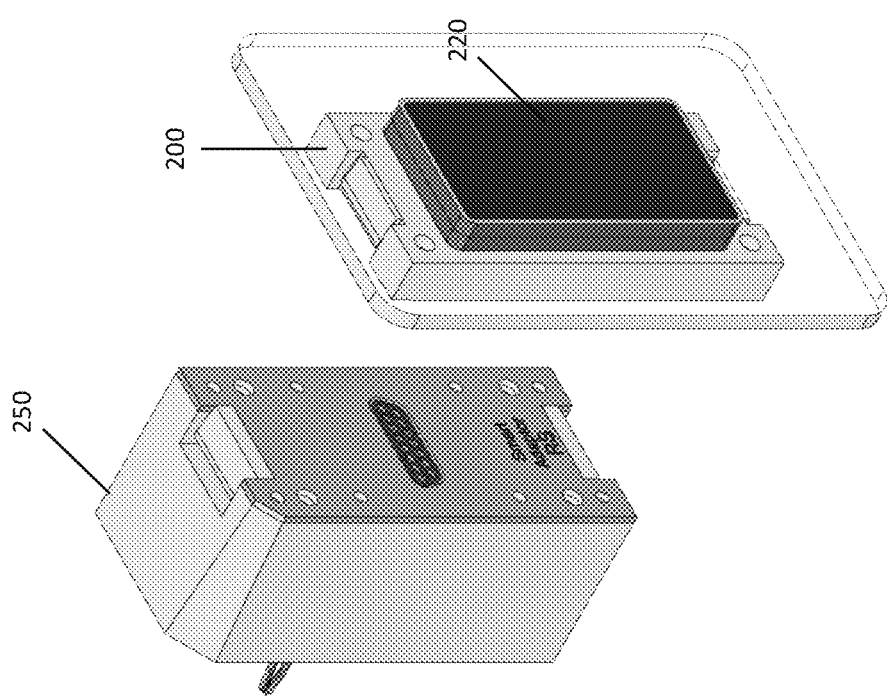

FIG. 13A, FIG. 13B, FIG. 13C, and FIG. 13D illustrate a representative interoperability adapter 250 of the present disclosure. Interoperability adapter 250, in various embodiments, is similar to pass-through adapter 240 in many ways, but rather than being configured to function as a spacer between a thin client 200 and a host device 100 having the same types of client electrical coupler 230 and host electrical coupler 120, interoperability adapter 250 may be configured to interface clients devices 200 and host devices 100 having different types of client electrical couplers 230 and host electrical couplers 120. To that end, interoperability adapter 250 may be independently configurable by a manufacturer (or, in some cases, users) to provide electrical connections between adapter electrical coupler 248 and adapter electrical coupler 249 in accordance with the standards of each coupler type. As configured, adapter electrical coupler 249 may provide an electrical interface with clients 200 having the same type of client electrical coupler 230, and adapter electrical coupler 248 may provide an electrical interface with host devices 100 having the same type of host electrical coupler 120, and the electrical connections (and, in some cases, additional hardware such as that necessary to convert power levels and provide other necessary functionality to make one standard compatible with another standard) within interoperability adapter 250 will allow host device 100 to work with client device 200. FIG. 14A and FIG. 14B illustrate a representative pairing of interoperability adapter 250 with a thin client 200 having an advanced peripheral 220 (here, with a touch screen for controlling certain functionality), wherein interoperability adapter 250 is configured to allow client device 200 (which has a multi-pin electrical coupler 230) to operate with host device 100 (which has a socket electrical coupler 120). As shown in FIG. 13C, an adapter peripheral 247, in some embodiments, may be included within compartment 245 (or elsewhere, such as on an outer face of adapter 250 and provided with electrical connections to adapter electrical coupler(s) 248, 249 in a manner suitable for integrating the functionality of adapter peripheral 247 into the system.

Cable System 300

Figure 15:
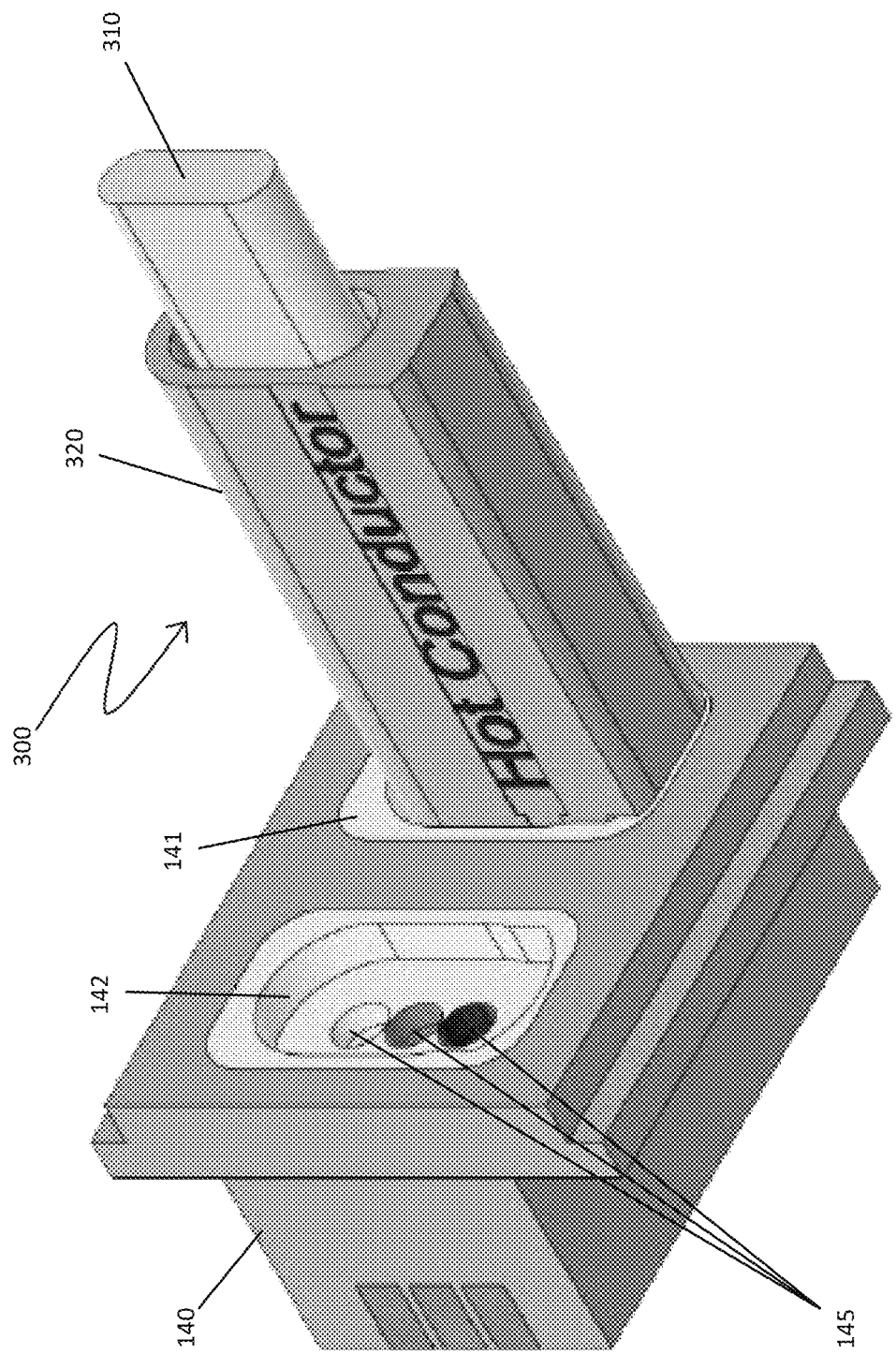
FIG. 15 illustrates a cable system, in accordance with an embodiment of the present disclosure.

FIG. 15 illustrates a representative embodiment of cable system 300. Cable system 300, in various embodiments, may generally include a cable 310 configured to provide host device 100 with various electrical connections necessary required for distributing power to client device 200, and a cable sleeve 320 configured to align and secure cable 310 to cable electrical coupler 140, as later described in more detail.

Cable 310, in various embodiments, may include two or more cable conductors 312 (e.g., wires) insulated from one another and a surrounding environment by insulation 314. Cable conductors 312, in various embodiments, may comprise various power (hot 1, hot 2), ground, neutral, and other necessary connections to cable electrical coupler 140. Traditionally, these connections would be made manually and one-by-one using several separate wires from the building's electrical system, however cable 310 combines all wiring necessary to make such connections into a single cable 310 that can simply be inserted into a cable electrical coupler 140 and have its respective cable conductors 312 establish secure electrical connections without the need to make separate, manual connections of each cable conductor 312. Cable conductors 312, in various embodiments, may be arranged side-by-side in cable 310 with consistent spacing and order to facilitate connection with cable electrical couplers 140, as further described herein.

Figures 16A, 16B:
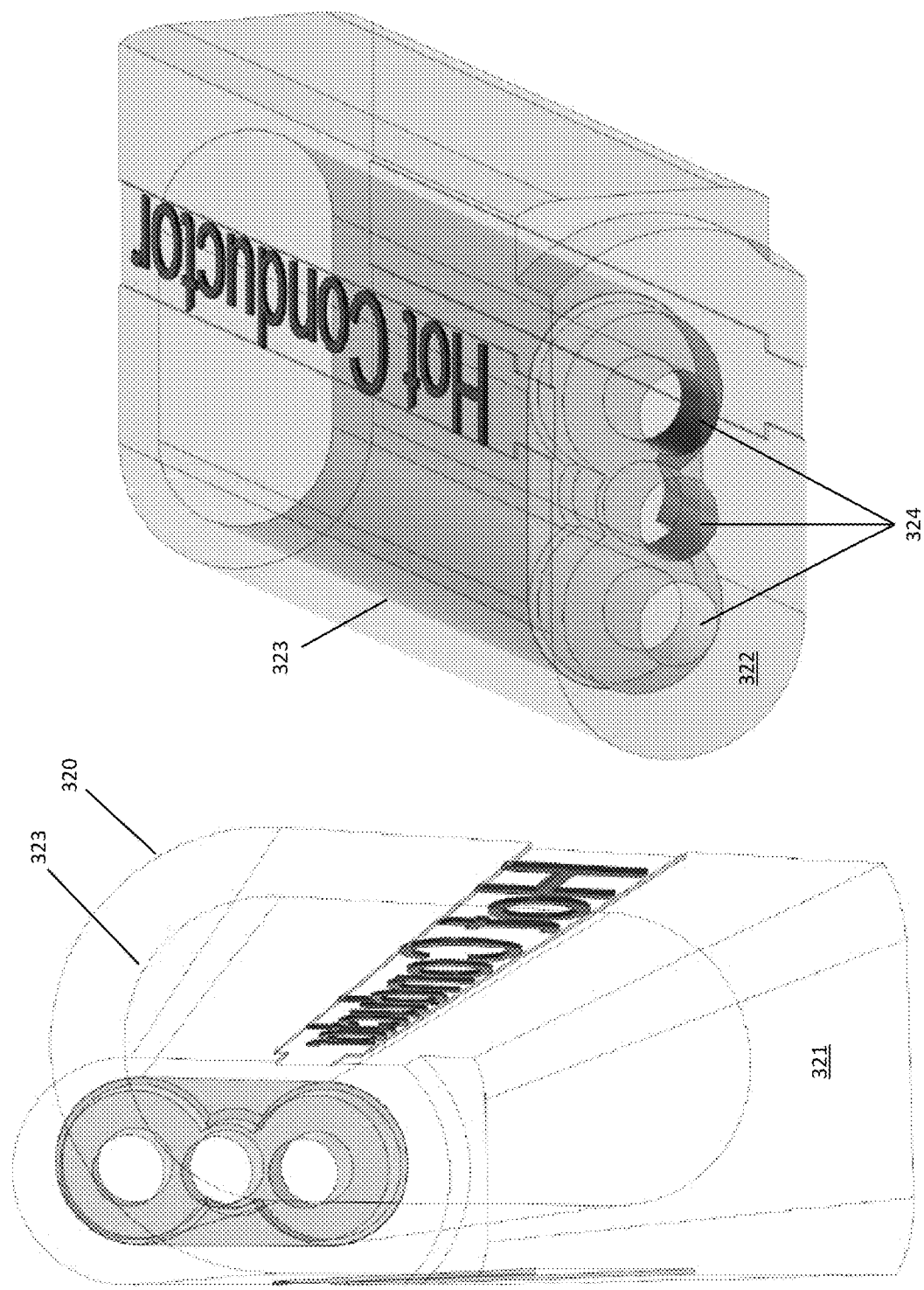
FIG. 16A and FIG. 16B illustrate rear and front views of a cable sleeve, in accordance with an embodiment of the present disclosure.

FIG. 16A and FIG. 16B illustrate rear and front views of a representative embodiment of cable sleeve 320. Cable sleeve 320, in various embodiments, may be configured to fit onto the end of cable 310 and generally includes a body having a rear face 321, a front face 322, and a hollow channel 323 extending therebetween. Channel 323 may have a similar shape, height, and width dimension as insulation 314 of cable 310 such that, when a distal end of cable 310 is inserted into channel 323, a friction fit is formed between channel 323 and insulation 314 to secure cable 310 within channel 323. Connected to the distal end of channel 323 and extending through front face 322 are a plurality of wire guides 324. Wire guides 324, in various embodiments, may be arranged and spaced apart according to an arrangement and spacing of cable conductors 312 in cable 310 such that, when cable 310 is inserted into channel 323, the exposed ends of cable conductors 312 are automatically aligned and directed through wire guides 324.

Front face 322 of cable sleeve 320, in various embodiments, may have similar shape and dimensions as those of conductor guide 142 of cable electrical coupler 140 such that cable sleeve 320 may be inserted into conductor guide 142 and secured in place by a friction fit. The arrangement and spacing of cable conductors 312, wire guides 324, and cable guide ports 145 are configured to match one another and align upon insertion of cable sleeve 320 into cable electrical coupler 140. In various embodiments, the shape of conductor guide 142 and front face 322 may be keyed to ensure cable conductors 312 are aligned with the correct cable guide ports 145 to complete the desired circuit.

Figure 17A:
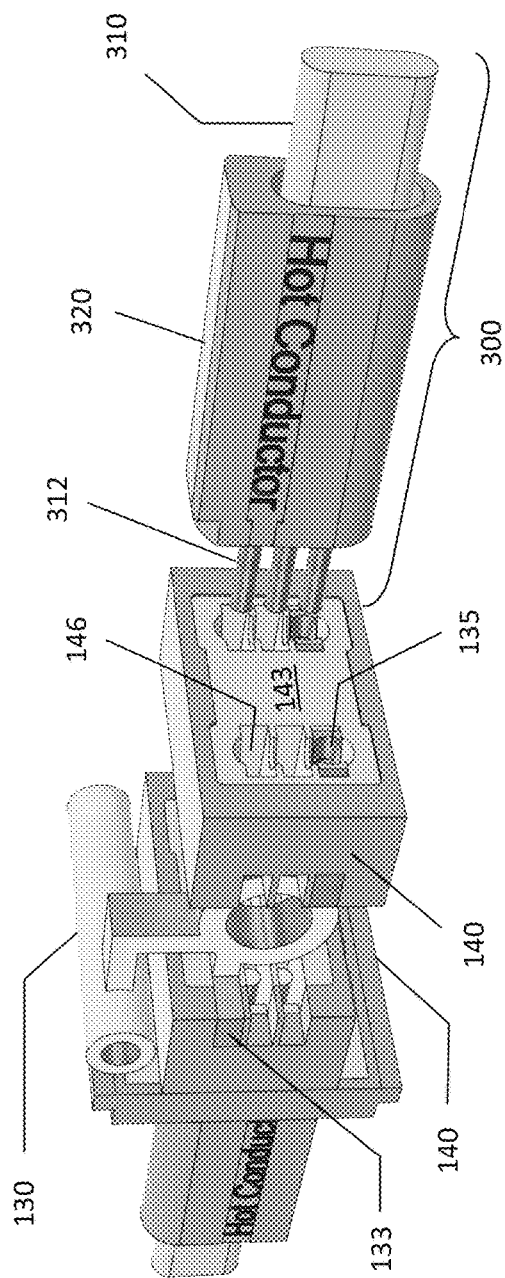
FIG. 17A and FIG. 17B illustrate representative connections created between a cable system, a cable electrical coupler, and a host bus, in accordance with an embodiment of the present disclosure.
Figure 17B:
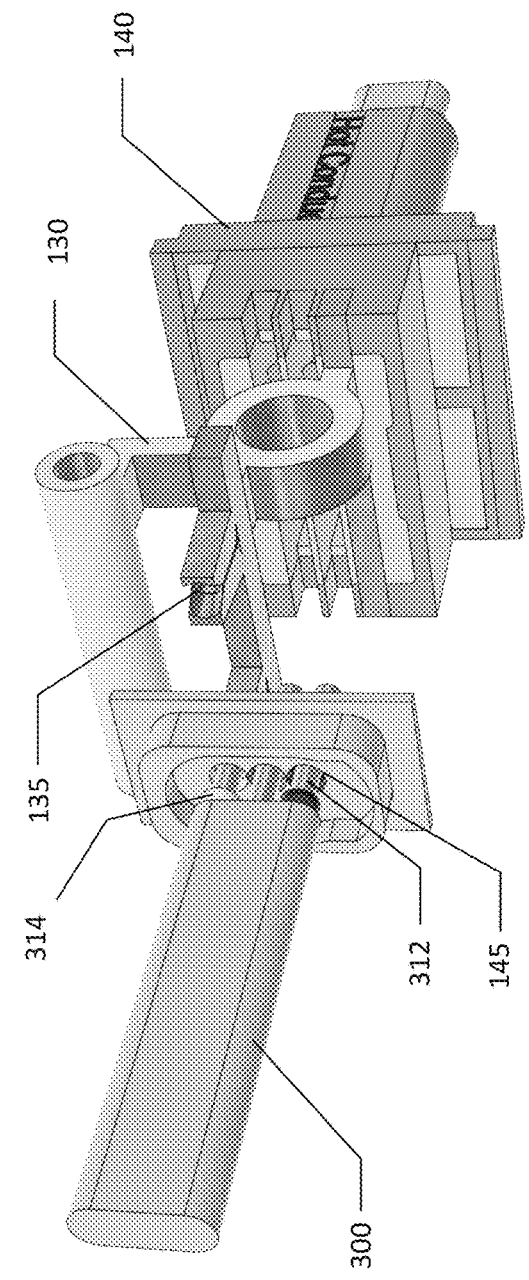

FIG. 17A illustrates a representative connection created between cable system 300, cable electrical coupler 140, and host bus 130. For ease of viewing, some components are not shown. Moving from right to left, cable system 300 is inserted into cable electrical coupler 140, where the exposed ends of cable conductors 312 are directed into corresponding terminals 146 of terminal rack 143, where they are received and secured by terminal contacts 135 of host bus 130. FIG. 17B also illustrates a representative connection created between cable system 300, cable electrical coupler 140, and host bus 130 with alternative components shown for additional clarity. Moving from left to right, cable system 300 is inserted into cable electrical coupler 140, where the exposed ends of cable conductors 312 are directed through cable guide ports 145 and towards awaiting terminal contacts 135 of host bus 130.

Figure 18:
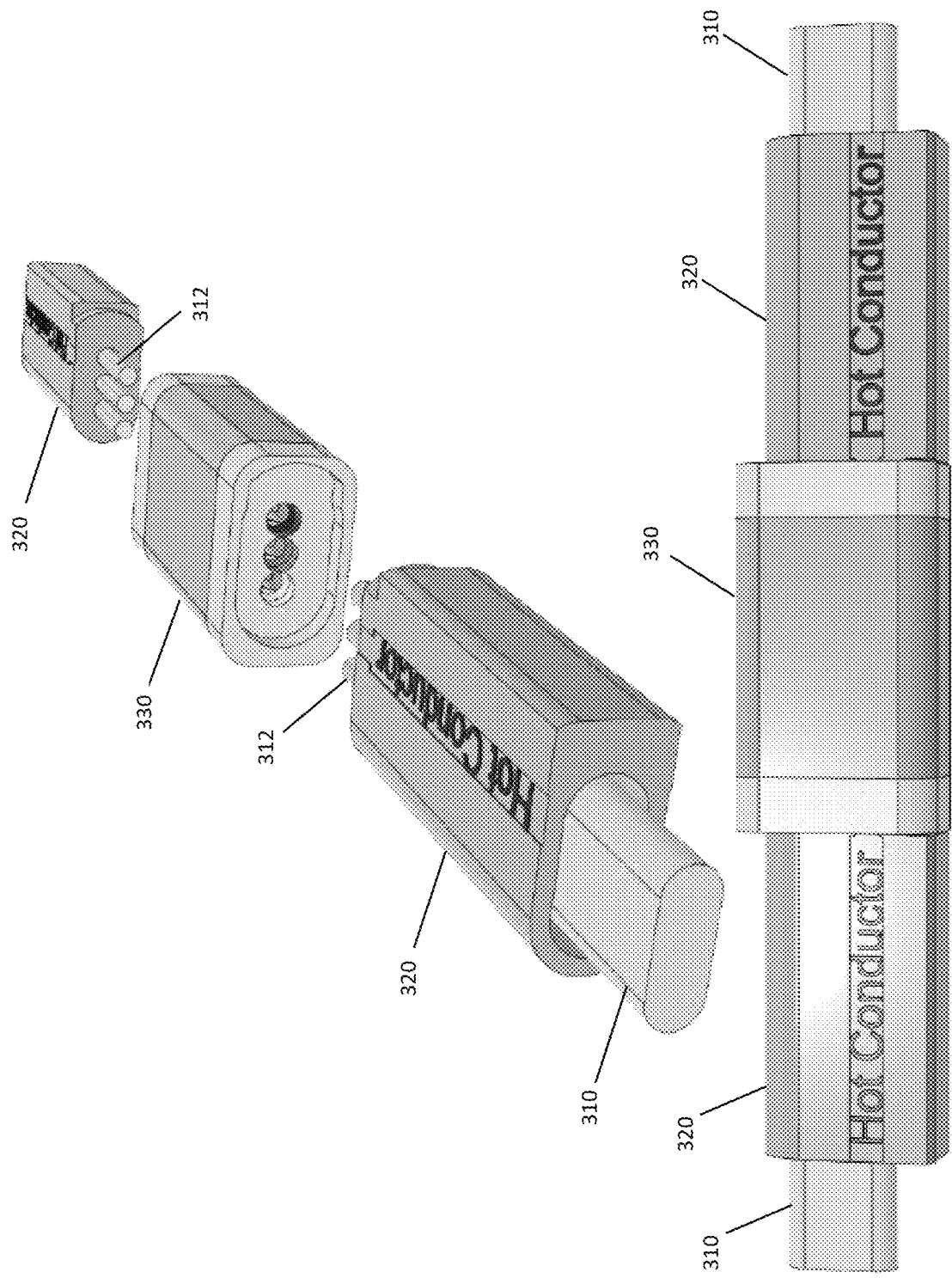
FIG. 18 illustrates a cable connector, in accordance with an embodiment of the present disclosure.
Figure 19:
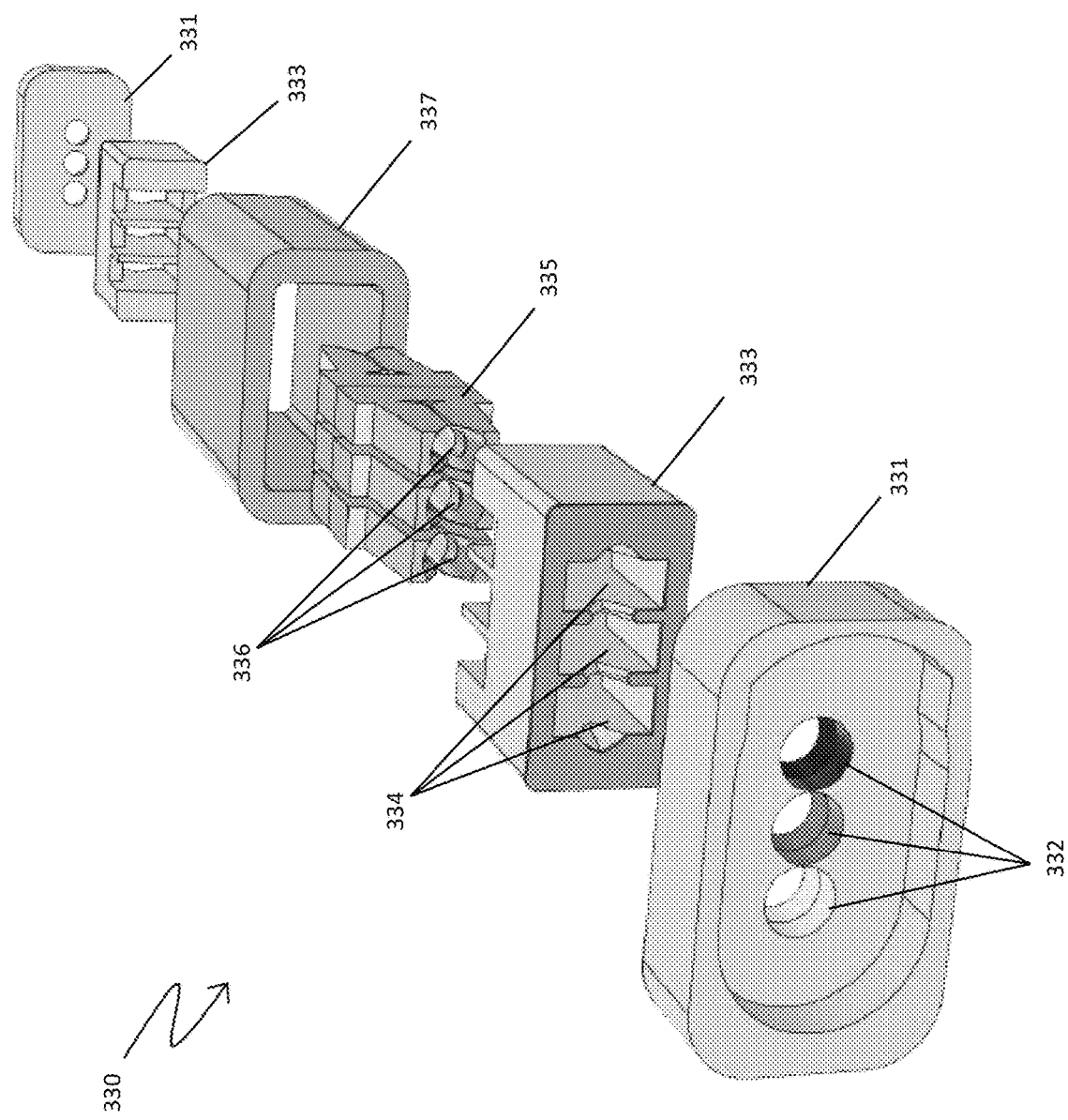
FIG. 19 illustrates an exploded view of a cable connector, in accordance with an embodiment of the present disclosure.

FIG. 18 illustrates a representative cable connector 330 of the present disclosure, and FIG. 19 illustrates an exploded view thereof. As shown, cable connector 330, may be configured to connect two cable systems 300 and may have similar components as cable electrical coupler 140. In particular, cable connector, in various embodiments, may include a cable guide 331 (similar to cable guide 142), cable guide ports 332 (similar to cable guide ports 145), an insulator rack 333 having insulated chambers 334 (similar to terminal rack 143 and terminals 146), a terminal rack 335 having terminal contacts 336 (similar to terminals 133 and terminal contacts 135), and a cable connector housing 337. As configured, cable system 300 can be secured to cable connector 330 and create corresponding electrical connections between cable conductors 312 of one cable system 300 and those of the second cable system 300.

Installation System 400

Figure 20:
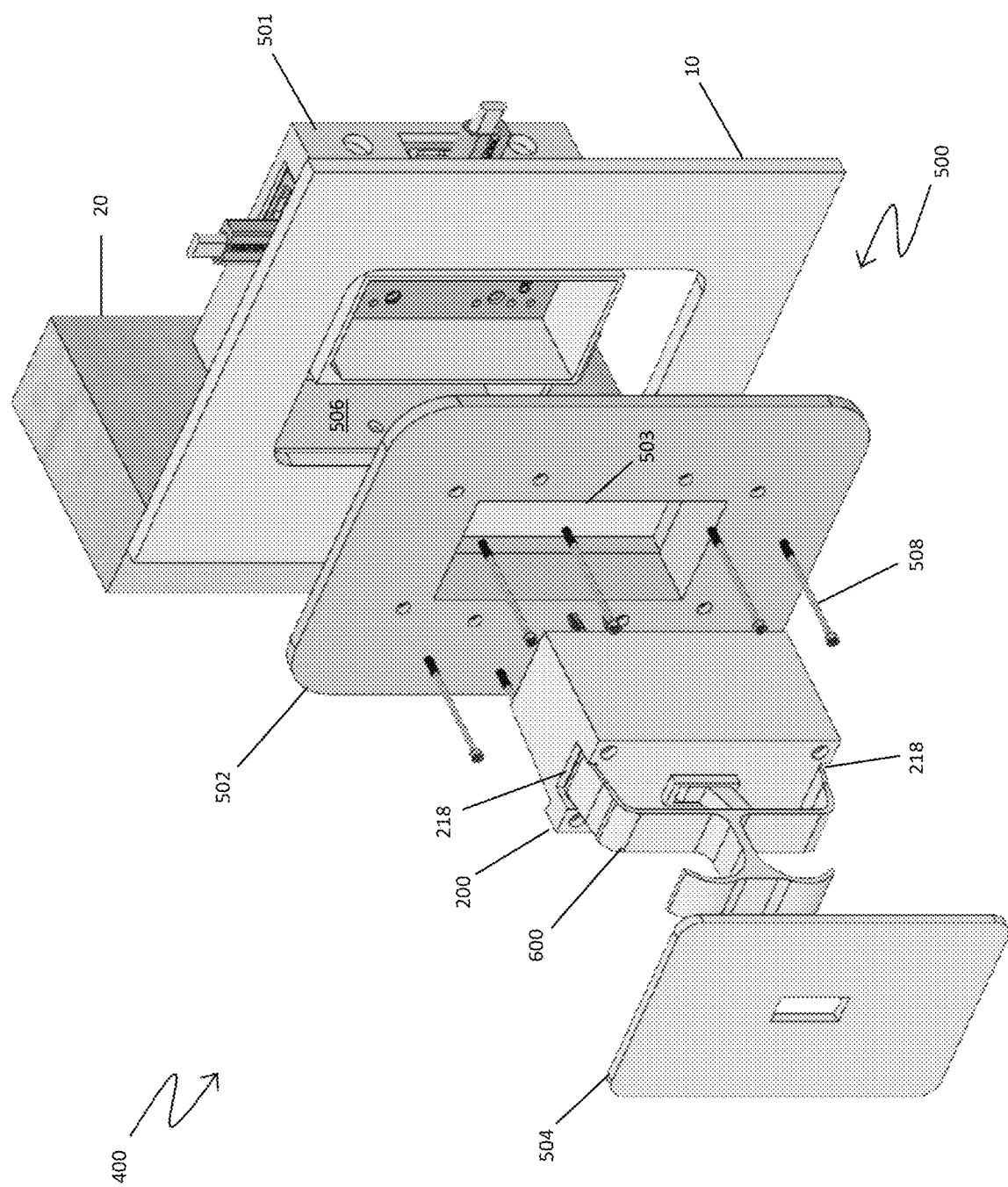
FIG. 20 illustrates a mounting system, in accordance with an embodiment of the present disclosure.

FIG. 20 illustrates a representative embodiment of a mounting system 400 for use in installing system 1000 in a structure, such as one including a wall 10 and a stud 20. Installation system 400, in various embodiments, may generally include mounting components 500 for mounting host device 100 within a wall of the structure and a tool 600 for facilitating insertion and removal of client device 200 from host device 100, as further described herein.

Mounting system 400, in various embodiments, may include a mounting frame 501 for mounting host device 100 to stud 20, an mounting frame cover 502 including a client cutout 503 through which to insert client device 200 into host device 100, and a client face plate 504 for aesthetics once the assembly is fully installed in wall 10.

FIGS. 21A and 21B illustrate front and rear views of mounting frame 501. Mounting frame 501, in various embodiments, may include a host compartment 505 configured to house host device 100, and a mounting flange 506 configured to be mounted to stud 20 and support host compartment 505. Host compartment 505, in an embodiment, may be configured to contain host device 100 and as such may have similar internal dimensions. A front face of host compartment 505 may be left open so that host device 100 may be inserted therein. Host compartment may include cutouts 507 positioned where cable electrical couplers 140 will be situated. Cutouts 507, in an embodiment, may extend forward to a front face of host compartment 505 such that cable system 300 can be installed in host device 100 outside of the confines of wall 10, thereby making installation and changing of cable systems 300 easier and faster. Mounting flange 506 may be configured to position and support host compartment 505 in an offset position from stud 20 so as to create space to connect cable system 300.

Figure 22B:
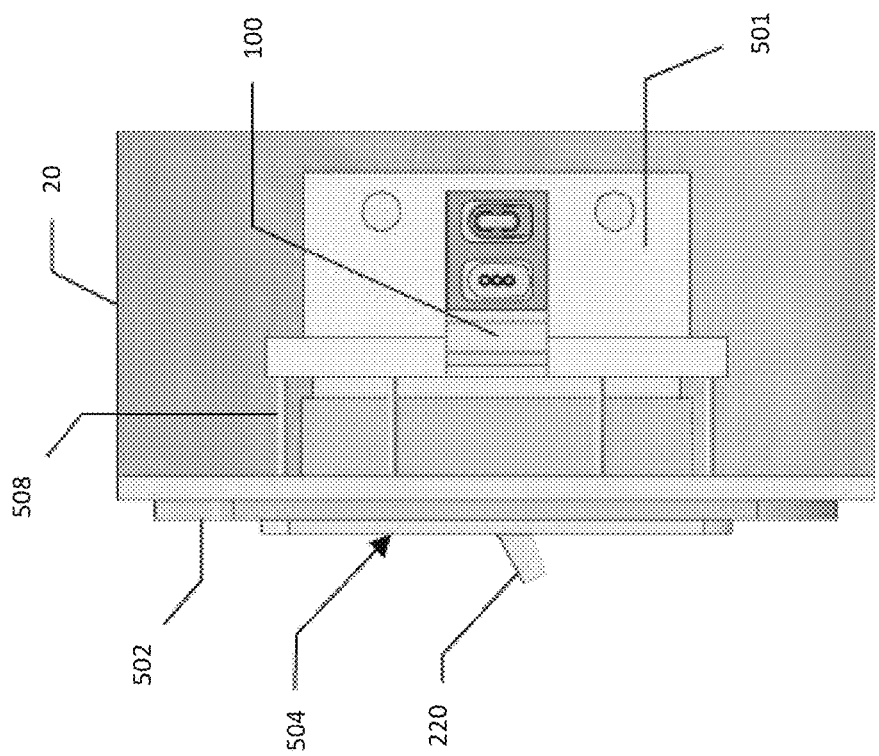
FIG. 22A, FIG. 22B, and FIG. 22C illustrate a mounting frame cover secured to a mounting frame, in accordance with an embodiment of the present disclosure.
Figure 22A:
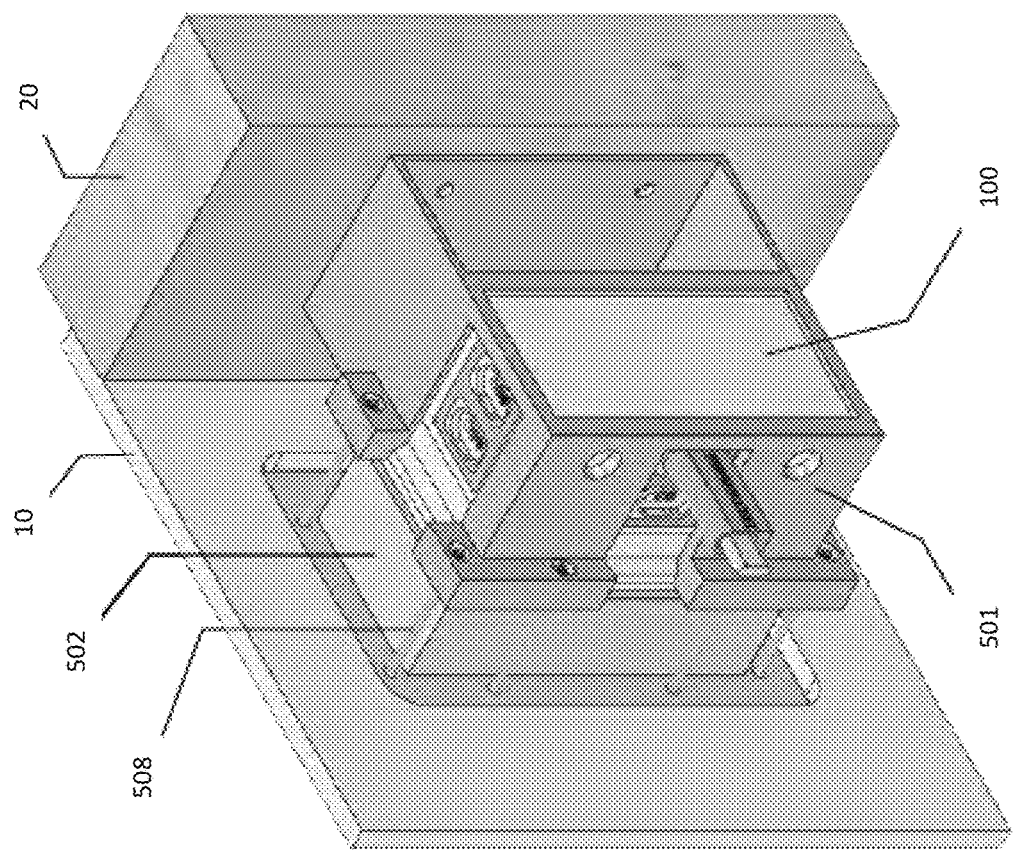
Figure 22C:
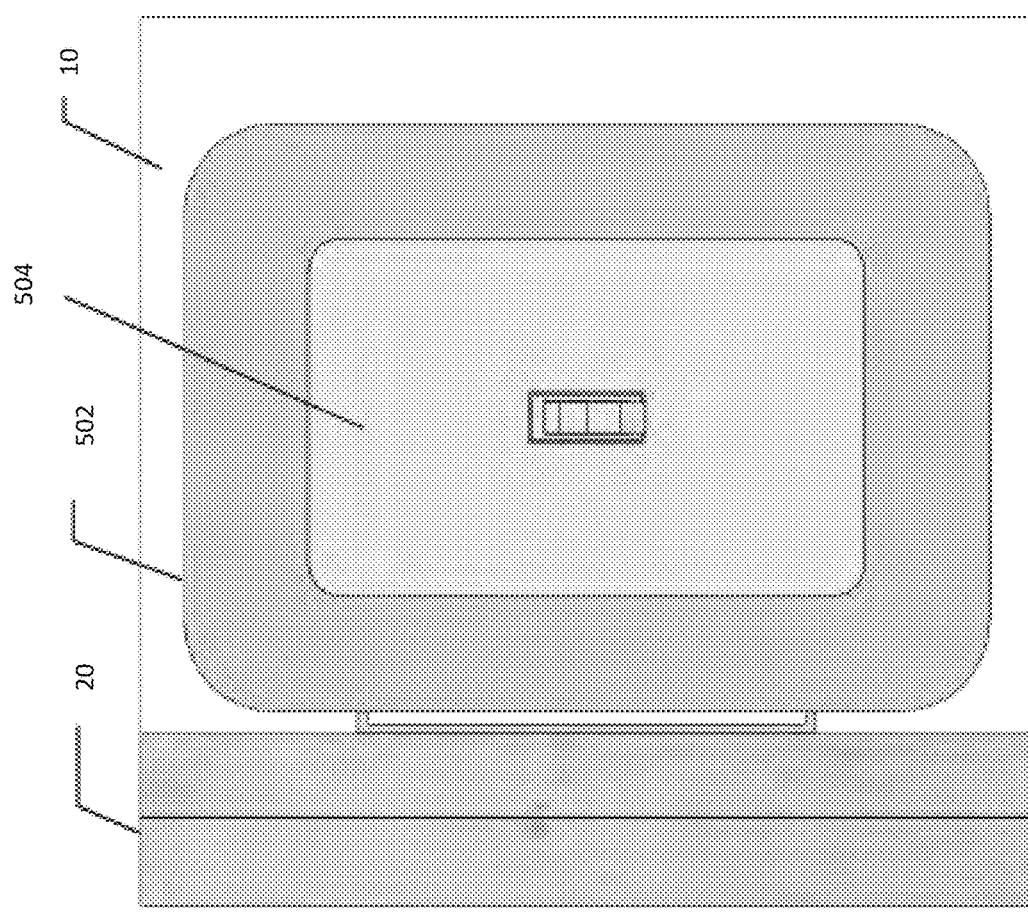

Referring back to FIG. 20, once host device 100 is installed in mounting frame 501, mounting frame cover 502 can be attached over the front face of mounting frame 501. Client cutout 503 may be positioned over host compartment 505 and may have suitable dimensions to allow client device 200 to be inserted through client cutout 503 for connection with host device 100. In an embodiment, client cutout 503 is equal to or only slightly larger than client device 200 so as to contain host device 100 within host compartment 505 by capturing a lip situated about the perimeter of front housing 112 of host device 100 (see also FIGS. 4A and 4B). Referring now to FIG. 22A, FIG. 22B, and FIG. 22C, mounting frame cover 502 may be secured to mounting frame 501 as shown via screws 508 into screw holes 509 in mounting frame 501. A flange extending from the rear of mounting frame cover 502 may serve to form a channel through which client device 200 may travel between wall and host device 100. Client face plate 504 can be affixed to wall 10 after client 200 is installed to improve aesthetics by covering the hole in wall 10 and to help contain client device 200 within host device 100.

Figure 23B:
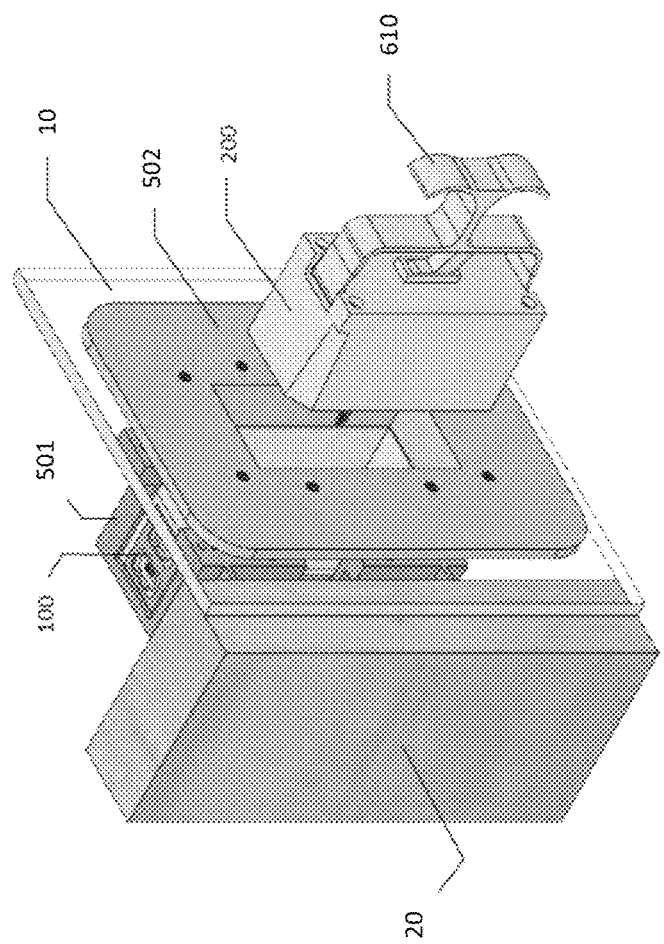
FIG. 23A and FIG. 23B illustrate a tool for inserting and removing a client device from a host device, in accordance with an embodiment of the present disclosure.
Figure 23A:
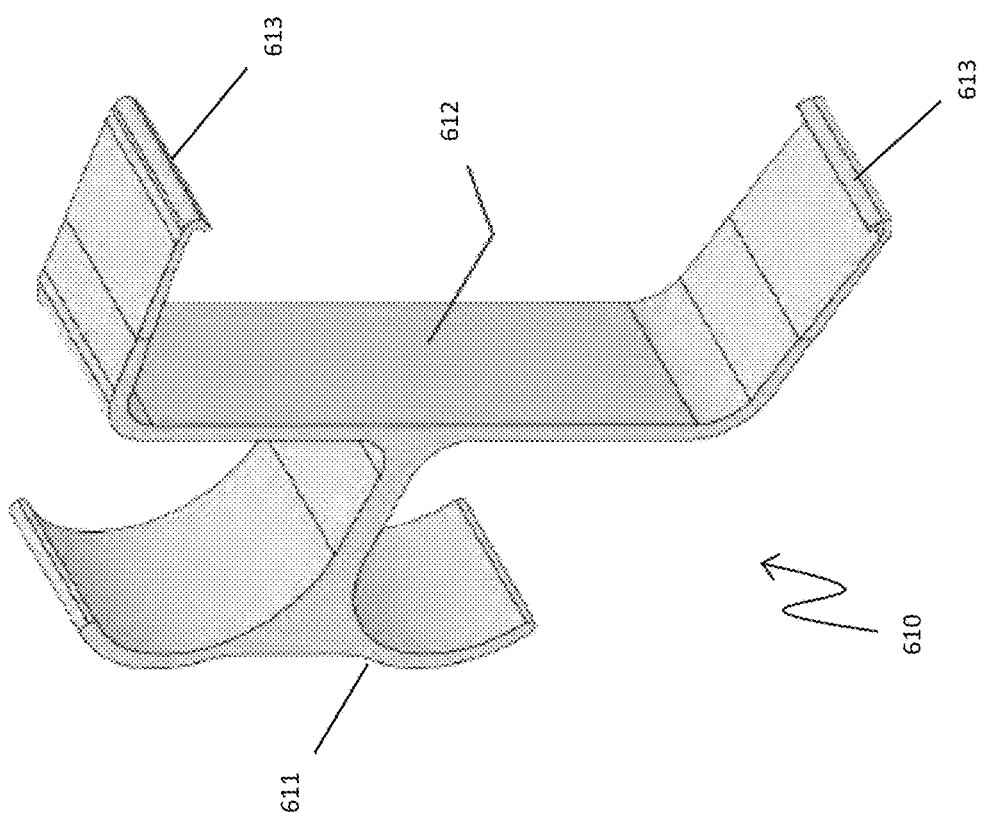

FIG. 23A and FIG. 23B illustrate a representative tool 610 for inserting and removing client device 200 from host device 100. Tool 610, in various embodiments, may include a handle 611 and a retaining device 612. Retaining device 612 may be substantially C-shaped and dimensioned to hold client device 200 therewithin as shown in FIG. 20. The flanges of the C-shaped retainer wrap around the top and bottom of client device 200 and clip onto gripping feature 218 (e.g., recesses) via clips 613 such that client device 200 can be pulled out of host device 100 by handle 601. Clips 613 also generally serve to secure client device 200 within tool 610 during insertion.

Figure 24B:
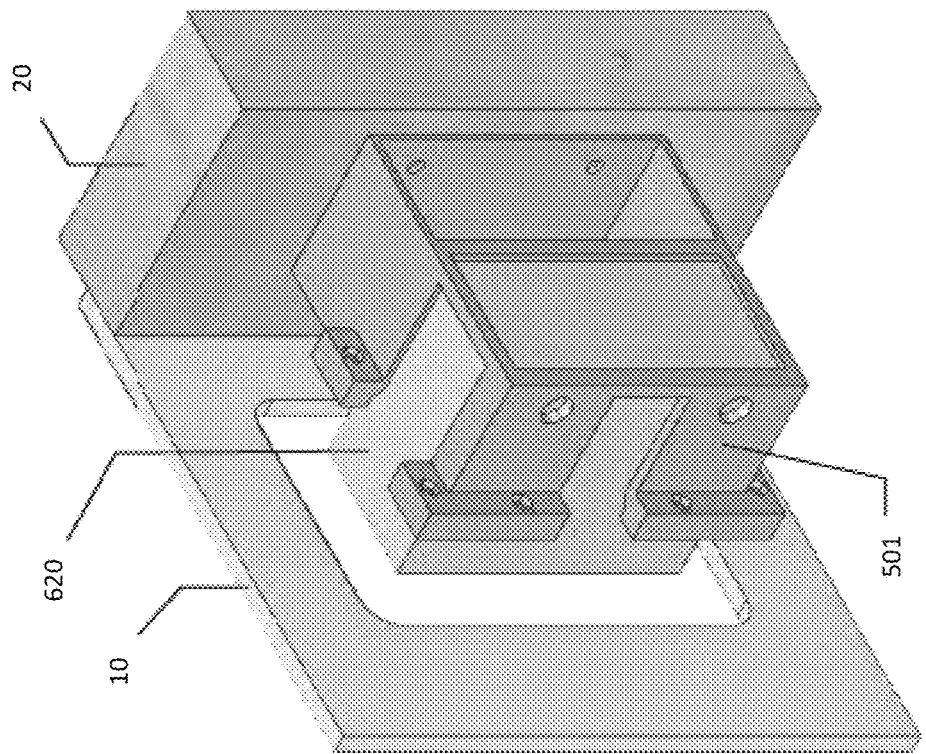
FIG. 24A and FIG. 24B illustrate a tool for facilitating installation of a mounting frame, in accordance with an embodiment of the present disclosure.
Figure 24A:
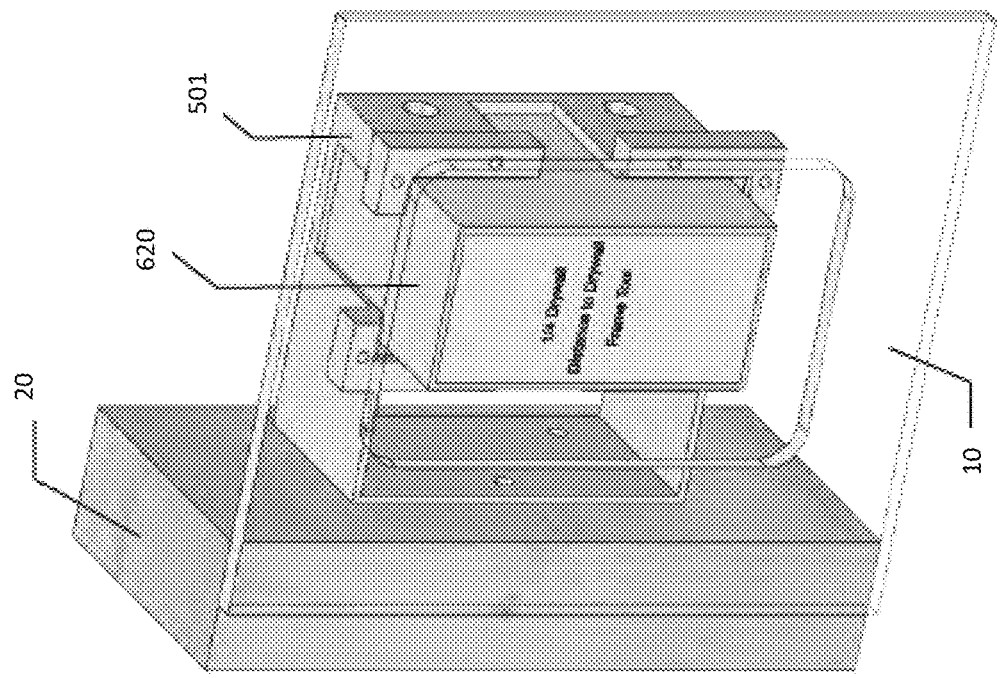
Figure 25B:
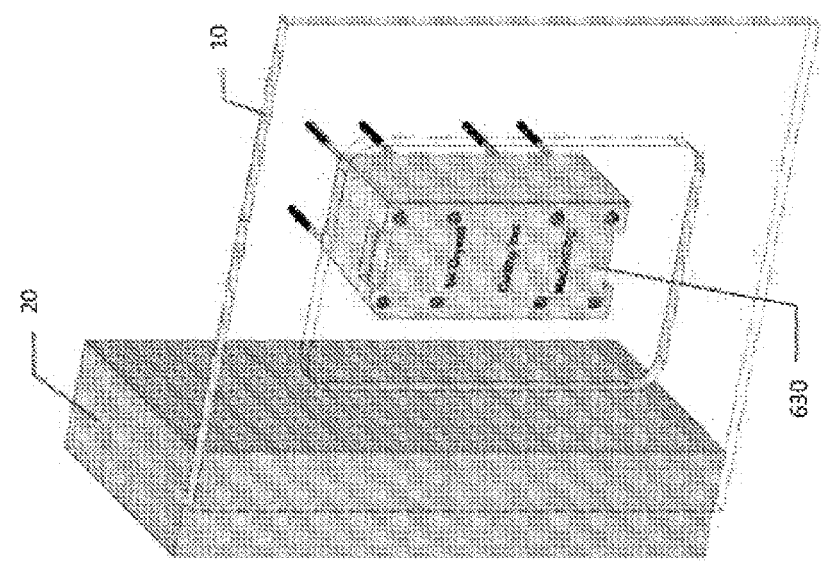
FIG. 25A, FIG. 25B, FIG. 25C, and FIG. 25D illustrate a tool for facilitating making an appropriately sized cutout in installation surface, in accordance with an embodiment of the present disclosure.
Figure 25A:
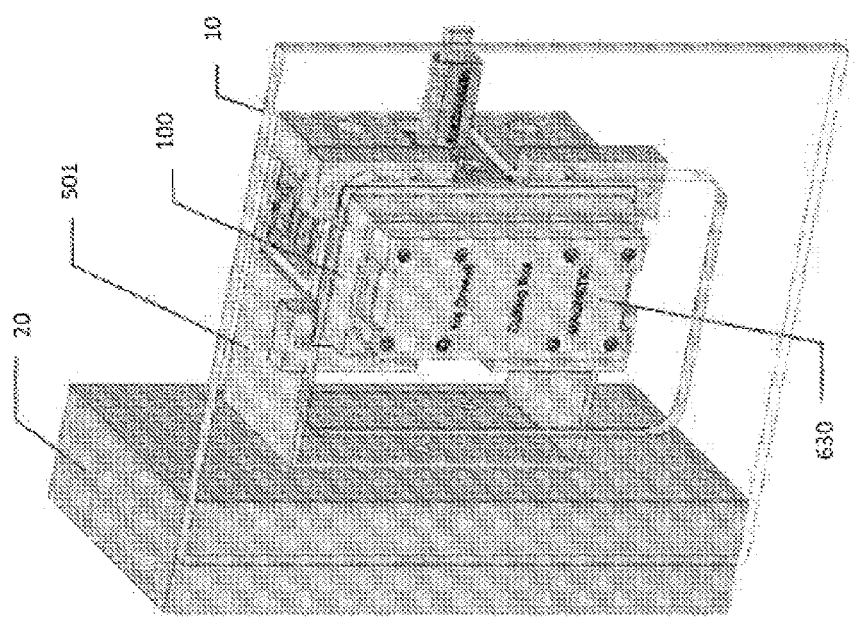
Figure 25D:
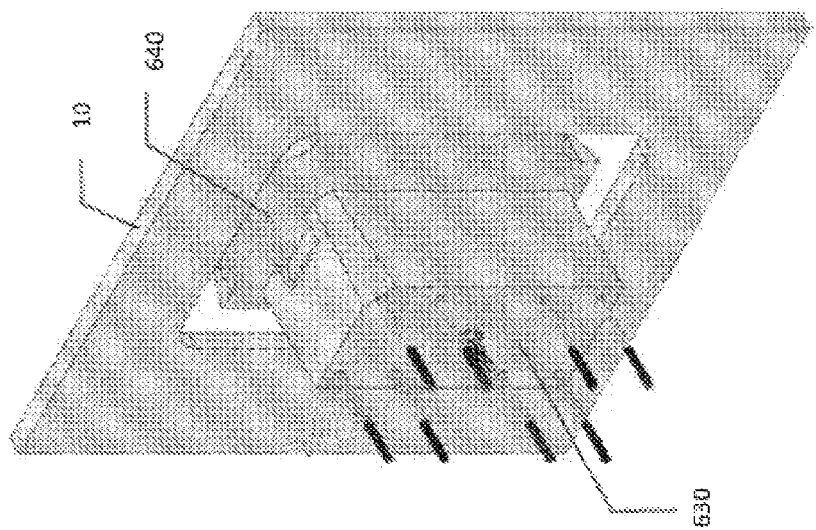
Figure 25C:
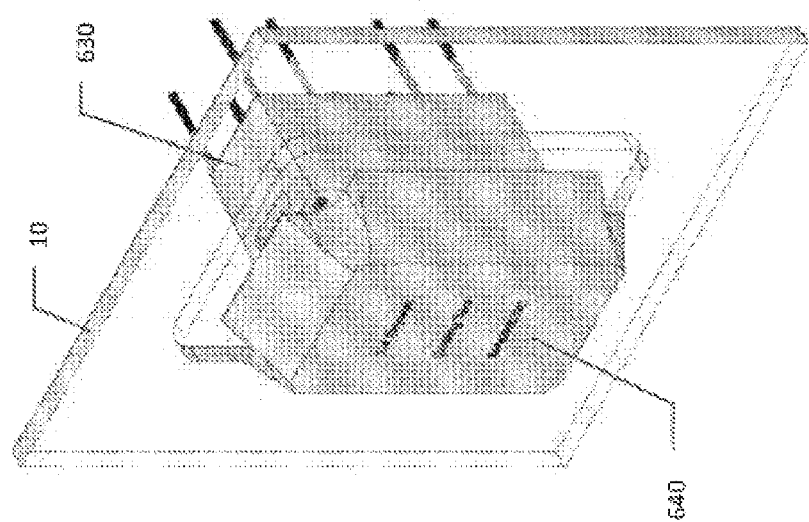

FIG. 24A and FIG. 24B illustrate a representative tool 620 for facilitating installation of mounting frame 501. As shown, a measurement tool 620 is used to position the mounting frame 501 in an exact distance from the interior side of the outlet front installation surface 10, such as a drywall. The distance extending beyond the boundaries of the frame 501 determines the required distance, to ensure that after a host device 100 and a client device 200 are assembled and mounted, the front face of the client ends up at a distance from the surface 10 to leave a designated amount of space for fixating mounting frame cover 502, where there aren't any gaps between the mounting frame cover 502 and the installation surface 10.

FIG. 25A, FIG. 25B, FIG. 25C, and FIG. 25D illustrate a representative tool 620 for facilitating making an appropriately sized cutout in installation surface 10. Once mounting frame 501 is installed in a distance, measured by tool 620, tools 630 and 640 may be used to help outline the cutout in the outlet installation surface 10. Magnetic tool 630 is first inserted into a host 100 inside the mounting frame 501. Then the tool 640, which is magnetically attracted to the tool 630 is placed on the outer side of the installation surface 10, till they are aligned with each other as designated. At this point, using the predesigned outline shape of the tool 640, the cutout may be made into the installation surface 10.

System 2000

Figure 26A:
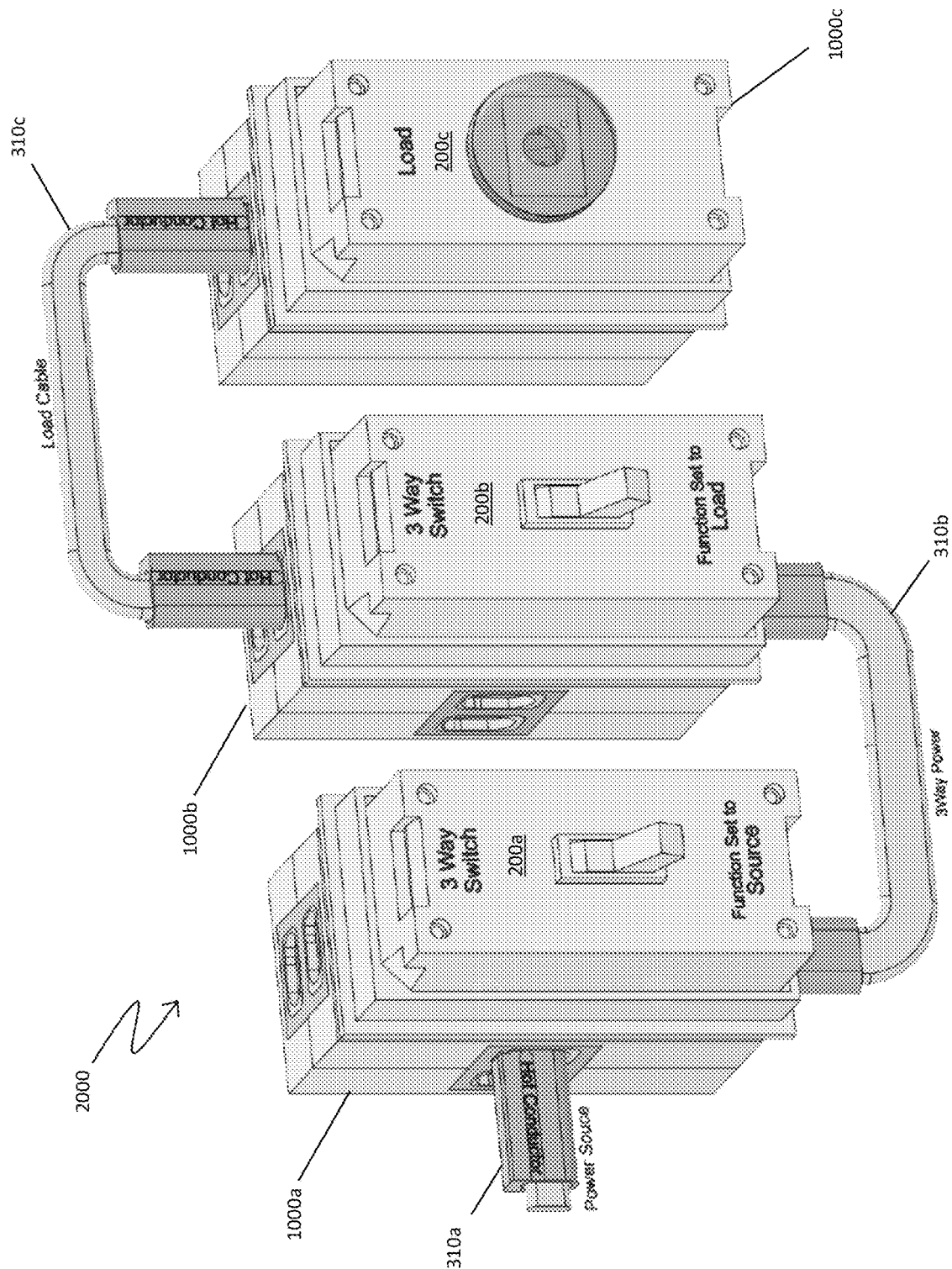
FIG. 26A, FIG. 26B, FIG. 26C, and FIG. 26D illustrate an assembly of multiple interconnected modular power distribution systems, in accordance with an embodiment of the present disclosure.
Figure 26B:
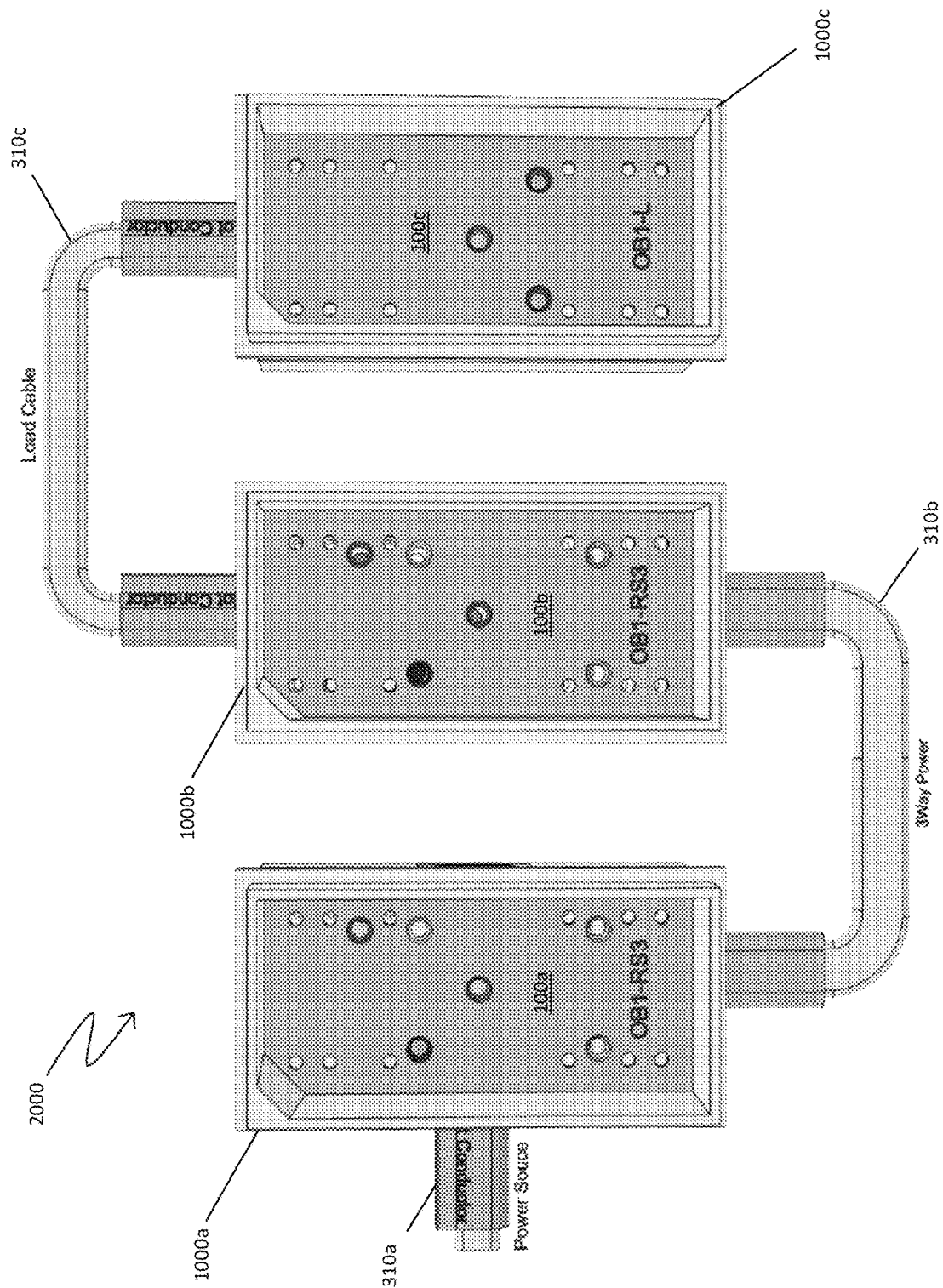
Figure 26C:
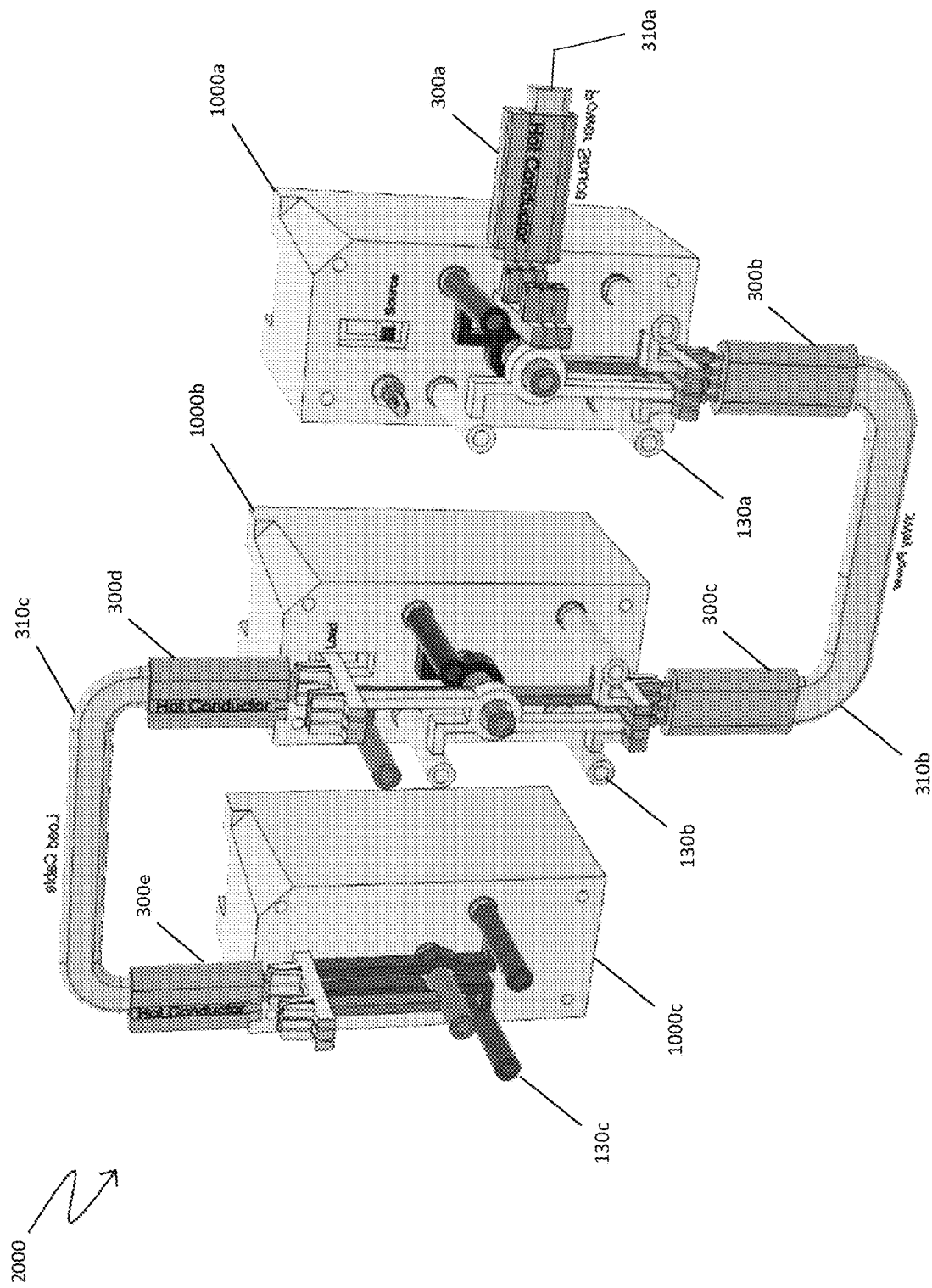
Figure 26D:
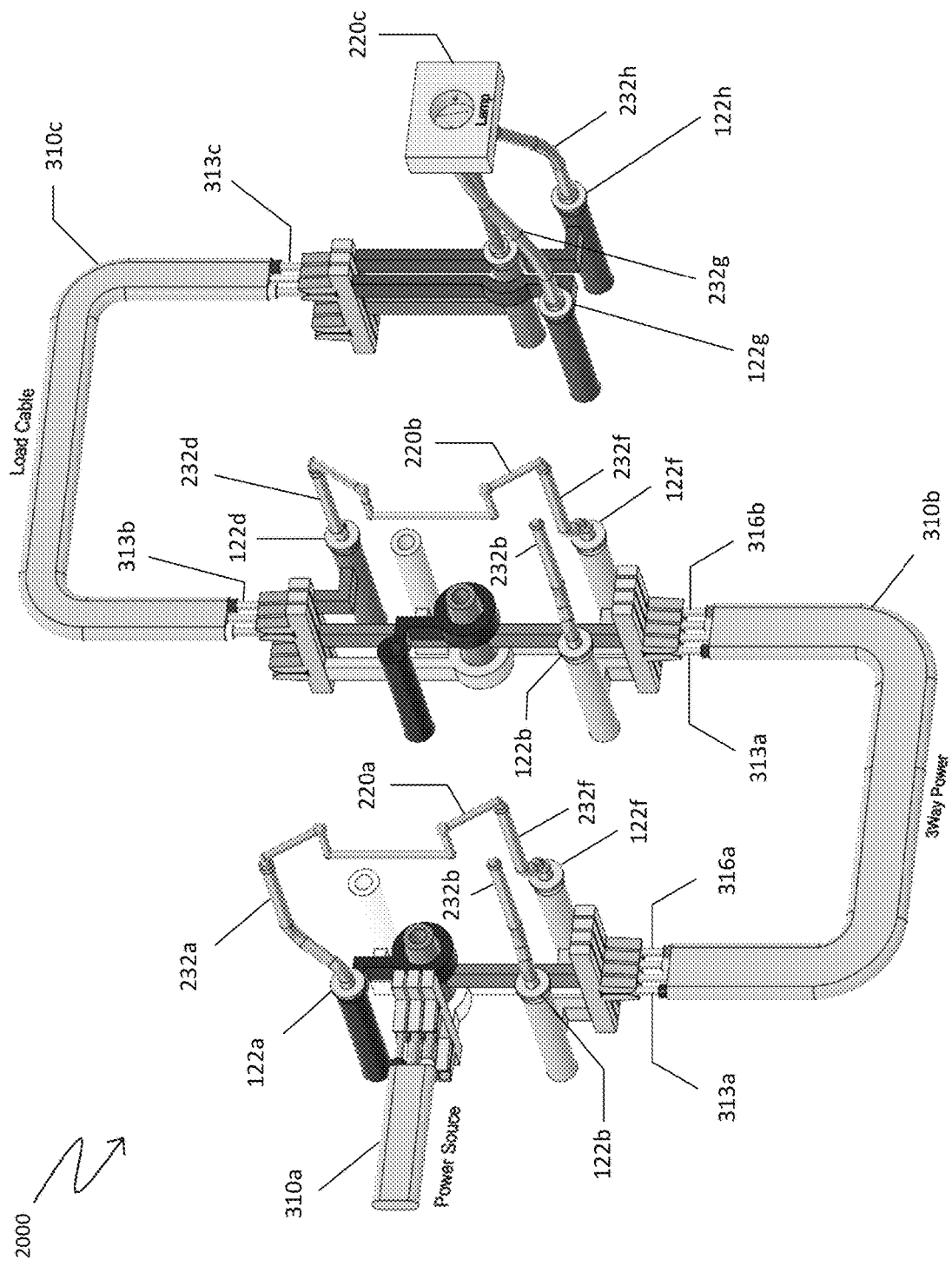

FIG. 26A, FIG. 26B, FIG. 26C, and FIG. 26D illustrate a representative embodiment of a system 2000 comprising multiple interconnected systems 1000. In the particular embodiment shown, two 3-way switch clients 200a, 200b are utilized in constructing a 3-way switch circuit with a load client 200c. The first host 100a of the first 3-way switch assembly 1000a receives a power source cable 310a and is further connected to the second host 100b of the second 3-way switch assembly 1000b via a power cable 310b. As seen in FIG. 26C and FIG. 26D, the function of the first outlet's client device 200a is set to 'Source', thus, connecting the common terminal 232a of light switch peripheral 220a of the client 200a to electric power source, supplied via cable 310a and passing it on to the second outlet assembly 1000b via the cable 310b, through either conductor 313a or conductor 316a, as the light switch peripheral 220a toggles between its traveler terminals 232b or 232f. The second outlet assembly 1000b comprising the second host 100b and the second 3-way switch 200b may then be directly connected to the third outlet assembly 1000c, comprising host 100c and load client 200c via a power cable 310c. As seen in FIG. 26C and FIG. 26D, the function of the second assembly's client device 200b is set to 'Load', thus, connecting the common terminal 232d of the client 200b to the third outlet assembly 1000c with the destination load client 200c, via a power cable 310c. The second outlet assembly 1000b receives electric power from the first outlet assembly 1000a via the cable 310b, through either conductor 313a, or conductor 313b, as the light switch peripheral 220b toggles between its traveler terminals 232b or 232f. The third outlet assembly 1000c comprises a lamp peripheral 220c of the client 200c, installed in the host 100c and receives electric power from the second outlet assembly 1000b via a power load cable 310c.

FIG. 26B shows the arrangement of the hosts 100a, 100b, 100c prior to clients 200a, 200b, 200c being installed into them. The first 'RS3' host 100a is connected to a power source via the power source cable 310a, which is plugged into the host 100a via its left cable electrical coupler 140 (optionally, the right cable electrical coupler 140 may also have been used, since the host bus is configured to receive a power cable from either sides), the second 'RS3' host 100b is connected to the first host 100a via the power cable 310b with conductors connecting their respective traveler terminals, and the third 'L' host 100c is connected to the second host 100b via the load cable 310c, which is plugged into the host 100c via its top cable electrical coupler 140.

FIG. 26C and FIG. 26D show the predetermined electrical connections formed between clients 200a, 200b, 200c once they are installed into their corresponding hosts 100a, 100b, 100c. The function of the first 3-way switch client 200a is set to a 'Source', thus engaging client contact 232a (common terminal) with the hot contacts 122a and setting the functional use of the client 200a to utilize electric current directly from the power source, via the power source cable 310a. The function of the second 3-way switch client 200b is set to a 'Load', thus engaging client contact 232d (common terminal) with the load contact 122d and setting the functional use of the client 200b to connect to and power the destination peripheral 220c of the client 200c. The second outlet assembly 1000b is configured to receive electric power from the first outlet assembly 1000a via conductors of the power cable 310b, connected to client contacts 232b and 232f (traveler terminals) and further supplies or interrupts electric power to the third client 100c via the load cable 310c, as the 3-way circuit is either opened or closed, as the switch peripherals 220a or 220b toggle between their respective contacts (travel terminals) 232b and 232f. Client contact 232g of the third 'L' client 200c is connected to the neutral contact 122g and client contact 232h of the third 'L' client 200c is connected to the hot contact 122h of the third host 100c, which receives electrical power from the second host 100b via the load cable 310c.

The three functional states of client devices 200a, 200b, when the second client 200b is positioned between the first client 200a and the third client 200c in a 3-way circuit configuration, may described as two uses cases: use case 1—(i) client 200a is set to function as a 'Source' switch with its common terminal 232a, via hot contact 122a, is connected to a power source cable, which may enter host 100a either from the left or right cable electrical coupler 140, as determined by its hot bus 130; whereas, (ii) the client 200b is set to function as a 'Load' switch, so that its common terminal 232d, via load contact 122d, is connected to load cable 310c, which further connects with destination load client 200c; use case 2—an alternative configuration of the presented 3-way circuit (not shown) may be formed by replacing the third 'L' host 100c, which has host bus 130, not configured to receive source power cable (such as 310a), with another third 'RL' host 100c, which has host bus 130, configured to receive source power cable (such as 310a), in addition to receiving a load cable 310c, and by moving the power source cable 310a from the first host 100a to the third 'RL' host 100c and plugging it into its left or right cable electrical coupler 140, while still keeping the second client function at 'Load'; thus, (iii) the first client 200a is then set to function as a 'Neutral' switch with its client contact 232a (common terminal) disengaged from the 3-way switch and only leaving its traveler terminals 232b and 232f to control opening or closing the overall 3-way switch circuit via cable 310b.

Figure 27C:
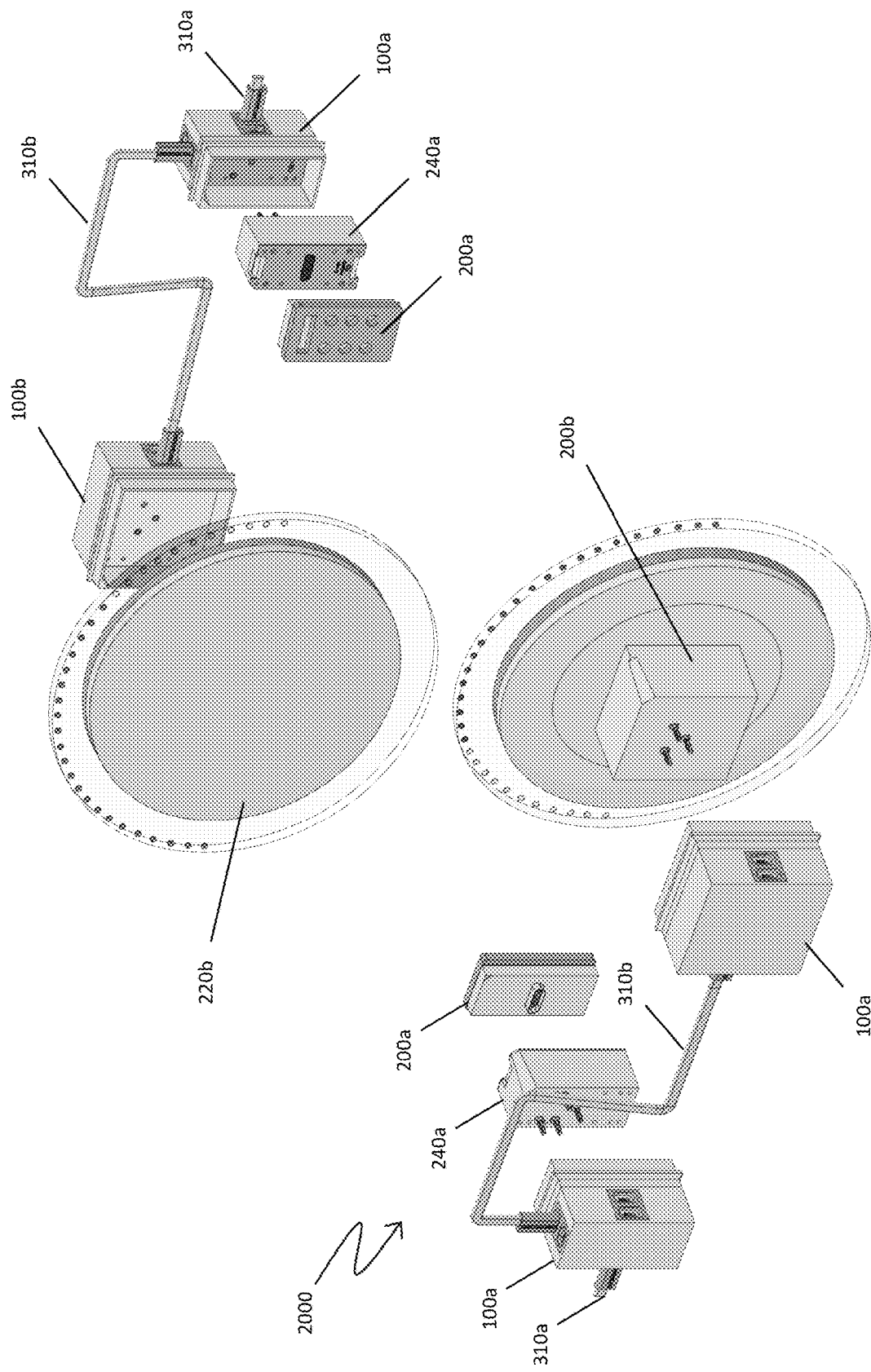

FIG. 27A, FIG. 27B, and FIG. 27C illustrate another representative embodiment of a system 2000 comprising multiple interconnected systems 1000. Here, systems 1000 have been connected to provide power and controls for a load, shown here as an induction cooktop. A first host device 100a may be combined with a first client 200b having a peripheral configured to control operation of one or more induction cooktops. Power source cable 310a may be connected to host 100a to provide power to system 2000. First host device 100a may be connected to second host device 100b via load cable 310b. Second host device 100b is configured to receive second client device 200b having the load peripheral (induction cooktop), and distributes power to second client 200b in accordance with operation of the controls peripheral associated with client device 200a. As shown, system 2000, in an embodiment, may be installed on an installation surface 10 using mounting components 500 (e.g., mounting frame 501 and frame cover 502) of installation system 400. In the particular embodiment shown in FIG. 27C, first client 200a may be a thin client and system 2000 may further comprise a client adapter 240a for interfacing thin first client 200a with host device 100a in accordance with the previous disclosure. As configured, various technologies could be added or updated. For example, in an embodiment, additional induction cooktops could be added to the system 2000 (via additional host devices 100c, 100d, etc. and cables 310c, 310d, etc.) and a new client device 200a configured to operate multiple induction cooktops could be swapped in for the current client device 200a. Another example (not shown) of a wider application range of system 2000 could be a cooking area in a kitchen with a host 100b that may be compatible with a variety of interchangeable client peripherals 220 other than an induction stove, like a food processor unit (blender and such), or others.

While system 2000 has been described herein in the context of representative embodiments, the present disclosure is not intended to be limited to just these representative embodiments, but rather such embodiments are intended to illustrate how multiple systems 1000 may be interconnected to provide various functionalities. One of ordinary skill in the art will recognize numerous other combinations of two or more systems 1000 without departing from the scope of the present disclosure.

System 3000

FIG. 28A, FIG. 28B, FIG. 28C, and FIG. 28D illustrate a representative embodiment of a multi-gang system 3000. Multi-gang outlet assemblies 3000, in various embodiments, may function in similar way as a single-host outlet assemblies 1000, wherein a number of clients 3210 are ganged in an array 3200 and may be installed as one unit into a multi-gang host 3100 which, in various embodiments, may have a common interface bus system 3130 to enable the functionality of the resulting multi-gang outlet assembly between host 3100 and client 3200. Except as further described below, multi-gang host sections 3110 are generally analogous to host devices 100 of system 1000 and multi-gang clients forming the array 3200 are generally analogous to client devices 200 of system 1000.

Figure 28A:
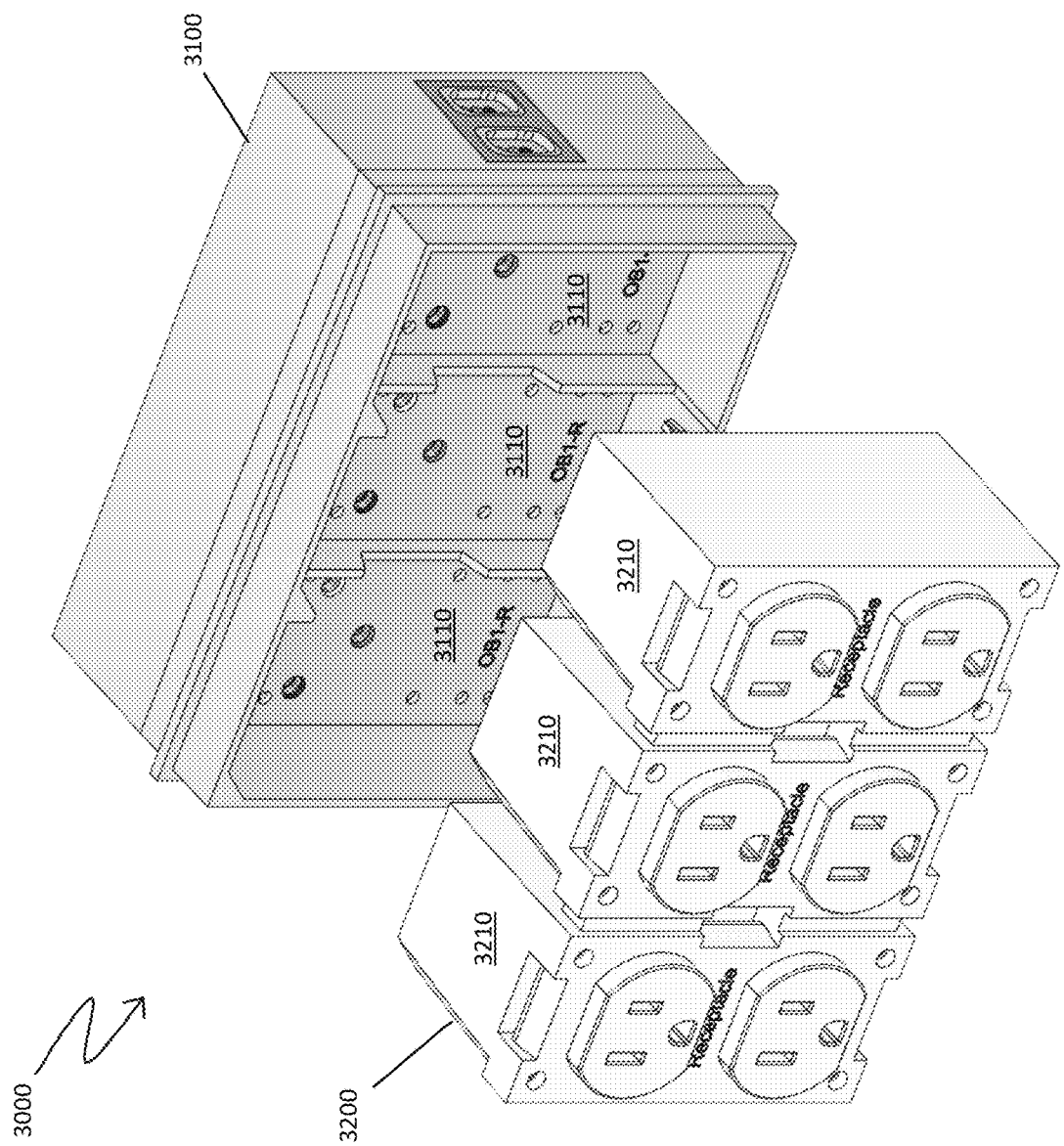
Figure 28C:
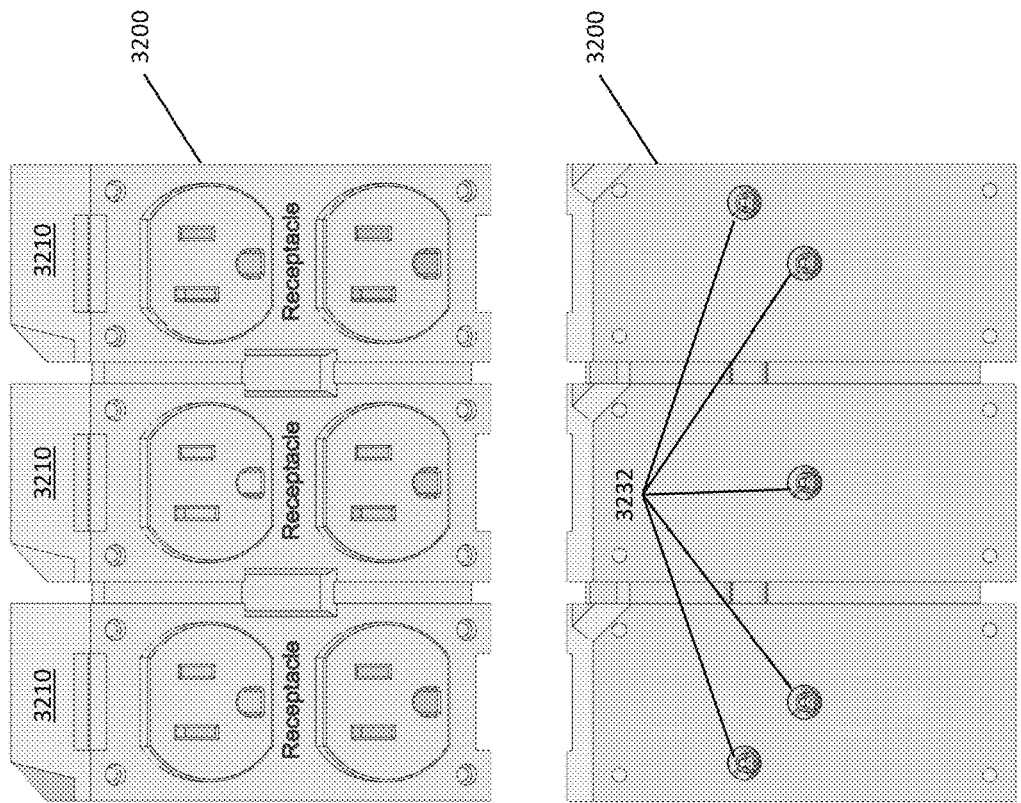
Figure 28B:
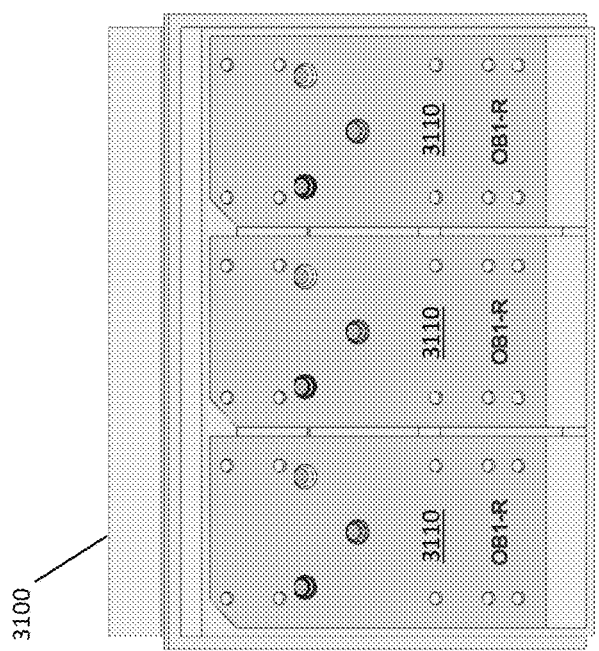

Referring to FIG. 28C, in various embodiments, client devices 3210 may physically connected to one another to form a one-piece client assembly 3200 and arranged for insertion of the client assembly 3200 into the multi-gang host device 3100. As configured, a consumer could purchase a single product having a desired functionality that can simply be inserted into a compatible multi-gang host device 3100 rather than purchasing multiple individual products and having to arrange and install each one at a time. A consumer could also purchase a combination of single client devices 200 and multi-gang 3200 client devices, or a combination of separate multi-gang 3200 client devices for as long as such combinations are compatible for use with the target multi-gang host 3100. Client electrical couplers 3232 of the client assembly 3200 and host contacts 3122 of the multi-gang host device 3100 are configured to couple with one another when the client assembly 3200 is inserted into the multi-gang host device 3100 to provide a corresponding number of first electrical interfaces (e.g., sockets+prongs), each first electrical interface defining a plurality of predetermined electrical connections between the client assembly 3200 and the multi-gang host device 3100. This may make installation easier, less time consuming, and safer. Of course, individual client devices 3210 may also be used with multi-gang host device 3100.

Referring to FIG. 28D, in various embodiments, client assembly 3200 may be configured such that the various client devices 3210 are electrically interconnected with one another by a multi-gang client bus 3230. As configured, client assembly 3200 may be configured to interface with certain host contacts 3122 to provide a desired functionality. In an embodiment, client bus 3230 is independently configurable to form an electrical circuit suitable for delivering power from the cable(s) to the client devices, via the predetermined electrical connections defined at the first and second electrical interfaces connecting the cable, the multi-gang host device, and the client assembly In the embodiment shown, client assembly comprises fewer client contacts 3232 than there would be if the client devices 3210 were provided individually rather than as part of client assembly 3200.

Figure 29A:
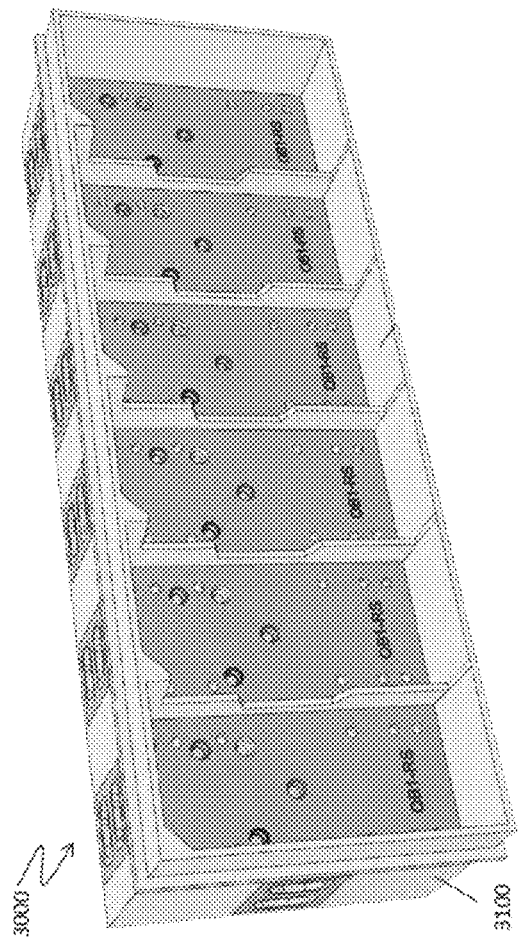
FIG. 29A and FIG. 29B illustrate a multi-gang host, in accordance with an embodiment of the present disclosure.
Figure 29B:
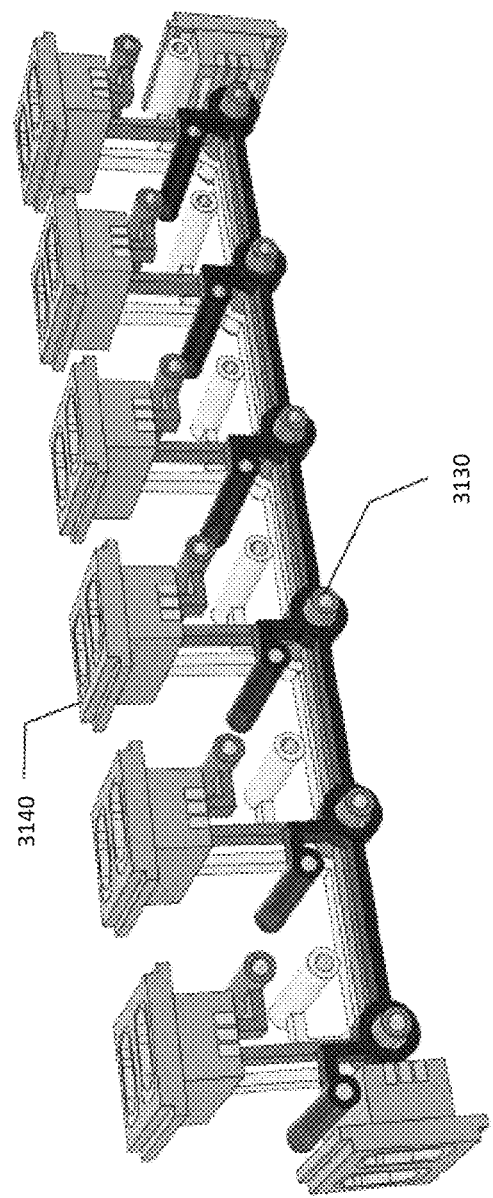

FIG. 29A and FIG. 29B illustrate a representative embodiment of a host 3100 of multi-gang system 3000. Multi-gang host device 3100, in various embodiments, may include a multi-gang host bus 3130 connecting multi-gang host contacts 3122 with multi-gang cable electrical couplers 3140. Multi-gang host bus 3130, in various embodiments, may be independently configurable to form an electrical circuit suitable for distributing power from a power source cable(s) 310 to the client devices 3210, via the predetermined electrical connections defined at the first and second electrical interfaces connecting the cable 310, the multi-gang host device 3100, and the client assembly 3200. As configured, multi-gang host device 3100 may be configured to combine a functionality of peripherals associated with each client device 3210. Each of the multi-gang cable electrical couplers 140 may be configured to couple with a cable 310 to provide a corresponding number of second electrical interfaces, each second electrical interface defining a plurality of predetermined electrical connections between terminals of the multi-gang host device 3100 and electrical conductors 312 of the cable 310.

System 1000—Alternative Embodiments and Combinations

Figure 30:
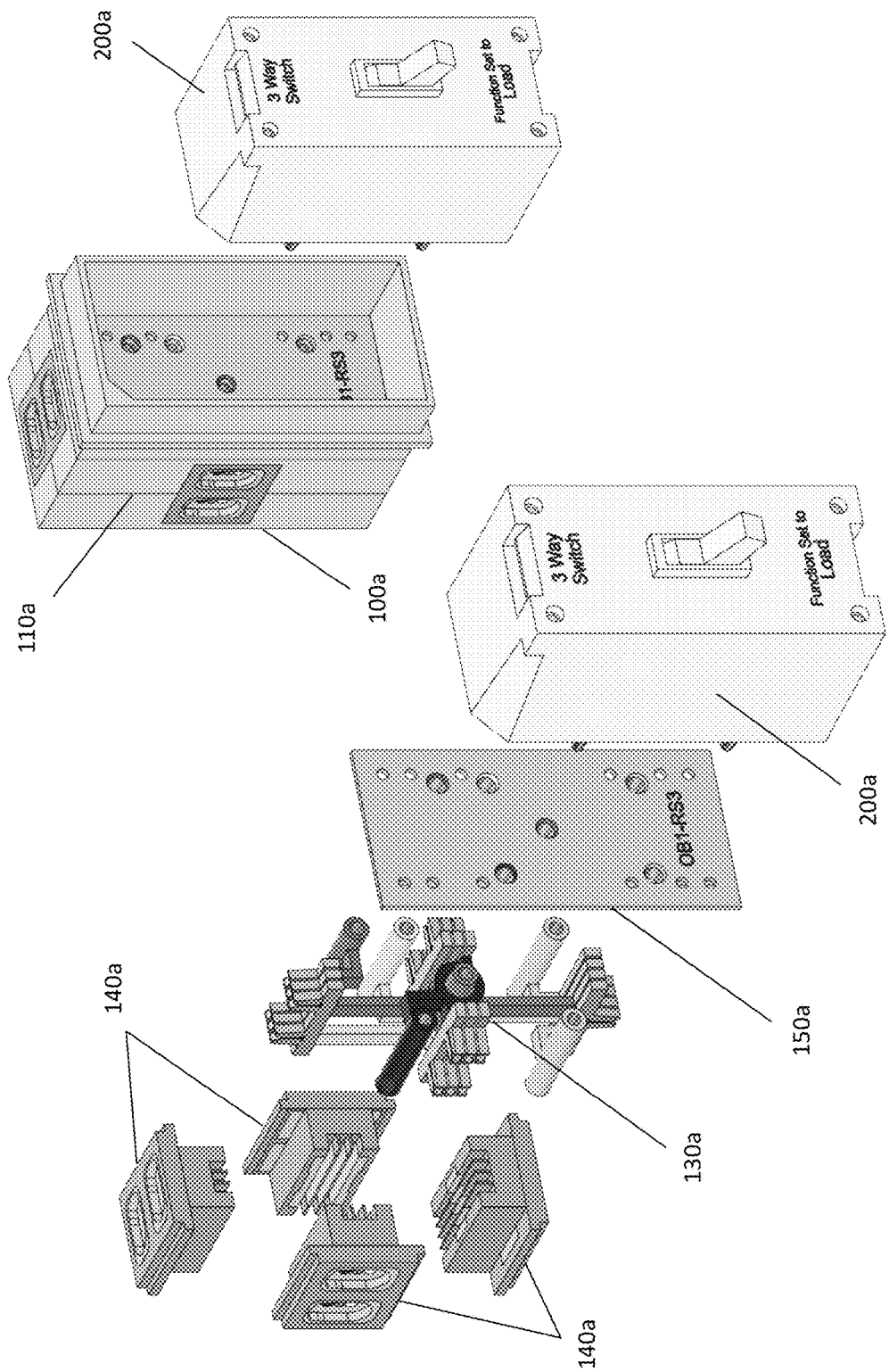
FIG. 30 and FIG. 31 illustrate various views of host devices, client devices, and their interface parts of a modular power distribution system, in accordance with an embodiment of the present disclosure.
Figure 31:
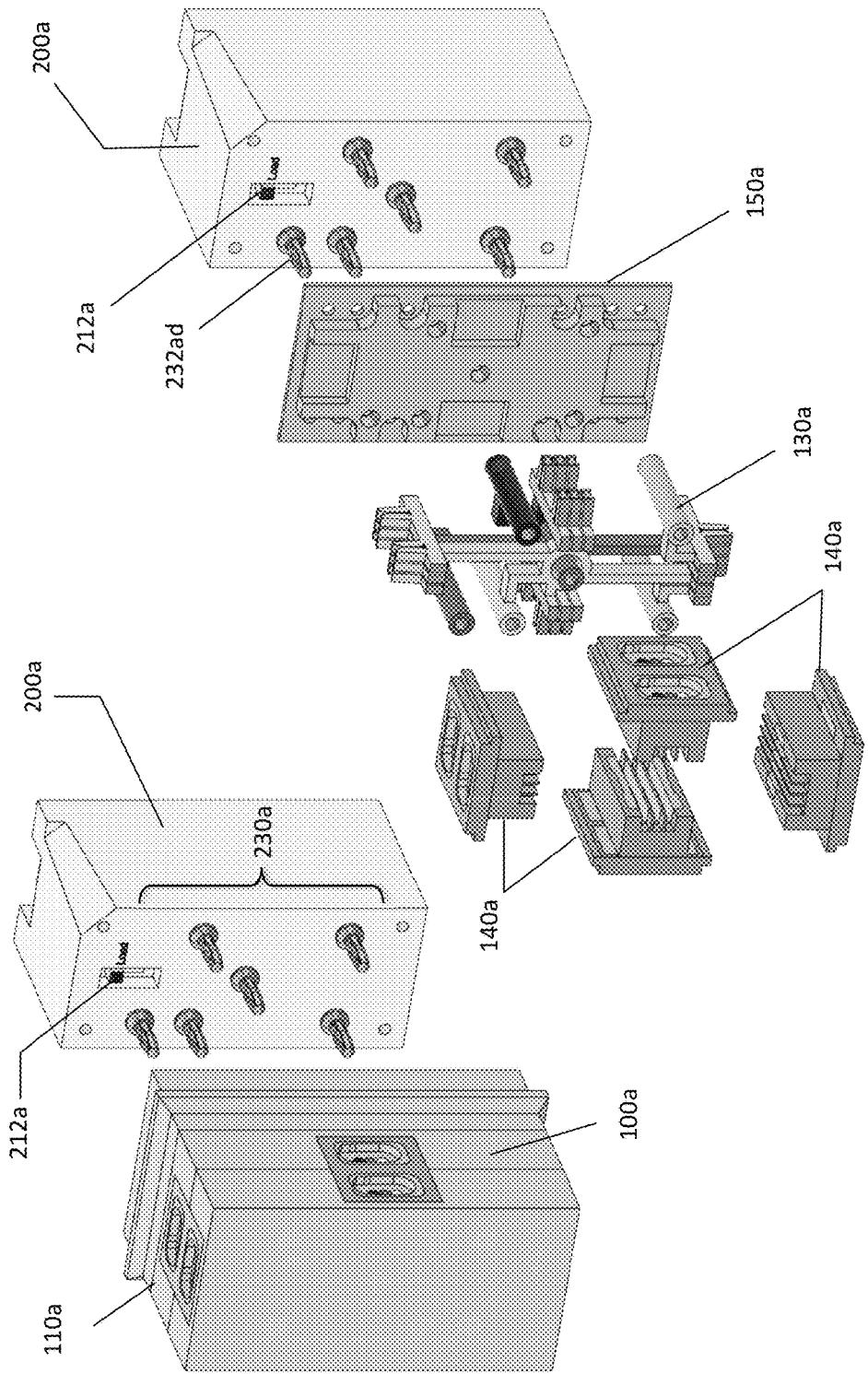
Figure 32:
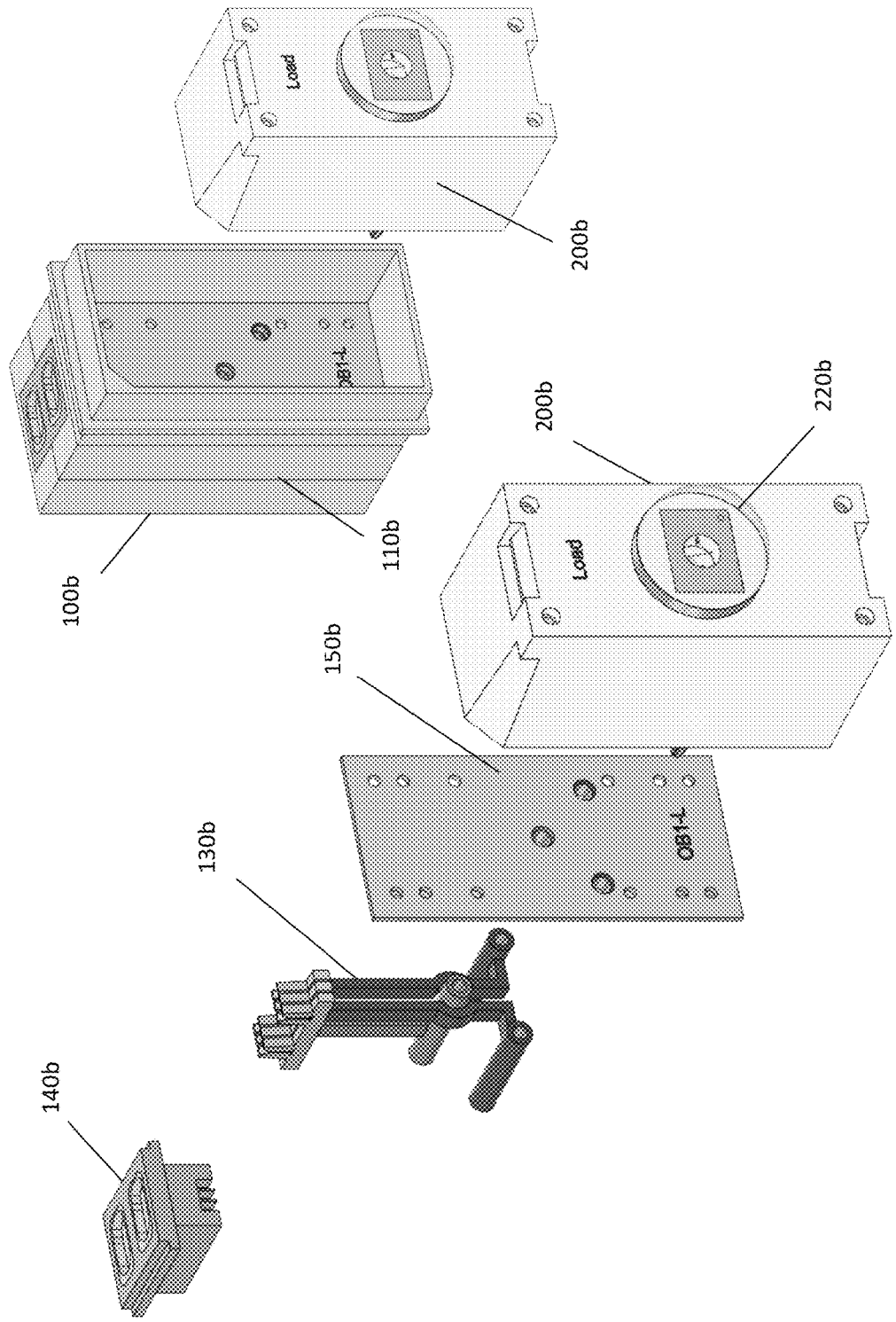
FIG. 32 and FIG. 33 illustrate various views of host devices, client devices, and their interface parts of a modular power distribution system, in accordance with another embodiment of the present disclosure.
Figure 33:
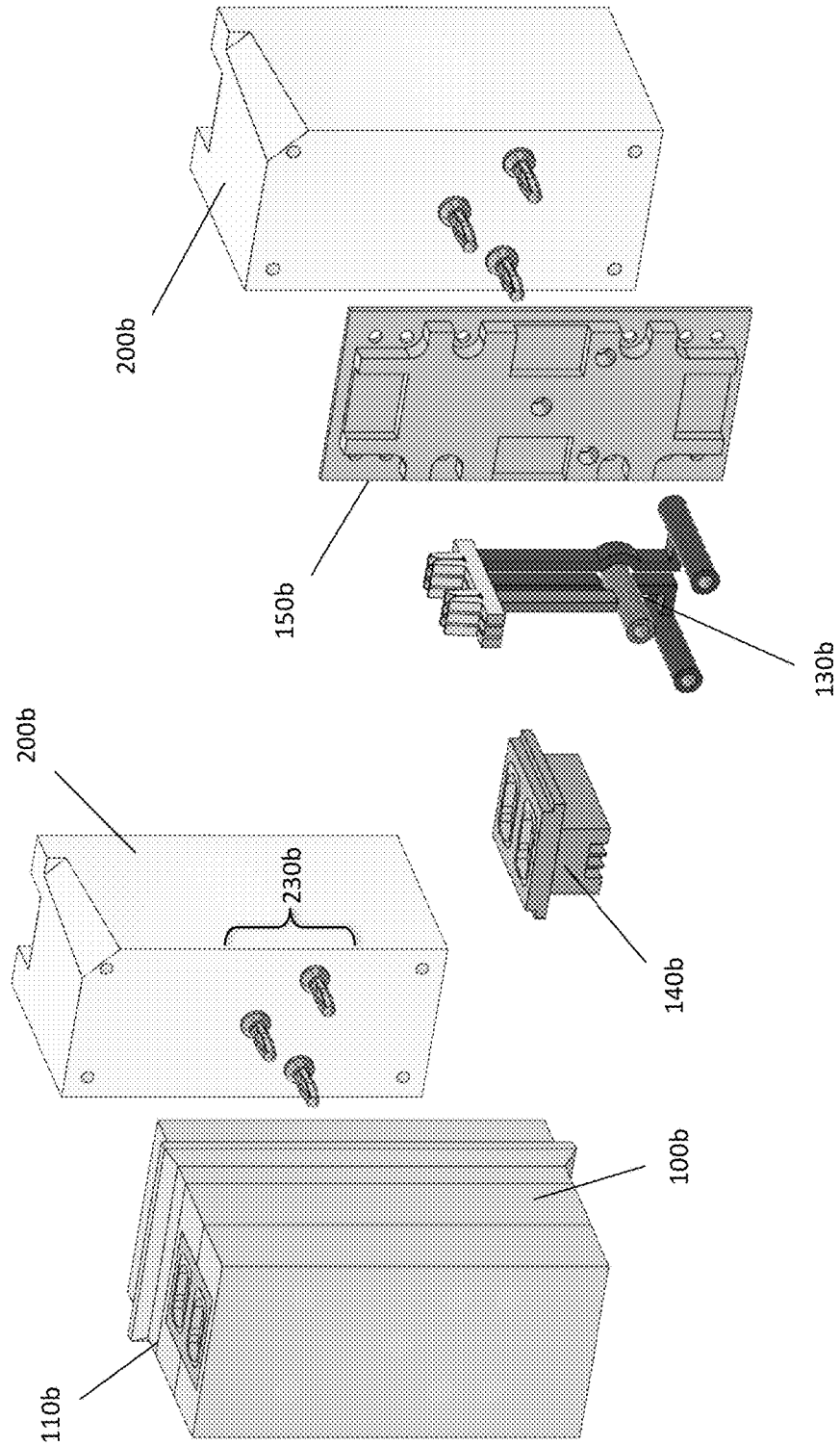

FIGS. 30-34 illustrate various views of host devices 100a and 100b, client devices 200a and 200b, and their interface parts as additional representative examples of system 1000. FIG. 30 and FIG. 31 show front and rear views of representative embodiments of host device 100a, configured to receive cabling from four cable electrical couplers 140a, installed in the top, bottom, left, and right walls of its housing 110a, and client device 200a, configured to be inserted into host device 100a, as well as exploded views of interface components of host device 100a: interface wall 150a, host bus 130a, and four cable electrical couplers 140a. FIG. 32 and FIG. 33 show front and rear views of representative embodiments of host device 100b, configured to receive cabling from its one cable electrical coupler 140b, installed in the top wall of its housing 110b, and client device 200b, configured to be inserted into host device 100b, as well as exploded views of interface components of host device 100b: interface wall 150b, host bus 130b, and a cable electrical coupler 140b.

Figure 34:
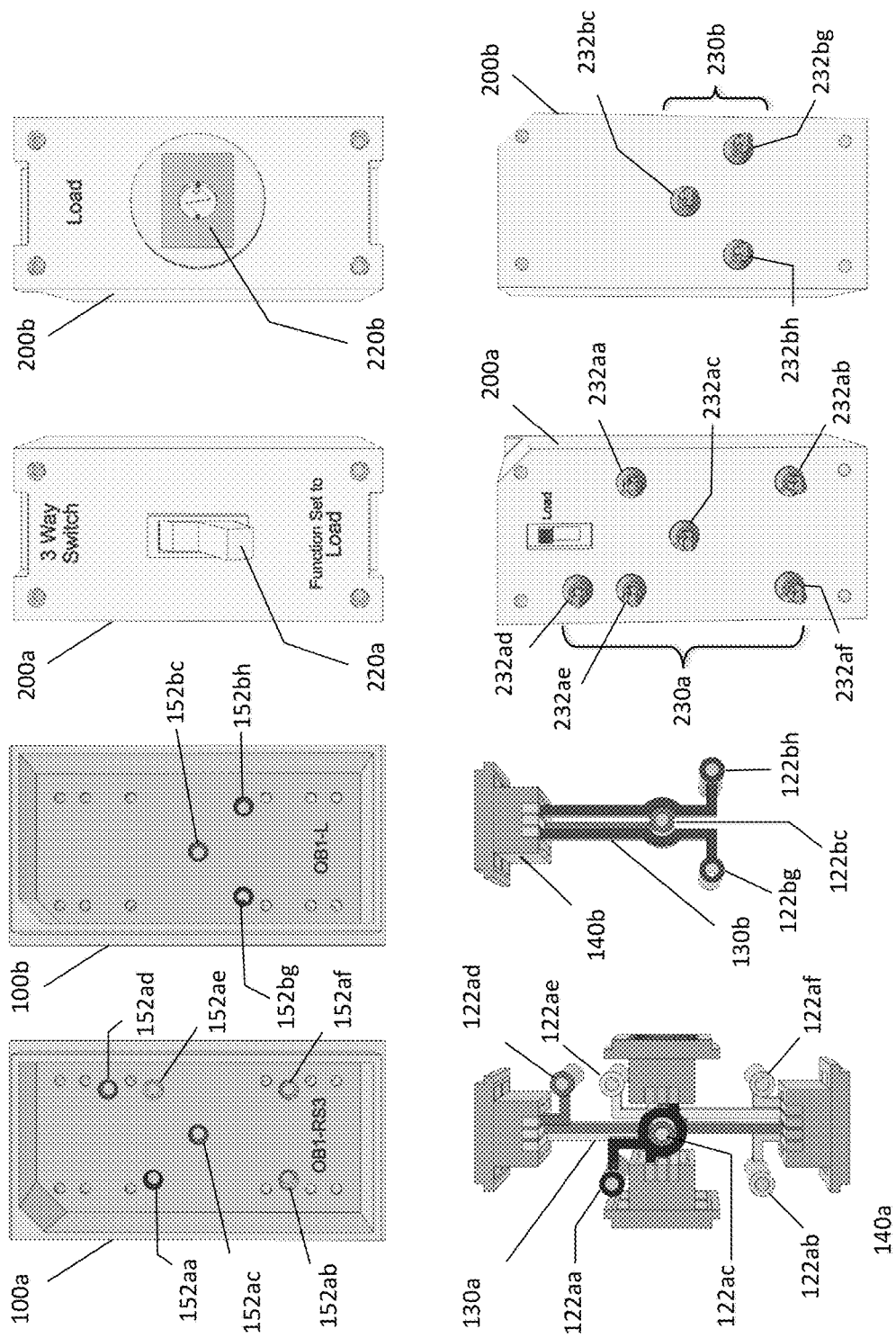
FIG. 34 illustrates various views of host devices, client devices, and their interface parts of a modular power distribution system, in accordance with an embodiment of the present disclosure.

Turning to FIG. 31 and FIG. 34, client device 200a is a representative embodiment of a 3-way switch with a functional toggle 212a in its back face set to 'Load' function. As detailed in a description of a representative embodiment of system 2000 earlier and additionally shown in FIG. 26D, when set to 'Load' function, client electrical coupler 232ad of client electrical coupler 230a functions as internal common terminal, configured to fit through port 152ad and connect with contact 122ad, when client device 200a is inserted into host device 100a. Similarly, the remaining client electrical couplers 232aa, 232ab, 232ac, 232af, 232ae of client device 200a are configured to connect with contacts 122aa, 122ab, 122ac, 122af, 122ae via ports 152aa, 152ab, 152ac, 152af, 122ae of host device 100a respectively.

Turning to FIG. 32 and FIG. 34, client device 200b is a representative embodiment of a load with a peripheral 220b representing a lamp set in an electrical socket in the front face of client device 200b. The client electrical coupler contacts 232bg, 232bh, 232bc of client device 200b are configured to connect with contacts 122bg, 122bh, 122bc via ports 152bg, 152bh, 122bc of host device 100b respectively.

If the host devices 100a and 100b were the second and the third of the three host devices, and the client devices 200a and 200b were the second and the third of the three client devices, presented in the earlier description of a representative embodiment of system 2000 and additionally shown in FIG. 26D, the peripheral 220b (lamp) would be turned on and off, as the switch peripheral 220a toggled between its respective contacts (travel terminals) 232ab and 232af.

FIGS. 30-34 highlight the modularity of the system 1000, wherein host device 100*a* may be configured to receive a variety of different client device types by engaging any of its four cable electrical couplers 140*a*, six contacts of host electrical coupler 120, and host bus 130*a*, such as a receptacle (not shown) and a 'power-no-power' single-pole single-throw switch (not shown), in addition to a 3-way switch peripheral 220*a*. If a receptacle client device (not shown) were to be inserted into the host device 100*a*, the corresponding client device peripheral would utilize its three client electrical coupler contacts to pass through three ports 152*aa*, 152*ac*, and 152*ae* of host device 100*a*, connecting the internal terminals of the receptacle with three contacts 122*aa* (hot), 122*ac* (ground), and 122*ae* (neutral) respectively; thus, forming a functional receptacle outlet assembly. If a certain 'power-no-power' switch (not shown) were to be inserted into the host device 100*a*, the corresponding client device peripheral would utilize four client electrical coupler contacts to pass through four ports 152*aa*, 152*ac*, 152*ae*, and 152*ad* of host device 100*a*, connecting the client switch's traveler terminal to contact 122*ad* (load), ground to contact 122*ac* (ground), and common terminal to contact 122*aa* (hot), for when power would be sourced at the switch outlet, or to contact 122*ae* (neutral), for when power would be sourced directly at the destination load, instead of the switch.

As opposed to host device 100*a*, which may support multiple types of client peripherals, host device 100*b* is an example of a host device with fewer interface parts, for a purpose-specific client device 200*b*, which, as shown in FIG. 34, requires just one cable electrical coupler 140*b* and three host electrical coupler contacts 122*bg*, 122*bc*, and 122*bh* to accommodate contacts 232*bg*, 232*bc*, and 232*bh* of client electrical coupler 230*b* respectively.

FIGS. 37A-37C and FIGS. 38A-38B illustrate various alternative embodiments of host device 100, client device 200, and corresponding combinations thereof.

Alternative host devices 1100, in various embodiments, may function in similar way, as a host devices 100, wherein some internal or exterior parts and use cases of alternative host devices 1100 may differ to those of host devices 100, presented in earlier embodiments.

Referring to FIG. 37A, in various embodiments, alternative host 1100*a* may have a housing of similar size and shape as a host device 100, but utilize alternative parts, such as port 1152*a* and multi-pin electrical host coupler 1122*a* and configured to receive a client 200 or client adapters 240, 250 with a matching multi-pin client electrical coupler 230 or adapter electrical coupler 243. Additionally, the internals of alternative host 1100*a* may have built-in host peripherals 1600*a* and 1700*a*, whereas host peripheral 1600*a* is a voltage converter and 1700*a* is a relay that controls the electrical host coupler 1122*a*, as opposed to host bus system 150 in a host device 100.

FIG. 37C illustrates examples of alternative host devices 1100*b* and 1100*c*, wherein both of them have sizes and shapes, not similar to those of host device 100. The use case of alternative host 1100*b* also differs from that of host 100, which would generally accept clients 200 and instead is configured to receive another host device, shown here as alternative host device 1100*c* with embedded power supply adapter and converter unit.

The alternative host device 1100*c* does not have an open front face, as found in host device 100 and features a closed front face with port 1152*c* placed directly on its surface. The port 1152*c* here is configured to receive a client device 200 with compatible client electrical coupler and required electric power specifications.

Practical application of utilizing alternative host 1100*a* would be to remotely energize or deenergize a client device 200 with a certain peripheral 220 that must use a certain voltage and current specifications, which is satisfied by the alternative host peripheral 1600*a*, and does not have remotely controllable switches, so the alternative host peripheral 1700*a* may be used instead. Similarly, practical application of utilizing alternative hosts 1100*b* and 1100*c* would be to station a power supply panel for electronic devices, which may require electric power of specific voltage and current and utilize a certain type proprietary plug, wherein alternative host 1100*c* may convert power from host 1100*b* to the required specifications and its port 1152*c* may receive an compatible client 200 that may feature the required plug type, or an array of plug types. In this case, alternative host 1100*c* may be a portable solution to be moved from one room to another, depending on the consumer's needs.

FIG. 38A and FIG. 38B illustrate an example of a combination of alternative embodiments of host device 1100, client device 1200, and client interoperability adapters 1250*c* and 1250*d*, stacked up together to form an outlet assembly, wherein each stacked component represents interoperability feature of and contributes a distinct functional enhancement to the resulting outlet assembly. In this representative example, interoperability adapter 1250*c* enables wireless connectivity of client 1200 and interoperability adapter 1250*d* enables integration of client 1200 with a given digital ecosystem (e.g., Apple HomeKit, Google Assistant, or Amazon Alexa).

Combination of representative embodiments illustrated in FIG. 38A and FIG. 38B also demonstrate the interchangeability feature of outlet components, which are independently configurable and wherein each pairing is mutually compatible via corresponding electrical interface, defining a plurality of predetermined electrical connections between the paired components.

As illustrated in FIG. 38B, the first interface 1160*a* is defined between host 1100 and client 1200 via stacked adapters 1250*d* and 1250*c*; the second interface 1160*b* is defined between host 1100 and cabling (not shown); the third interface 1160*c* is defined between client 1200 and adapter 1250*d*; the fourth interface 1160*d* is defined between adapter 1250*c* and host 1100, and so on.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A modular power distribution system, comprising:
   a client device comprising a client electrical coupler, a peripheral, and electrical connections between the client electrical coupler and the peripheral; and
   a host device comprising a host electrical coupler, a cable electrical coupler, and a host bus configured to define electrical connections between the host electrical coupler and the cable electrical coupler, wherein the client electrical coupler and the host electrical coupler are configured to couple with one another when the client device is inserted into the host device to provide a first electrical interface defining a plurality of predetermined electrical connections between the client device and the host device, wherein the cable electrical coupler is configured to couple with a cable to provide a second electrical interface defining a plurality of predetermined electrical connections between the host device and electrical conductors of the cable, and wherein
   (i) the electrical connections between the host electrical coupler and the cable electrical coupler and
   (ii) the electrical connections between the peripheral and the client electrical coupler, are independently configurable to facilitate receipt of a plurality of different client device types supporting varying functionality and to form an electrical circuit suitable for delivering power from the cable to the peripheral, via the predetermined electrical connections defined at the first and second electrical interfaces connecting the cable, the host device, and the client device,
   wherein the host bus comprises two or more bus connectors, each comprising: one or more bus terminals configured to couple with one or more electrical conductors of the cable; and a rigid bus member connecting the host electrical coupler with the one or more bus terminals, the rigid bus member shaped to follow a path configured not to contact the rigid bus members of other bus connectors,
   wherein the one or more bus terminals include a rigid support member extending between and supported by a first wall and a second wall of a housing of the host device, and wherein the host electrical coupler is rigid and extends between and is supported by the first wall and the second wall.

2. The system of claim 1, wherein the system includes two or more cable electrical couplers, and wherein the host bus is configured to define direct or indirect electrical connections between two or more of the cable electrical couplers configured to deliver power from a first of the two or more cable electrical couplers to a second of the two or more cable electrical couplers.

3. The system of claim 1, further comprising a client adapter comprising a first adapter electrical coupler, a second adapter electrical coupler, and electrical connections between the first adapter electrical coupler and the second adapter electrical coupler, wherein the first adapter electrical coupler is configured to couple with the client electrical coupler to provide a third electrical interface defining a plurality of predetermined electrical connections between the client device and the client adapter, wherein the second adapter electrical coupler is configured to couple with the host electrical coupler to provide a fourth electrical interface defining a plurality of predetermined electrical connections between the client adapter and the host device, and wherein the electrical connections between the first adapter electrical coupler and the second adapter electrical coupler are independently configurable to form an electrical circuit suitable for connecting the client device to the host device via the predetermined electrical connections defined at the third electrical interface and the fourth electrical interface.

4. The system of claim 3, wherein the client adapter further comprises an adapter peripheral connected to the electrical circuit and configured to combine a functionality of the adapter peripheral with a functionality of the peripheral of the client device.

5. The system of claim 1, wherein the rigid bus member of a first bus connector and a rigid bus member of a second bus connector are configured to be situated in separate planes offset from one another within the housing, and wherein the one or more bus terminals of the first bus connector and the one or more bus terminals of the second bus connector are configured to be situated in separate planes offset from one another within at least one of the one or more cable electrical couplers.

* * * * *